United States Patent [19]

Sparrow

[11] Patent Number: 4,747,147
[45] Date of Patent: May 24, 1988

[54] FINGERPRINT RECOGNITION AND RETRIEVAL SYSTEM

[76] Inventor: Malcolm K. Sparrow, 127 Linton Road, Loose, Maidstone, MEI5, OAL, England

[21] Appl. No.: 875,023
[22] Filed: Jun. 16, 1986

Related U.S. Application Data

[63] Continuation-in-part of Ser. No. 771,188, Sep. 3, 1985, abandoned, which is a continuation-in-part of Ser. No. 766,331, Aug. 16, 1985, abandoned.

[51] Int. Cl.$^4$ .............................................. G06K 9/00
[52] U.S. Cl. ......................................... 382/4; 382/5; 382/26
[58] Field of Search ........................... 382/4, 5, 21, 26; 356/71; 283/69

[56] References Cited

U.S. PATENT DOCUMENTS

| | | | |
|---|---|---|---|
| 3,292,149 | 12/1966 | Bourne | 382/4 |
| 3,419,287 | 12/1968 | Rodie | 382/4 |
| 3,558,864 | 1/1971 | French | 382/4 |
| 3,560,928 | 2/1971 | Berger et al. | 382/4 |
| 3,564,266 | 2/1971 | Klotz, Jr. | 382/4 |
| 4,047,154 | 9/1977 | Vitols et al. | 382/5 |
| 4,135,147 | 1/1979 | Riganati et al. | 382/5 |
| 4,151,512 | 4/1979 | Riganati et al. | 382/5 |
| 4,185,270 | 1/1980 | Fischer, II et al. | 382/5 |
| 4,310,827 | 1/1982 | Asai | 382/5 |
| 4,607,384 | 8/1986 | Brooks | 382/4 |
| 4,646,352 | 2/1987 | Asai et al. | 382/5 |

OTHER PUBLICATIONS

Gaffney, Jr., "Fingerprint Pattern Offset Determination and Matching Method", *IBM Tech. Disc. Bulletin*, vol. 17, No. 3, Aug. 1974, pp. 773–774.
Sparrow, "Digital Coding of Single Fingerprints: A New Approach for the Computer Age", *Journal of Police Science and Administration*, vol. 10, No. 2, pp. 206–217.
Kawashima et al., "Auto. Reading and Matching Method for Fingerprint Identif.", Prepared for International Fingerprint Conference, Nov. 27–30, 1984, pp. 1–15.
Millard, "Continued Development of Automatic Fingerprint Recognition in the UK", pp. 1–3.
Stock, "Research and Development Program for Continued Automation of the FBI's ID Division", International Conference on Fingerprints, Nov. 1984.
P.A.I.R.S. (Processing and Image Retrieval System), pp. 1,3,5,7.
Wegstein, "A Semi-Automated Single Fingerprint ID System", *NBS Technical Note 481*, Apr. 1969, pp. 1–21.
Wegstein, "An Automated Fingerprint Identification System", NBS Special Publication 500-89, pp. 1–44.
Neudorfer, "The FBI Identification Division Automation Program", pp. 1–20.
Millard, "Developments on Automatic Fingerprint Recognition", *1983 Int. Carnahan Conf. on Security Tech.*, Oct. 4–6, 1983, pp. 173–178.
Millard, "An Approach to the Automatic Retrieval of Latent Fingerprints", Police Scientific Development Branch, 1975, pp. 45–51.
Warboys et al., "The Operational Use of the Automatic Fingerprint Recognition System at New Scotland Yard", pp. 1–6.

*Primary Examiner*—Leo H/ Boudreau
*Assistant Examiner*—Joseph Mancuso
*Attorney, Agent, or Firm*—Jim Zegeer

[57] ABSTRACT

Fingerprints are scanned by a scanning system (13). Topological systems for coding and comparing fingerprints are described, including a system for recording a description of fingerprints. In a preferred embodiment, a central point of the fingerprint is selected as a center of rotating scan line. The scan line is rotated to different topological characteristics. A code (T) representing the type of irregularity is recorded (16, 17). A measure (M) of the scanning position when encountering the irregularity is made (16, 17). In the case of a rotating scan line the angular coordinate ($\theta$) is recorded as the measure (M) of scanning position. The ridge count (R) (16) is also recorded. A list of coordinate sets (T, $\theta$, R) specifies the topology of a sector. For fragmentary prints similar coordinate sets are generated. A fourth coordinate can be added corresponding to the radial distance (D) (16). A full set of coordinates (T,$\theta$, R, D) gives a complete topological and spatial description of a fingerprint. Comparison of fingerprints can then be conducted by a computer (20).

86 Claims, 19 Drawing Sheets

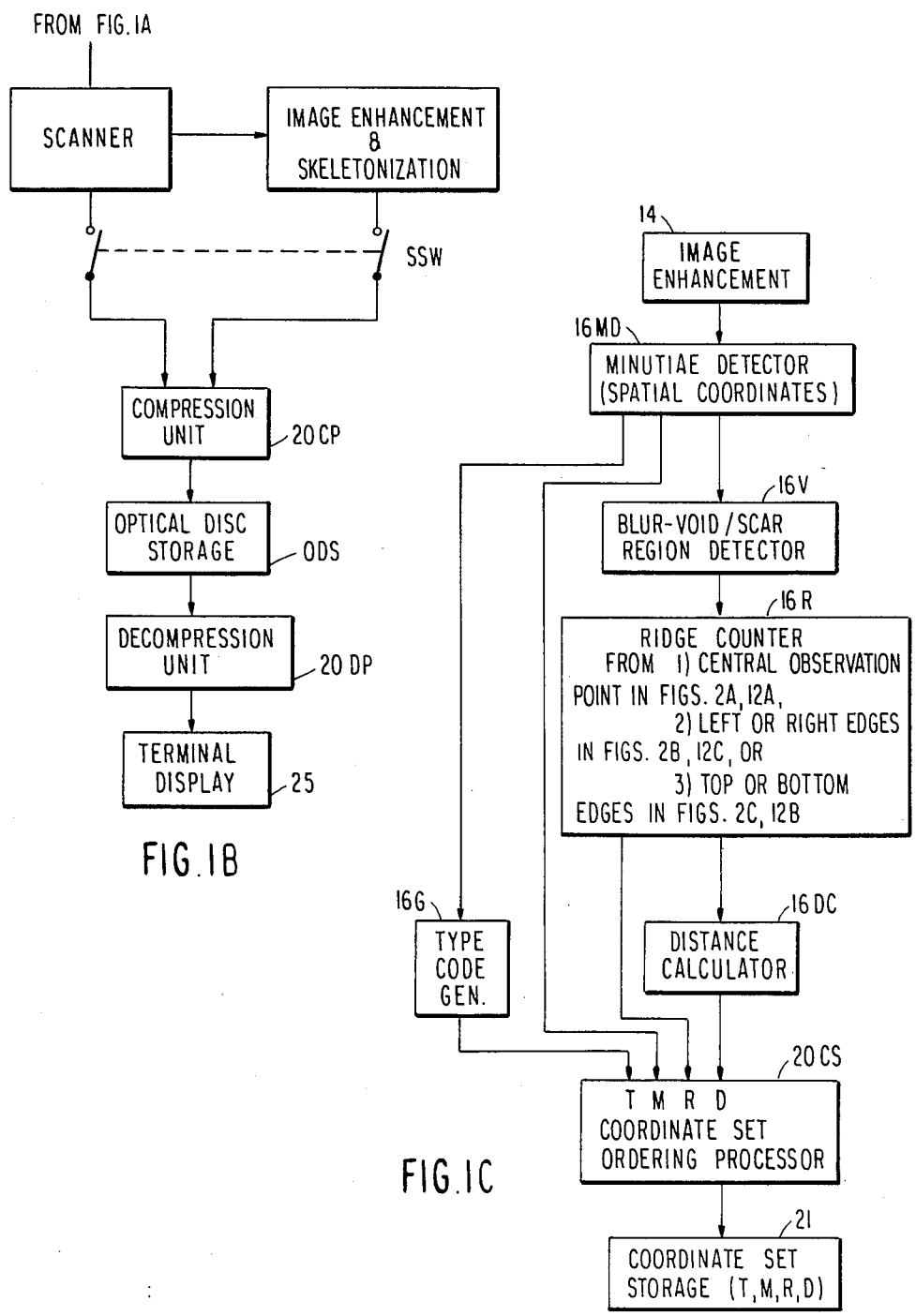

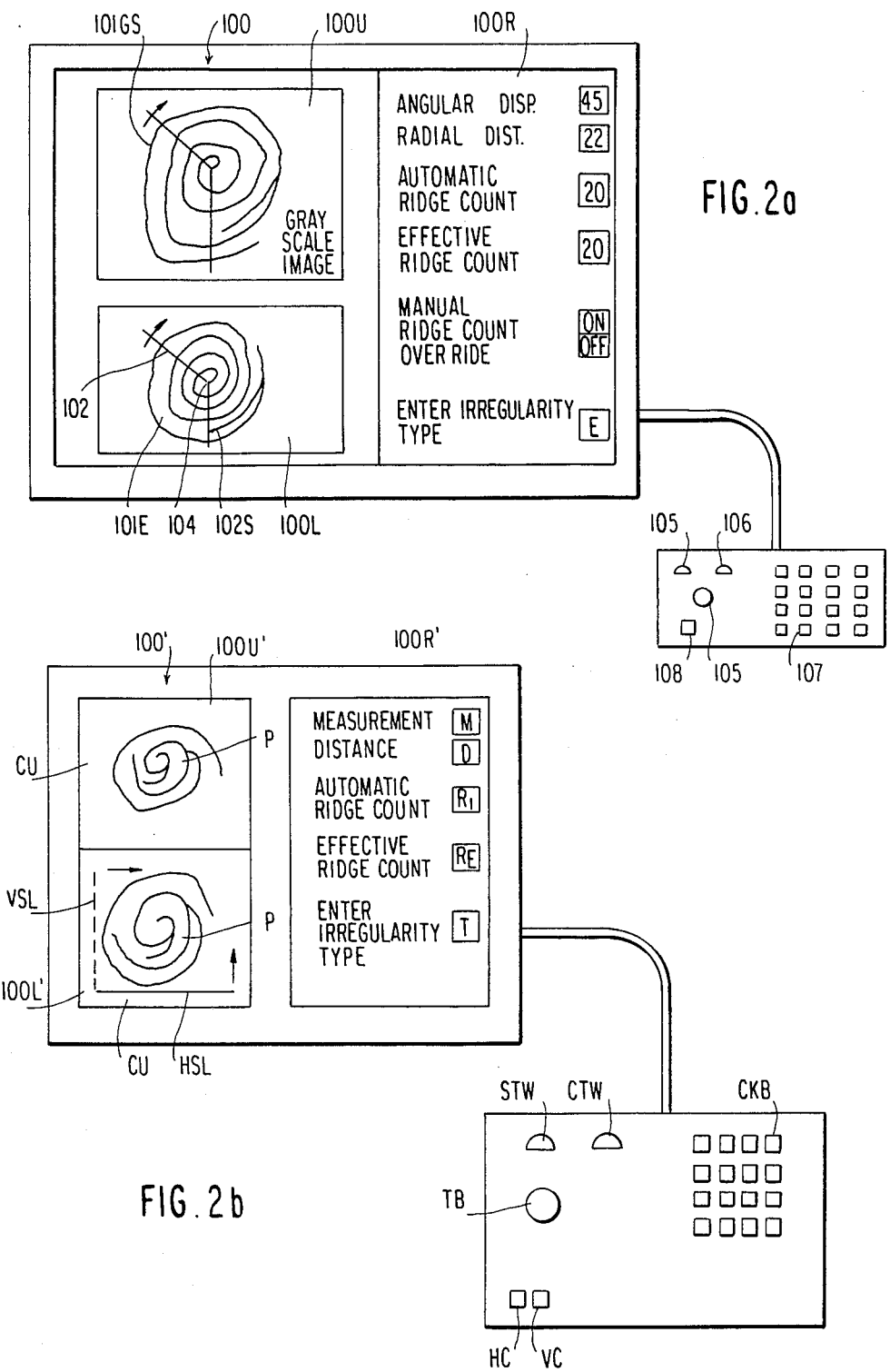

CODE DESCRIPTION

0. The ridge goes out of sight without meeting any characteristic.

1. Not allocated.

2. Ridge meets a bifurcation as if from left fork.

3. Ridge ends.

4. Ridge meets a bifurcation as if from right fork.

5. Ridge returns to its starting-point without any event occurring.

6. Ridge meets a new ridge starting on the left.

7. Ridge bifurcates.

8. Ridge meets a new ridge starting on the right.

9. Not allocated.

A. Ridge encounters scarred tissue.

B. Ridge encounters blurred or unclear print.

C. Ridge meets a compound (e.g. a crossover).

D. Not allocated.

E. Not allocated.

F. Used for vector padding.

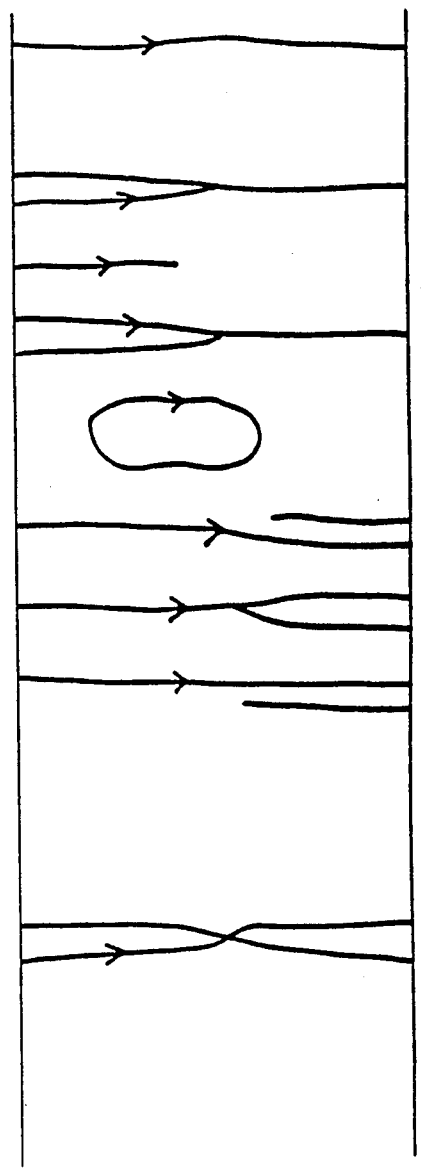

FIG. 7

```
Ridge
number:  20 19 18 17 16 15 14 13 12 11 10  9  8  7  6  5  4  3  2  1  0
Code:    70 00 80 63 00 00 37 80 63 20 36 33 36 46 28 83 60 23 83 63 33

Ridge
(cont.): 1  2  3  4  5  6  7  8  9 10 11 12 13 14 15 16 17 18 19 20
Code:    33 30 72 83 86 63 78 30 83 60 00 73 80 60 80 30 FF FF FF FF
```

82-digit Vector Generated from Fig. 8  (showing also the intersection point numbers that correspond to each digit pair (for easy interpretation).

FIG.10 a
FIG.10 b

FIG. 11
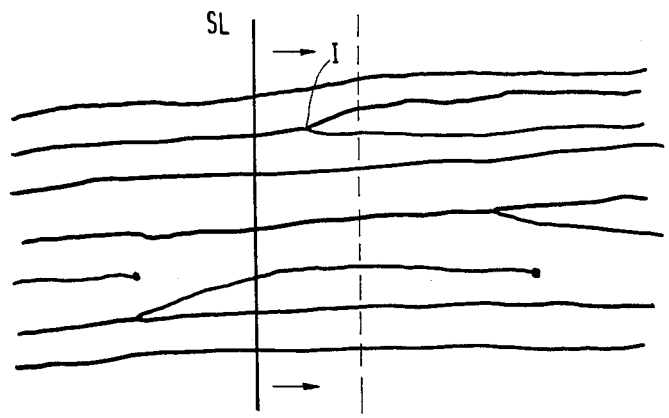
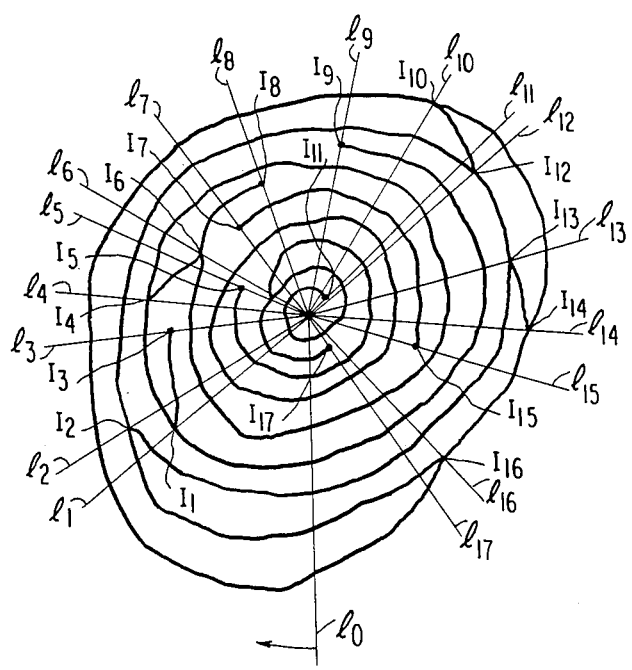
FIG. 12a

COORDINATES

T = IRREGULARITY TYPE (INCLUDING RECURVES)
M = y COORDINATE
R = RIDGE COUNT FROM y AXIS (OR "v") COUNTED HORIZONTALLY
D = x COORDINATE

COORDINATES

T = IRREGULARITY TYPE (INCLUDING RECURVES)
M = x COORDINATE
R = RIDGE COUNT FROM x AXIS (OR "V") COUNTED VERTICALLY
D = y COORDINATE

FINGERPRINT RECONSTRUCTION DATA:

Card number   6.  Finger number   8
Window size: 6"
Magnification :   5.00
Downward displacement of origin :  -800
Number of line segments drawn:  4404
Fingerprint data size : 526 bytes.

IMAGE RETRIEVAL THROUGH TOPOLOGICAL RECONSTRUCTION. PLOT 1.

FINGERPRINT RECOGNITION AND RETRIEVAL SYSTEM

REFERENCE TO RELATED APPLICATION

This application is a continuation-in-part of my application Ser. No. 771,188 filed Sept. 3, 1985, now abandoned which, in turn, is a continuation-in-part of my application Ser. No. 766,331 filed Aug. 16, 1985, also now abandoned.

BACKGROUND AND BRIEF DESCRIPTION OF THE INVENTION

The invention relates to fingerprint coding and recognition and retrieval systems based on generally invarying topological irregularities, characteristics or minutiae (which terms are used interchangeably herein) of fingerprints. The term "fingerprint" or "print" is used in reference to the epidermal ridge lines of the ten fingers of the human hand, palm prints, toe and sole prints of humans wherein such epidermal ridge lines and characteristic features thereof are in patterns unique to a particular individual.

In my paper entitled "Digital Coding of Single Fingerprints—A New Approach for the Computer Age", Journal of Police Science and Administration, Vol. X, No. 2, June 1982, I show that the soft elastic nature of human skin causes substantial variation of the spatial descriptions of successive impressions of the same fingerprints. Consequently, spatially based coding schemes used for forming machine searchable databases have inherent inaccuracies due to the fact that the spatial based coordinate system typically used for coding purposes could not take into account the wide variations in spatial distortions making the match or identification between two rolled prints on the same finger somewhat problematical particularly where the prints are taken at substantially different times or pressures.

Topological coding schemes provide concise digital codes that provide a more economical and more reliable basis for ten print identification systems. In my above referred to paper, I suggest comparison methods based on topological coding of prints in which a topology base coding system for recording and comparing minutiae used vector arrays generated from topologically based coding of fingerprints.

According to this invention, each fingerprint is scanned by a scanning system which typically includes a scanning 'line' which sweeps in a predetermined manner, such as horizontally, vertically or radially, from a prescribed origin for the scanning system utilized. When the scanning line moves over an irregularity (such as a ridge ending, bifurcation, etc.), the irregularity is recorded by the use of at least three coordinates: a type code (T) to particularly identify the irregularity, a measure (M) of the scanning line position when it hits the irregularity, and a ridge count (R) which is the number of ridges intersecting the scanning line, at that position, between the irregularity and a prescribed point on, or origin for, the scanning line. A collection of coordinates sets (T, M, R) uniquely specifies the topology of a fingerprint or any part thereof.

Thus, the present invention provides a system for recording a complete topological description of a fingerprint subject to the constraint that each characteristic be in a given database, recorded once and only once. To form a library or database of topological coordinate sets for search purposes, rolled or file prints or so-called ten-print cards, are utilized and a central point on the fingerprint, (such as a core) is selected as a center of a rotating ridge scan line. When the scan line is a rotating ridge scan line, the rotating ridge scan line, which preferably has a center of rotation or origin which is just off of any ridge, is relatively rotated in a predetermined scan direction, clockwise, for example, to different topological characteristics (sometimes called irregularities or minutiae) of the fingerprint for a plurality of ridge lines. A hexadecimal digital code representing the type (T) of irregularity (ridge-ending, bifurcation, etc.) and the angular coordinate ($\theta$) (which corresponds to the measure (M) of scanning line position) of the irregularity is recorded. In this case, the angular coordinate ($\theta$) is sufficient to specify the order in which the irregularities are passed over by the sweeping or rotating ridge scan line. The ridge count (R) between the characteristic or the irregularity and the central observation point specifies the ridge on which the irregularity occurs. Thus, a list of coordinates sets of the form (T, $\theta$, R) specifies the topology of any sector uniquely. A fourth coordinate is added to the coordinate set to correspond to the radial distance (D) measured from the central observation point. D and $\theta$ then specify the positions of the characteristics in space and the full coordinate set (T, $\theta$, R, D) gives a complete topological and spatial description of a fingerprint which only requires 4 bytes per irregularity.

Prints such as latent prints found at the scene of a crime (SOC) are coded according to the same topological coordinate scheme. Computerized searching of such a latent mark against a large established collection of file prints is then performed through reconstruction of the topology local to each characteristic followed by comparison of such localized topology.

Additionally, fast comparison of rolled prints can be conducted on the basis of extracted vectors.

Topological vector extraction is based in part on the system disclosed in my above referred to paper. The core of the fingerprint is centrally located at a reference point and a horizontal line is projected through the core to intersect ridge lines to each side of the centrally located reference point. In the case of an arch a vertical line is drawn through successive ridge summits. From the points of crossing of the ridges with the projected horizontal or vertical line, the ridges are traced to the first significant irregularity and a type code (T) is assigned to the irregularity and with the distance (D) from the reference line and these data are recorded in a predetermined order to constitute a topological vector for the print which then is recorded in a machine searchable database. Comparison of vectors take the form of a sequence of array operations. Comparison of good quality rolled prints is performed extremely rapidly on this basis.

BRIEF DESCRIPTION OF THE DRAWINGS

The above and other objects, advantages and features of the invention will be more apparent when considered with the following specification and accompanying drawings wherein:

FIG. 1(b) is a partial block diagram illustrating one form of image retrieval systems which can be used with the invention; FIG. 1(c) is a partial block diagram illustrating the detail of the topological coordinate extraction system.

FIG. 2(a) is a schematic block diagram of a second form of topological coordinate extractor (which is semi-automatic) incorporating the invention; FIG. 2(b) is a block diagram of an extractor of a second form of topological coordinates, where a different scanning pattern is being used.

FIG. 7 illustrates the ridge exploration event codes for use with vector extraction.

FIG. 10a is a pair of sample latent marks (approximately 5x) and, FIG. 10b are examples of a latent mark (left) and its matching file print (right) the numbers are to corresponding features, FIG. 11 generally illustrates the sweeping or scanning line coding scheme, FIG. 12(a) shows the radial irregularity centered lines with the "cut" vertically below the observation point.

DETAILED DESCRIPTION OF THE INVENTION

Figure 1A:
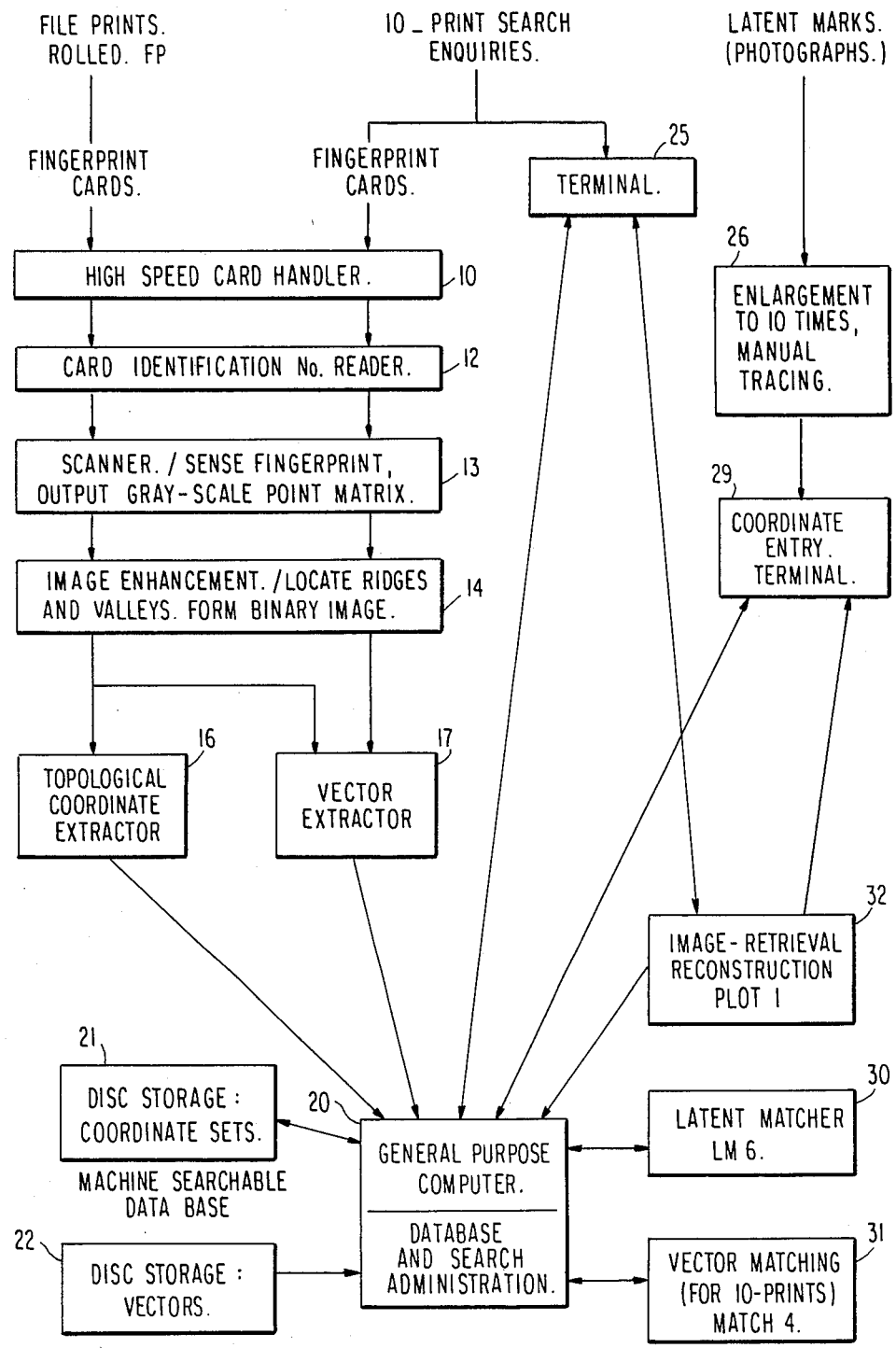
FIG. 1(a) is a block diagram of a fingerprint recognition and retrieval system incorporating the invention.

FIG. 1(a) is a functional block diagram of a fingerprint recognition and retrieval system. File prints (which are rolled prints from a fingerprint card base, such as national, regional or local fingerprint files) are fed in stacks to a high speed card handler 10 which may incorporate a card identification number reader 11, which may be an optical character reading device for reading the card identification number as well as reading such number or numbers printed on the card used to identify the subject or person whose fingerprints appear on the card. This card number can later be used by the central computer to associate the fingerprint data with the descriptive data (name, address, type of offense, etc. or other data related to the subject) that would be used in limiting the field of search.

The fingerprints on the cards are passed through a scanner 12 which senses each of the ten fingerprints on the card and outputs a gray-scale point matrix. Scanner 12 can be one of many types such as a "flying spot scanner" or a solid-state scanner or camera. It examines a series of small areas (pixels) of the fingerprint in turn and, as it encounters white (uninked), black (inked) or gray (partially inked) areas it produces a signal representing the blackness of each pixel. Thus, an array of such signals is formed representing a series of discrete samples covering the whole print area. In the art, this array is referred to as the "gray scale" image and each of the ten prints on a card are scanned in turn. The output from the gray scale scanner 12 is supplied to an image enhancer 14 which, likewise, is conventional in the art. Image enhancer 14 receives gray scale scanner output and forms it into a binary enhanced (black/white) image. In doing so, it compensates for variations in ink density over various portions of the print. The image enhancement process locates ridges and valleys and forms a binary image. Systems for determining whether each pixel is on a ridge (black) or in a valley (white) by reference to an examination of the apparent ridge flow direction in its vicinity and location of those apparent ridges, is well known in the art. In addition to formation of a binary black/white image, the image enhancement processor 14 also determines which parts of the print cannot be interpreted as ridge/valley structure (i.e. they are "unclear") and which parts display a corrupted (scarred) structure. In addition, it records and outputs the locations and extents of such areas. It can also output ridge direction data which shows the approximate direction of the general ridge flow at each point.

The output from the image enhancer 14 is supplied to a topological coordinate extractor 16 and a vector extractor 17. The topological coordinate extractor 16 determines from the ridge flow data (using existing techniques such as are disclosed in U.S. Pat. Nos. 3,560,928 and 4,156,230) whether or nor a central core exists in each pattern and will locate a position for a central observation point either close to the core (if there is one) or beneath the first upcurving ridge (in the case of an arch, which is the only pattern that does not have at least one core). If there is more than one core, then the one facing upwards will be selected. Having determined such a central observation point, then it will generate a set of coordinates of the form (T, M, R, D) for each irregularity in the binary image output from the image enhancement processor 14. Locations where ridges run into, or out of, "unclear" or "scarred" areas will be similarly recorded. The coordinate sets are as described later hereinafter. FIGS. 2(a), 2(b), 3, 4, 5, 12(a), 12(b) and 12(c) illustrate manually operated topological coordinate and vector extractors and will be described in detail hereafter.

Figure 6:
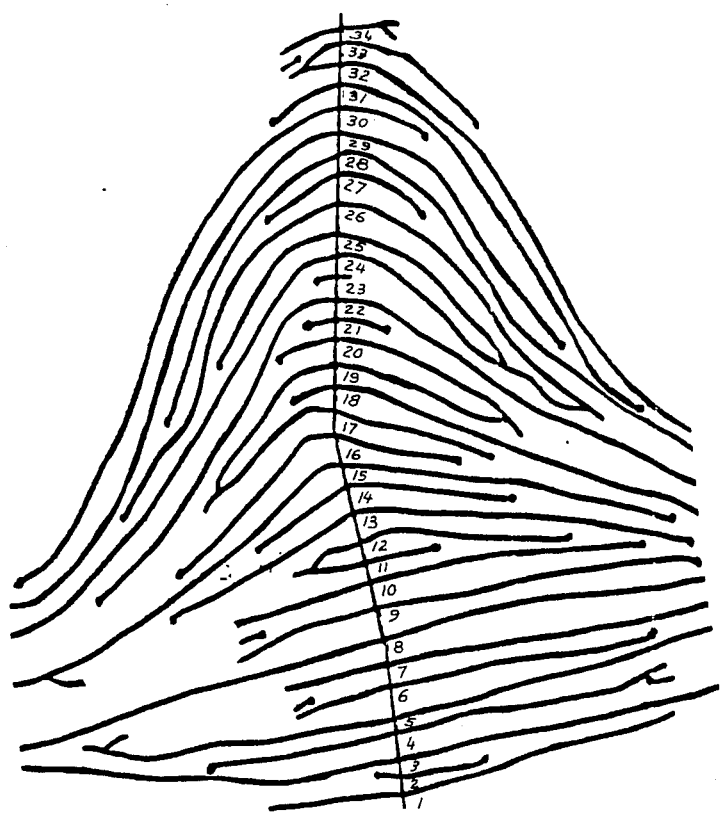
FIG. 6 shows the line placing for vector extraction from a plain arch.
Figures 8, 9:
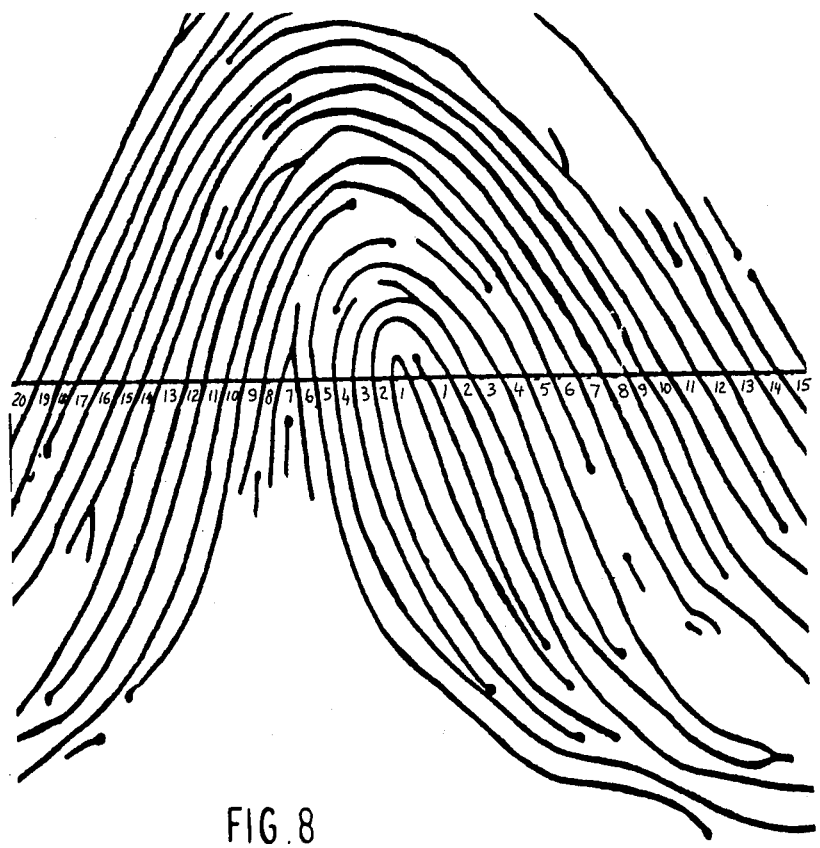
FIG. 8 shows the horizontal line placed on the ulnar loop on a ridge tracing for use with vector extraction.
FIG. 9 illustrates the 82 digit vector generated or extracted from the ridge tracing of FIG. 8.

The vector extractor 17 generates a topological code vector, of a length 62 to 82 digits, (as described more fully hereafter) together with associated distance measures. The imaginary generating lines are placed as shown in FIG. 8 if the pattern has a central core and as shown in FIG. 6 if it does not. The presence or absence of such a core is determined from the ridge direction data. A manually operated vector extraction system is disclosed in FIG. 3 and will be described more fully hereafter. The data from the topological coordinator extractor and/or the vector extractor are supplied to a general purpose digital computer 20 which stores the topological coordinate sets extracted by topological coordinate extractor 16 in a mass storage system such as a disc storage 21. The topological code vectors for each print extracted by vector extractor 17 is likewise supplied to the general purpose computer which stores this data in a further mass storage medium such as disc storage unit 22. These data storage devices hold the coordinate sets and extracted vectors in association with the card identifying numbers so that when being searched and a match is made, the card identifying number is associated with the topological coordinate set in storage unit 22.

Figure 17:
FIGS. 17 and 18 illustrates reconstructions without (FIG. 17) and with (FIG. 18) defaulted edge-topology.
Figure 18:
Figure 19:
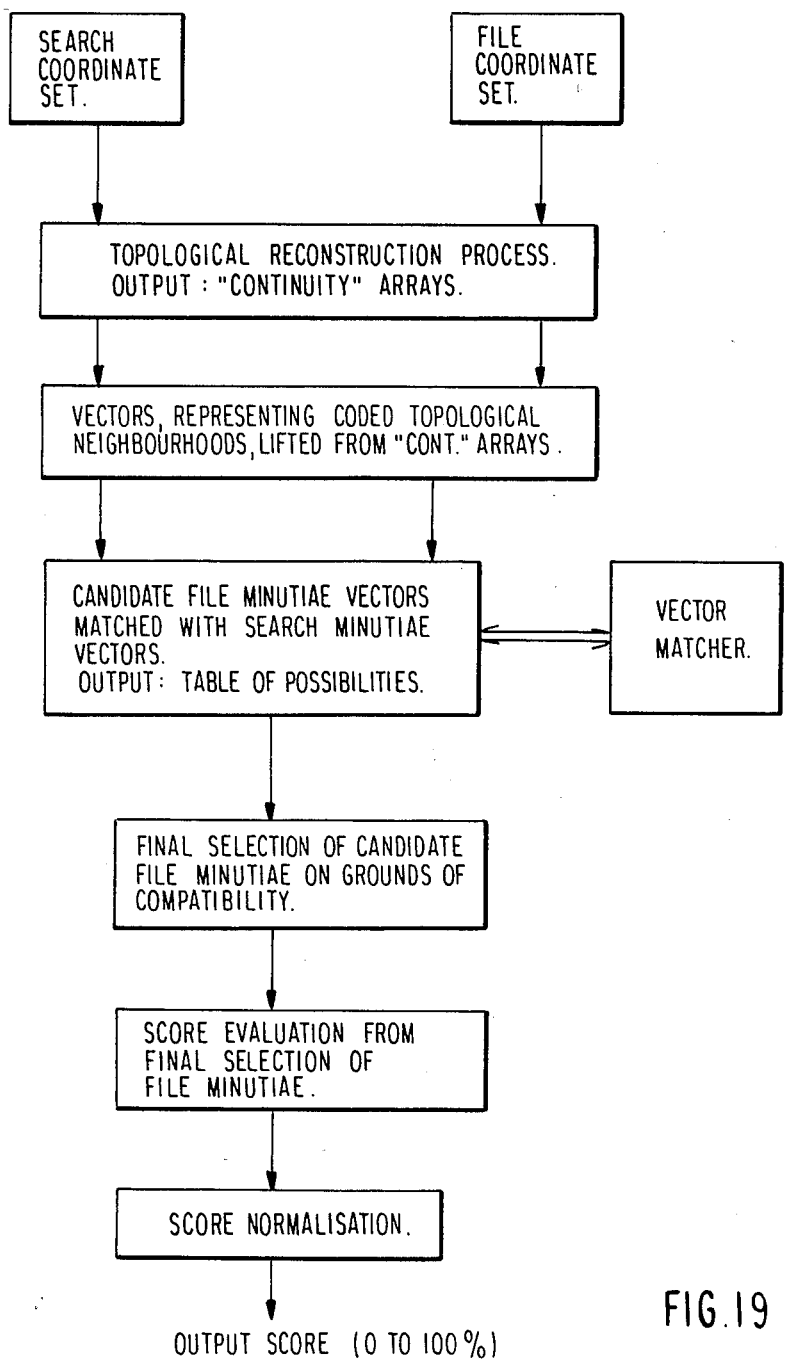
FIG. 19 is a flow diagram of the latent mark matcher program LM6 (appendix A)
Figure 20:
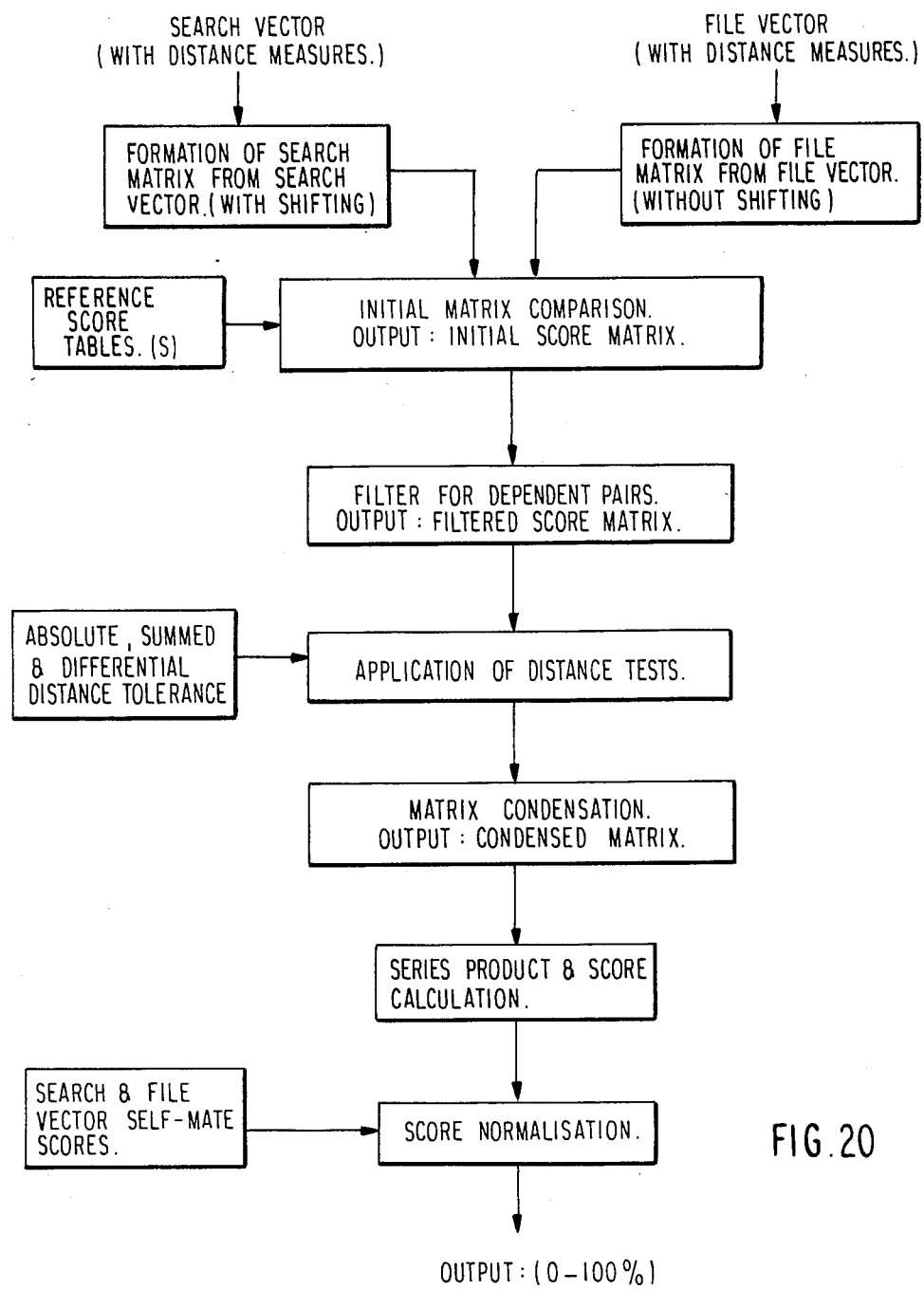
FIG. 20 is a flow diagram of the vector matching algorithm MATCH4 (appendix B)
Figure 21:
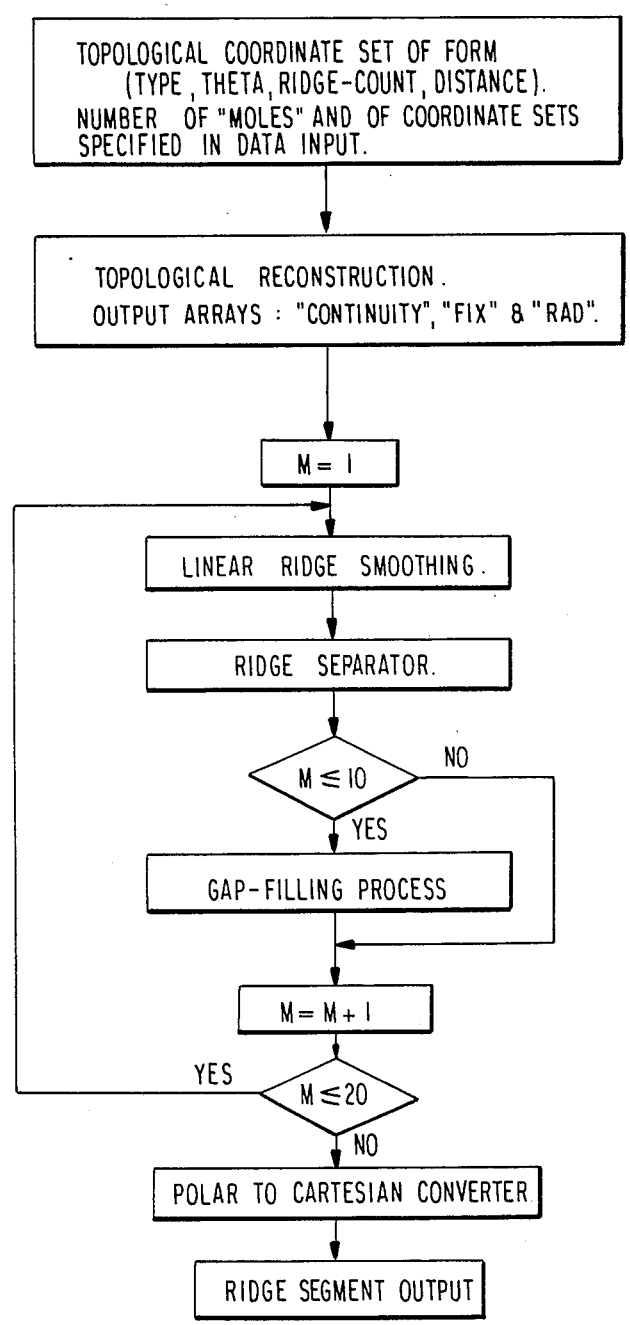
FIG. 21 is a flow diagram of the image retrieval through topological reconstruction algorithm, PLOT1 (appendix C).

One or more ten print search inquiry terminals 25 are provided so that an operator can access the central computer 20 and instruct it as to the extent and nature of a search required (i.e. restriction by reference to other descriptive data such as offense type, age, sex, race, or geographical data which may be pertinent to the inquiry). The terminal 25 incorporates a fine graphic display facility sufficient to show the operator any fingerprint reconstructions which the operator may request and which will be outputted from the image retrieval processor as described more fully hereafter. Latent marks such as disclosed in FIGS. 10a and 10b are first enlarged and a manual tracing is made at block 26. This unit provides the manual tracings for the latent inquiry terminal 29 which enables the latent examiner to enter the coordinate sets he has read manually and to initiate a search of the database 22. It incorporates a fine graphic display facility sufficient to show the operator any fingerprint reconstruction, such as shown in FIGS. 17 and 18 which the operator may request and which will be the output from the image retrieval processor.

The general purpose computer 20 handles the receipt and storage of all incoming data, administration of the databases, and performs searches of the databases either by passing coordinate sets to the latent matcher system 30 or by passing the extracted vectors to the vector matcher 31. In the case of ten-print inquiries, computer 20 will determine how many of the ten-prints available on the search card should be used (according to the priority or importance of the search) and combines the separate finger scores outputs from the vector matcher to give an overall score for each candidate file print. This computer 20 also displays results in the form of a list of top rank candidates from the database to the inquiry terminals 25 or 28 upon completion of a search. If a request is made for a fingerprint image reconstruction, the appropriate coordinate set is read from the data file and passed to the image-retrieval processor 30. The image-retrieval processor can be a parallel implementation of the image reconstruction program (PLOT 1) set forth in appendix C attached hereto. Its input will be a coordinate set which is passed to it by the central computer 20 when the request is made from an inquiry terminal 25 or 29. The output is a line segment picture (FIGS. 17 and 18) representing a reconstructed image of the fingerprint in question and it is displayed by the graphic facility of the terminal where the request is made. This program contains a sub-routine called "continuity" which effects the reconstruction of the topology of the print; it also contains three sub-routines called "smooth", "untangle" and "gap-fill" which perform linear smoothing operations by adjusting the paths of the ridges between characteristics. Other smoothing algorithms (such as the use of spline interpolation techniques) may be substituted for these three sub-routines.

The latent matcher 30 performs comparisons of two sets of coordinates sent to it by the central computer 20. It is preferably a parallel implementation of the latent matcher 30 which is set forth in appendix A. It returns a score to the central computer 20 which is a percentage in the range of 0 to 100 reflecting the similarity of the two prints represented by the two coordinate sets. The vector matching unit 31 compares vectors as directed by central computer 20 when a ten print search is underway and it uses the program attached hereto and identified as appendix B. The score returned is a percentage (a real number in the range 0 to 100) which reflects the similarity of the two prints represented by the two vectors.

IMAGE RETRIEVAL

In FIG. 1b, the gray scale point matrix from scanner 13 is fed via one side of selection switch SSW to compression processor 20CP and then stored as a computer compressed image in optical disk storage unit ODS to form a library of compressed print images. When it is desired to display a particular image, the image for any given print is retrieved from storage unit ODS for display at remote terminal 25. Instead of compressing a gray scale image, selection switch SSW can connect a skeletonized image to compression processor 20CP which is then stored in optical disk storage unit ODS. Image retrieval requires a decompression by decompression processor 20DP and the resulting image is displayed on the display at remote or local terminal 25. Finally, as will be described in detail later herein, topological reconstruction of the image for display can be performed and this requires significantly less storage space to produce fingerprint images at remote terminals with relatively small amounts of data transmission.

There follow detailed descriptions of the major sections of the invention, namely:

(1) Details of the method for deriving topological code vectors from rolled prints.

(2) Details of the algorithm MATCH4 (Appendix B) which is a series of array operations for comparing such vectors.

(3) Details of the topological coordinate scheme as it relates to file print coding.

(4) Details of the process of topological reconstruction from such coordinate sets, and the latent matching algorithm LM6.

The evolution of these systems is traced in great detail in the accompanying doc- ument entitled "Topological Coding of Single Fingerprints."

EXTRACTING THE TOPOLOGICAL CODE VECTORS

The coding is in two parts—1. Coding the topology. 2. Measuring the associated distance.

1. CODING THE TOPOLOGY.

Rules are established, dependent on the pattern type, for the superposition of a line on each print.

(a) LOOPS: By looking at the whole availabe print, and with particular reference to the first flexion crease and the directions of ridges which run close to it, estimate a 'horizontal' orientation for a straight line. ('Horizontal' means parallel to the apparent direction of the flexion crease.) Place a horizontal line through the loop core-centre, using the conventional rules for precise location of the core-point. (See FIG. 8.)

(b) ARCHES: Orient the print, again so that the flexion crease appears horizontal. Draw a flexible line vertically through successive summits of the ridges—as shown in FIG. 6. The line starts at the lowest visible ridge above the flexion crease and follows the 'summit' route to the top of the available picture.

(c) WHORLS & OTHER TYPES: Locate a 'core' using an adaptation of the rules for loops, and place a horizontal line as for a loop.

The placing of lines forms an ordered set of intersection points (where the line crosses a ridge), each one located on one of the ridges of the print.

Each point of intersection gives two 'directions' for topological exploration of that ridge: imagining oneself (just for a moment) to be a tiny insect capable of 'walking along a ridge'—then one could walk each ridge in each of two directions from the point of intersection, We stipulate that the walking (or exploration) will cease as soon as one of a number of specific 'events' is found.

Assignment of digital codes to the different possible ridge-exploration events leads to formation of a pair of digits for each point of intersection. Writing them down in order generates a digital vector of length equal to twice the number of points of intersection.

FIG. 7 shows the digital codes selected to correspond to possible ridge-exploration events. In each case the ridge being explored is marked with an arrow to show the direction of the exploration.

The digital codes take the form of hexadecimal integers, and are always processed as such. Storage space required for each one is therefore only 4 bits, making it possible to compress one pair of digits into one byte. Not all 16 hex-digits are used; 1, 9, D and E being 'spare'. 'F' is used for padding the vectors up to a certain length for storage in a standardized data format.

Codes 6 and 8 record events that do not actually occur on the ridge being explored. They record the start of a new ridge either on the immediate left or the immediate right of it. The main reason for their inclusion in the scheme is that they record the presence of ridge-endings which would otherwise be ignored by the coding process. (This is because the ridge-ending belongs to a ridge that does not have a point of intersection with the generating line.)

The allocation of particular digits to particular events is not quite arbitrary. The tendency of inking and pressure differences between successive impressions of a print to cause topological change is well known. Bifurcations will mutate to ridge-endings, and vice versa. In anticipation of this phenomenon the digital codes are selected in order that some sense of closeness is carried over to them. The extent of that closeness is only that event 3 is liable to change to or from either of events 2 or 4; likewise event 7 is liable to change to or from events 6 or 8.

TOPOLOGICAL VECTOR EXTRACTOR (FIGS. 3, 6, 8 AND 9)

Figure 3:
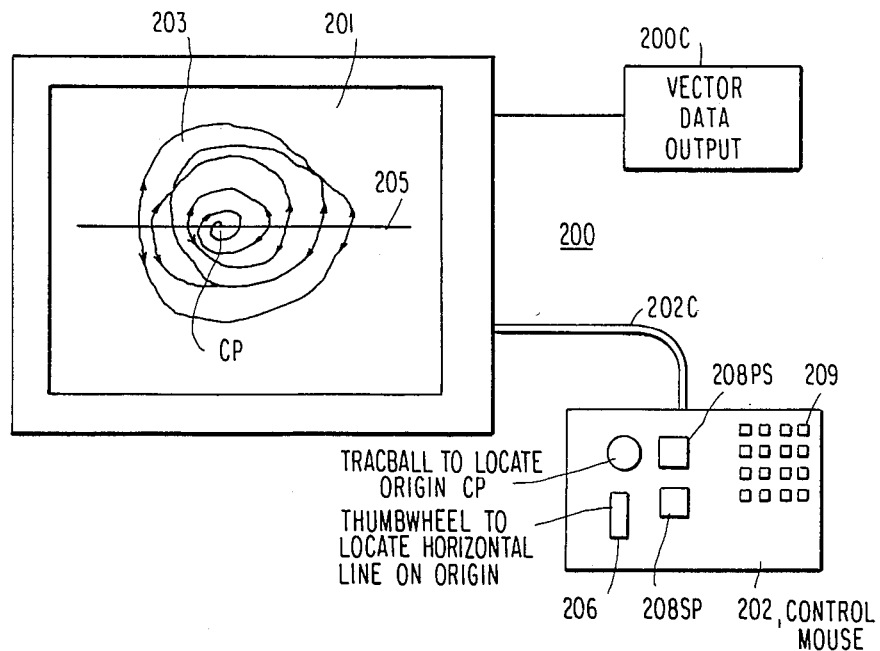
FIG. 3 is a schematic block diagram of a semi-automatic vector extractor incorporating the invention.
Figure 4:
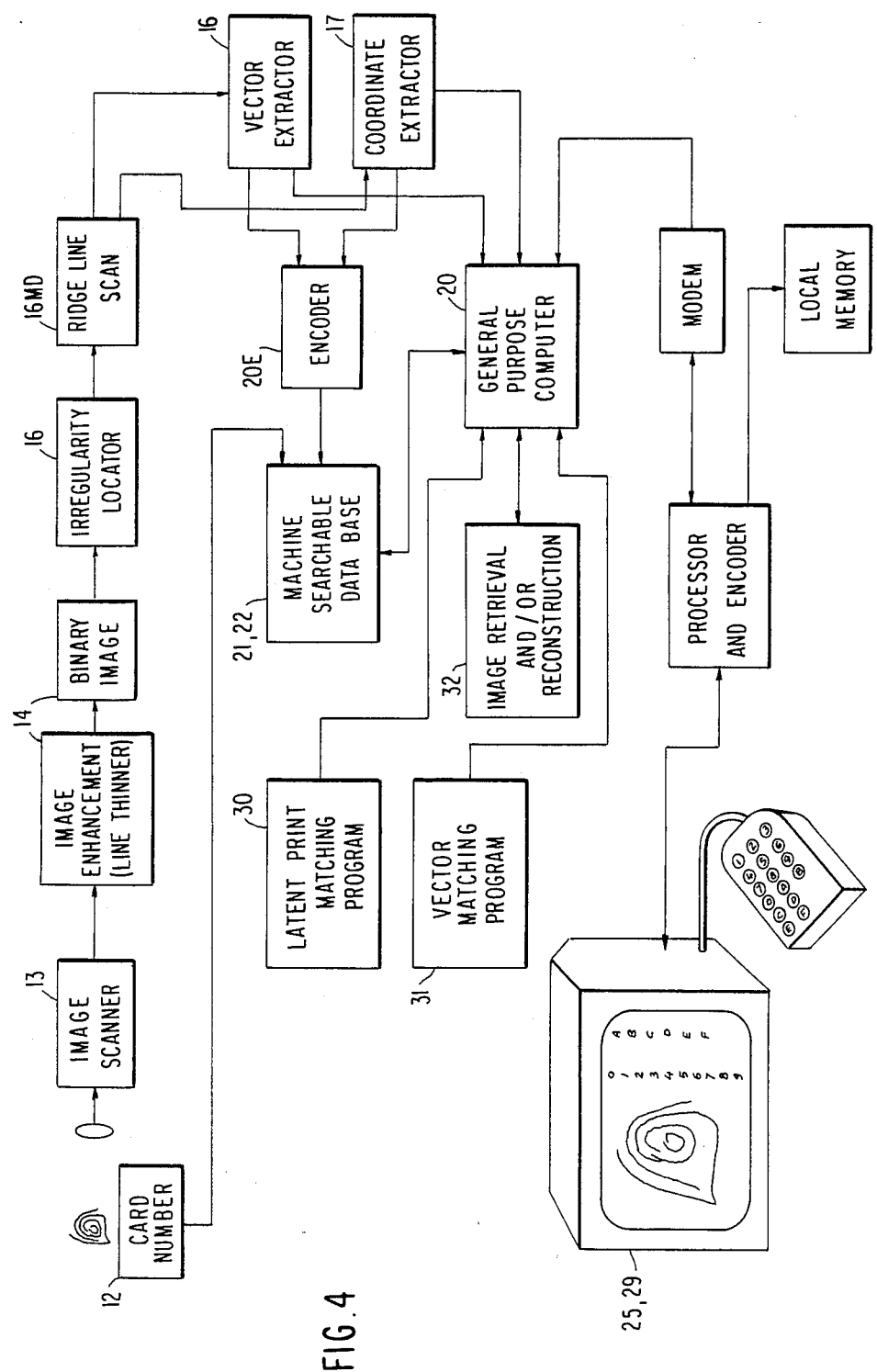
FIG. 4 is a further schematic block diagram of a fingerprint recognition and retrieval system incorporating the invention, with a remote enquiry station.

The topological vector extractor shown in FIG. 3 includes terminal 200 having a display 201 and a control console or 'mouse' 202 connected to terminal 200 by cable 202C. A fingerprint (or portion thereof) 203 is shown having a horizontal line 205 positionable by a thumb wheel control 206 to pass through a central portion CP of the print 203 and cross ridges in the print to the left and right of the central portion CP. At each point where the line 205 intersects or crosses a ridge, the ridge is tracked in both directions to where an irregularity is encountered. A track ball 207 is used to locate a cursor on the origin CP, and the cursor is moved from the line 205 along each ridge by the track ball 202. A start distance measure switch 208S is operated to indicate the start of distance measurement and a stop distance measure switch 208SP is operated to denote the positioning of the cursor on the irregularity. Where an irregularity is encountered, the measure of distance is entered as the distance of movement of the cursor from line 205 to the irregularity. Pushbutton array 209 is used to enter a code for the type (T) of irregularity encountered. The vector data can be outputted from terminal 200 by data coupler 200C to general purpose computer 20.

FIG. 8 shows the tracing of an ulnar loop generated by exploration from a horizontal line through the core. Points of intersection are shown numbered outwards from the core, and characteristics accessed are highlighted with a small 'blob'.

A standard length for digital vectors was set at 82 digits—that is, 41 pairs—of which 20 pairs represent up to 20 ridges on the left hand side of the core, one pair represents the ridge on which the core itself is located, and the other twenty pairs represent up to 20 ridges intersected on the right of the core. Whenever less than twenty ridges are intersected on the left or the right hand side of the core (which is usually the case) the 82 digit code is padded with 'F's, as mentioned above, to bring it up to the standard length. The padding is done at the extreme ends of the vector in such a way that the digit pair representing the core-ridge remains in the central position (i.e. the 21st digit pair).

The convention is established that the digit representing exploration along a ridge upwards from the line is to be written first (of the pair), and the digit representing exploration downwards along the same ridge is written second. Adhering to that convention, the 82 digit vector generated from the tracing referred to above (FIG. 8) is shown in FIG. 9. To facilitate interpretation, the intersection point numbers (from FIG. 8) are shown also, with their corresponding digit pairs. (These intersection point numbers are not normally recorded, and they form no part of the topological code.) Digit pairs are juxtaposed, and each pair separated from the next. It is important to remember that each digit pair is just that—a pair of digits; they should never be interpreted together as being one number.

2. MEASURING THE DISTANCE

The measuring scheme adopted is quick and simple. It gives one hexadecimal integer as a 'distance measure' for each hexadecimal event-code.

The distance is measured from each 'ridge event' to the generating line. The measuring is not 'as the crow flies' but rather "as the insect walks" (assuming that insects walk along ridges). Distances are measured along the relevant ridge from the intersection point on the generating line to the ridge-event.

The distance is measured (on a 10x enlargements) in centimeters, and is then rounded down to the nearest integer, and an upper bound of 15 imposed. On the actual print, therefore, the distance measures represent the distance, measured along ridges, from generating line to ridge-event, rounded down to the nearest millimeter. Thus the only possible distance measures are the integers 0, 1, 2, . . . 15.

If the ridge-event codes are any of the set 0, A or B then the corresponding distance measures are set to a default value of 15. These codes 0 ('out of sight'), A ('scarred tissue') and B ('unclear') cannot really have meaningful distance measures associated with them: all the other event codes can.

Restriction to hexadecimal distance measures does mean that an event code, together with its distance measure, can be stored in 1 byte of memory. The storage requirement for each print code is therefore 82 bytes.

Each print has one hexadecimal distance measure for every event code. A single print is thus represented by an array (size 82×2).

Although this description has specified that distances should be 'ridge-traced' it is not absolutely necessary, although desirable. The linear distance from each ridge-intersection point to each ridge-exploration event could be used instead. Similarly, the perpendicular distance from each ridge-exploration event to the generating line could be used instead.

The above description also suggests an array length of 82. System design constraints may determine some other length. but greatest accuracy is achieved when the length exceeds 62.

THE VECTOR COMPARISON ALGORITHM MATCH 4

There are ten distinct phases to this algorithm: two are preliminary and eight form the actual comparison process. Each will be described in turn.

Preliminary stage 1—fileset analysis

Fileset analysis is the first preliminary operation conducted by MATCH4 before any individual vector comparisons are made. It analyses the topological codes only (disregarding distance measures). The vectors stored within the fileset are of length 82 digits, representing up to 41 ridges. The 82 ridges (in order, from left to right) are divided up into ridge bands.

The ridge-band width for this analysis is a parameter of the programme. Let us suppose that this parameter (which will be called 'BANDWIDTH') is set at 5. Then, with vectors of length 82 digits, derived from 41 ridge intersection points, there will be 9 ridge bands. (These cover ridges 1–5, 6–10, 11–15, . . . 36–40, and 41–45 respectively. Ridges 42–45 do not 'exist', and so the ninth ridge band only contains the last (41st) pair of digits in each vector.)

Each ridge band is analysed separately, as are the two directions (upwards and downwards from the horizontal line). Simple code frequency analysis conducted on all the vectors stored in the fileset ultimately yields a real matrix P, of three dimensions thus:

$P(j,k,l)$:  $j = 0,15$  $j$ represents one of the hexadecimal 'event' codes.

:  $k = 1,9$  $k$ is the ridge-band number (numbered from left to right).

:  $l = 1,2$  $l$ shows one of two 'directions'.
($l = 1$ for 'upwards': i.e. first digit of a pair.)
($l = 2$ for 'downwards': i.e. 2nd digit of a pair.)

The combination of any value of k with a value of l specifies one of 18 possible 'ridge areas'. $P(j, k, l)$ is the proportion of codes in the (k, l) ridge area that had the value j.

Clearly $0 \leq P(j,k,l) \leq 1$ for all $(j,k,l)$. Also $\Sigma_j P(j,k,l) = $ 1.0, for any fixed pair $(k,l)$.

PRELIMINARY STAGE 2—SETTING UP THE SCORE-REFERENCE MATRIX

From the three dimensional frequency matrix P, a four dimensional Score-reference matrix, S, is constructed. S is to be regarded as a 'look-up table' of initial scores to be awarded during the vector comparison process.

H score $S(i, j, k, l)$ will be awarded initially when code i appears in the search vector opposite code j in the file vector, in corresponding (digit) positions which fall in the (k, l) ridge area. Again, this stage is not concerned with distance measures.

That score $S(i, j, k, l)$ is an indication of the value of such a coincidence in indicating that the search and file vectors under comparison are matched. It could also be regarded as a measure of the unlikelihood of that coincidence occurring by chance had the file vector been selected completely at random from the population of 'all fingerprints'.

The calculation of the matrix S is done according to these rules:

(a) For each i, j, k, l such that i=j and i, j∈{0, 2, 3, 4, 6, 7, 8, C} then $S(i, j, k, l) = \text{minimum}(\text{BOUND}, \text{INT}[10 \times -\log_{10} P(j, k, l)])$ where INT[ . . . ] means the integer part of [ . . . ] and BOUND is another parameter—it is an imposed upper bound on the values taken by elements of the matrix S. The factor 10 appears to avoid all the exact match scores being either 0 or 1. The inclusion of this factor gives a reasonable spread of exact match scores, based on code frequencies, despite the integer rounding. Typically these scores range from 1 to 15 or so.

These elements of S are the 'exact match' scores.

(b) For all i, j, k, l such that at least one of i and j is either 10, 11 or 12 (i.e. hexadecimal A, B or C), except for the case i=j=12, then:

$S(i, j, k, l) = 0.0$

These elements of S represent all the appearances (either in the file vector or in the search vector) of the codes for scarred or unclear areas, and for compounds.

(c) The phenomenon of topological mutation (the changing of ridge endings into bifurcations and vice versa) relates to the selection of event codes. The pairs of codes {(2, 3), (3, 4), (6, 7), (7, 8)} can be regarded as 'close matches' as they could be observed in corresponding positions within mated vectors as a result of topological mutations.

Consequently if the comparison algorithm is to recognise close matches as indications of a possible match (albeit not as strong an indication of this as exact matches would be) that policy can be effected by allocating positive values to the subset of S defined:

$(S(i, j, k, l)$ such that the unordered pair (i, j) belongs to the set of unordered pairs {(2, 3), (3, 4), (6, 7), (7, 8))}.

This set of elements within S are hereafter called the close match scores. For any particular (k, l) they will appear as entries in the (i, j) table which are just off the leading diagonal. The entries of the leading diagonal itself are the exact match scores.

(d) For all i, j, k, l not covered by one of the rules (a), (b) or (c) above:

S(i, j, k, l) = −1

The matrix S (when there are 9 ridge bands) could be regarded as 18 different comparison tables each one of which might typically appear as shown below. (Here the close match scores have been set to 2 and an upper bound of 15 applied. Also the exact match scores have been rounded to the nearest integer for ease of presentation.)

Table of S(i,j,k,l) for a fixed (k,l) with upper bound 15 and close match scores 2.

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 2 | −1 | −1 | −1 | −1 | −1 | −1 | −1 | −1 | −1 | 0 | 0 | 0 | −1 | −1 | −1 |
| 1 | −1 | −1 | −1 | −1 | −1 | −1 | −1 | −1 | −1 | −1 | −1 | −1 | −1 | −1 | −1 | −1 |
| 2 | −1 | −1 | 8 | 2 | −1 | −1 | −1 | −1 | −1 | −1 | 0 | 0 | 0 | −1 | −1 | −1 |
| 3 | −1 | −1 | 2 | 9 | 2 | −1 | −1 | −1 | −1 | −1 | 0 | 0 | 0 | −1 | −1 | −1 |
| 4 | −1 | −1 | −1 | 2 | 7 | −1 | −1 | −1 | −1 | −1 | 0 | 0 | 0 | −1 | −1 | −1 |
| 5 | −1 | −1 | −1 | −1 | −1 | 15 | −1 | −1 | −1 | −1 | 0 | 0 | 0 | −1 | −1 | −1 |
| 6 | −1 | −1 | −1 | −1 | −1 | −1 | 10 | 2 | −1 | −1 | 0 | 0 | 0 | −1 | −1 | −1 |
| 7 | −1 | −1 | −1 | −1 | −1 | −1 | 2 | 11 | 2 | −1 | 0 | 0 | 0 | −1 | −1 | −1 |
| 8 | −1 | −1 | −1 | −1 | −1 | −1 | −1 | 2 | 9 | −1 | 0 | 0 | 0 | −1 | −1 | −1 |
| 9 | −1 | −1 | −1 | −1 | −1 | −1 | −1 | −1 | −1 | −1 | −1 | −1 | −1 | −1 | −1 | −1 |
| A | 0 | −1 | 0 | 0 | 0 | 0 | 0 | 0 | 0 | −1 | 0 | 0 | 0 | −1 | −1 | −1 |
| B | 0 | −1 | 0 | 0 | 0 | 0 | 0 | 0 | 0 | −1 | 0 | 0 | 0 | −1 | −1 | −1 |
| C | 0 | −1 | 0 | 0 | 0 | 0 | 0 | 0 | 0 | −1 | 0 | 0 | 0 | −1 | −1 | −1 |
| D | −1 | −1 | −1 | −1 | −1 | −1 | −1 | −1 | −1 | −1 | −1 | −1 | −1 | −1 | −1 | −1 |
| E | −1 | −1 | −1 | −1 | −1 | −1 | −1 | −1 | −1 | −1 | −1 | −1 | −1 | −1 | −1 | −1 |
| F | −1 | −1 | −1 | −1 | −1 | −1 | −1 | −1 | −1 | −1 | −1 | −1 | −1 | −1 | −1 | −1 |

COMPARISON STAGE 1—FORMATION OF FILE AND SEARCH MATRICES

The vector comparison process itself begins with a file array (B(i): i=1, 82), a search array (A(i): i=1, 82) and the established score reference matrix S.

An important parameter not yet introduced is "MAXSHIFT". MAXSHIFT is the maximum number of ridge shifts (either to left or right) that is to be anticipated by the comparison algorithm. Such shifts are likely to have occurred as a result of distortion caused by core misplacement, appearance or disappearance of subsidiary ridges and line placement errors.

Let us suppose that up to 5 ridge shifts should be anticipated (i.e. MAXSHIFT=5). Then comparison of array A with array B will need to allow for relative shifting by up to five digit-pairs. This is accomplished by use of standard array processing techniques as follows:

(a) The topological vector portion of the search array A is used to construct the search matrix "C". C will have 82 columns and the number of rows will be given by [(2xMAXSHIFT)+1]. Each row will be a copy of the topological part of the array A, but the copy will be progressively shifted to the left or right by from 0 to MAXSHIFT digit pairs. The central row will be an exact copy of A. The too (first) row will show A shifted 5 digit pairs to the left; the second row . . . 4 digit pairs to the left; the bottom row . . . 5 digit pairs to the right. Some digits of A may be 'lost' off the ends of some of the rows—and gaps caused by the shifting are padded with pairs of 'F's.

(b) The file array B is used to create a file matrix, D, of identical dimensions to C. It is formed by faithful duplication of the topological part of the array B, without shifting, the appropriate number of times. Every row of D is an exact copy of the vector from B. No padding is needed, and no digits are lost from row ends.

COMPARISON STAGE 2—COMPARISON OF FILE AND SEARCH MATRICES

The search and file matrices, C and D, are then compared element by element, and the initial score matrix is formed as the result. The initial score matrix will be called E. E has the same dimensions as C and D.

For each value of r and s the element E(r, s) depends only on C(r, s) and D(r, s). Each element E(r, s) is evaluated by 'looking up' C(r, s) and D(r, s) in the score reference matrix S:

E(r, s) = S(i, j, k, l)

where
  i = C(r, s)
  j = D(r, s)
  (k, l) are determined by s.

k and l are picked, for each s, to represent the 'ridge-area' to which the 's'th element of a vector would belong. Thus k will increase from 1 to 9 as s varies from 1 to 82, and l will be 1 if s is odd, 2 if s is even. In other words C(r, s) and D(r, s) are 'looked up' in the 'book' of comparison tables called 'S'. The values (k, l) are evaluated (from s) just to make sure that the appropriate table is 'looked up'.

PROPERTIES OF THE INITIAL SCORE MATRIX

The feature of the initial score matrix E that begins to suggest whether or not vectors A and B are a matching pair is the presence (or absence) of horizontal strings of non-negative scores. Such a string within one row of E represents similarly placed rows within matrices C and D that were similar, or identical. Such strings, in turn, represent parts of the vectors A and B that were similar or identical. Where a high scoring continuously non-negative string occurs in the central row of E then vectors A and B are probably mates, and are correctly aligned. If such a high scoring string appears in one of the other rows of E, then A and B were probably mates, but incorrectly aligned (i.e. there had been some shifting error).

If, on the other hand, the matrix E appears to be a random scattering of scores with no discernible concentrations of non-negative scores, then it is likely that A and B were not mates.

The task facing the remainder of the algorithm is to calculate a single score which will show whether significant strings are present in the matrix E, or not—and thus provide an indication of whether A and B are mated vectors.

The methods used to do this are based on the idea of adding together all the digits of each continuously non-negative horizontal string within E. The scores allocated (S(r, s)) for each exact match (when F(r, s)=D(r, s)) are logarithms of measures of the unlikelihood of such coincidence occurring by chance. Consequently the sum of a continuous series is a measure of the unlikelihood of that whole series occurring by chance. Typically non-matches are unlikely to display any continuously non-negative series of length greater than 6 digits. Matches can produce such series of lengths up to 50 or 60 digits.

Anticipation of this 'adding together' was the origin of the rules used in setting up the score matrix S. The significance of scores of 0.0 (rule (b) in preliminary stage 2) is that their appearances within the initial score matrix E do nothing to the sum of a series, but they do preserve its continuity. Thus, appearance of scars, or inability to determine what does happen first during ridge exploration, is not given any significance in indicating a match—but it is not allowed to break up an otherwise continuous non-negative sequence that would be indicative of a match. Hence the 0.0 allocation to any comparison involving codes 'A' or 'B'. Comparisons involving code 'C' were also allocated scores of 0.0, because true compounds are very rare and what normally appears as a compound is usually an ambiguous characteristic of some other sort.

COMPARISON STAGE 3—APPLYING THE DISTANCE TESTS

During a print comparison the distance measures are used in the application of three different tests. All three tests are applied to the initial score matrix in such a way as to reduce (to $-1$) any positive initial scores that the distance measure tests indicate ought to be so reduced. This will occur if the distance measure tests show that the matched event codes (which gave that positive value) are from 'events' that are not roughly in the same area (spatially) of their respective prints.

ABSOLUTE DISTANCE TEST

Before the matching algorithm accepts an event code in a file print array as possibly being correctly matched with an event code in the search print array—it now has to ask not only 'are the event codes the same?', but also a number of questions relating to their distance measures. The first is called the absolute distance test:

'Is the distance between the generating line and the ridge-event adequately preserved? (i.e. is it preserved within a given tolerance)'.

The tolerance allowed becomes a parameter of the programme and is called the absolute distance tolerance (ADT).

DIFFERENTIAL DISTANCE TEST

If two events from adjacent ridges on the file print seem to match two events on adjacent ridges on the search print (where, in each case, both events lie on the same side of the generating line) then we should ask the question:

'Is the difference in their distance measures adequately preserved?'

The tolerance allowed in this test is another parameter, called the differential distance tolerance (DDT).

The difference between distance measures on adjacent ridges, looking in the same direction (i.e. the same side of the generating line) is a measure of the distance between the two events seen on those ridges—and is independent (except for rounding errors) of the exact position of the generating line. If this differential distance is not preserved then one, or other, of the two events cannot be correctly matched; they cannot both be right.

SUMMED DISTANCE TEST

If two events on the same ridge (i.e. both halves of a digit pair) seem to be matched from search to file print, then the sum of their distance measures should be preserved (within certain tolerance). That sum represents the total distance, along the relevant ridge, from one event to the other. The measures are added because the events are appearing on opposite sides of the generating line. Again, if this sum is not preserved then one event, or the other, is not correctly matched; they cannot both be.

The tolerance allowed in this case is called the summed distance tolerance (SDT).

HOW THE DISTANCE TESTS ARE APPLIED

The distance tests are applied as the first filtration step for the initial score matrix E—The manner of their application (briefly) is as follows:

(a) Absolute distance test: every positive element, E(r, s), of the initial score matrix E is derived by comparison of C(r, s) and D(r, s)—elements of the search and file matrices. We call the related distance measures C'(r, s) and D'(r, s) respectively.

The rule for the absolute distance test is:
If $|C'(r, s)-D'(r, s)| > ADT$ then change E(r, s) to $-1$.

(b) Differential distance test: whenever E(r, s) and E(r, s+2) are positive elements within E then
If $|(C'(r, s)-C'(r, s+2))-(D'(r, s)-D'(r, s+2))| > DDT$ then change one of E(r, s) and E(r, s+2) to $-1$. (Which of the two is reduced depends on other neighbouring elements within E.)

(c) Summed distance test: whenever E(r, 2s) and E(r, 2s−1) are both positive elements within E, then
If $|(C'(r, 2s)+C'(r, 2s-1)-(D'(r, 2s)+D'(r, 2s-1))| > SDT$ then one of E(r, 2s) and E(r, 2s−1) is reduced to $-1$. (In this case the largest of the two is reduced.)

COMPARISON STAGE 4—FILTERING FOR DEPENDENT PAIRS

The repetition (from the search vector to the file vector) of a dependent pair of digits is less significant in indicating a possible match than independent repetitions of those two codes would have been. (A dependent pair occurs whenever the same characteristic is observed during the exploration of two adjacent ridges.) There may then be scores E(r, s) and E(r, s+2) within the matrix E that form part of a continuously non-negative series, but whose appearance stems from repetition of a dependent pair of codes. Whenever such scores occur, their sum [E(r, s)+E(r, s+2)] is more weighty than is appropriate in view of that dependence.

The matrix E is therefore filtered, and the filtered score matrix (F) created. F has exactly the same dimensions as E, D and C. The filtering step involves a reduction of scores stemming from repetitions of dependent code-pairs. It is accomplished by reference to the matrices C and D (to identify exactly where such pairs appeared in both).

The rule for score reduction is wherever E(r, s) and E(r, s+2) are exact-match scores derived from a dependent pair then:

F(r, s)=min(E(r, s), E(r, s+2))

F(r, s+2)=2.0

Elsewhere F(r, s)=E(r, s).

This reduction of scores gives a more reasonable weighting to the scores derived from dependent pairs, in the light of the results of the analysis on pair dependency. The step typically reduces about 2 entries per row of the matrix E.

COMPARISON STAGE 5—CONDENSING DIGIT PAIRS TO A SINGLE SCORE

Careful examination of a large number of filtered score matrices derived from mated vector pairs revealed that the fairly long continuously non-negative strings were not the most telling feature of the matrices; as well as revealing these completely non-negative strings they also exhibited much longer mostly non-negative strings. These longer strings, even though they were interrupted by isolated $-1$'s, seemed to be a better indication of match or mismatch by their presence or absence.

Often one digit of a pair (e.g. the 2nd digit) would be non-negative for several successive digit pairs, while the other digit of each pair scored $-1$. This will happen whenever the ridge pattern on one side of the generating line is well preserved, whilst being corrupted on the other side.

Prior to product evaluation the matrix F is therefore condensed into a matrix G (which has the same number of rows, but only half as many columns) in a manner which moves the emphasis onto the much longer mostly non-negative strings.

The condensing rule applied in MATCH4 is:

$$G(r,s) = \begin{cases} -1 & \text{if } F(r, 2s-1) \text{ and } F(r, 2s) \text{ are both } -1; \\ \text{Maximum } (F(r, 2s-1), F(r, 2s)) & \text{if one, and only one, is non-negative;} \\ F(r, 2s-1) + F(r, 2s) & \text{if both are non-negative.} \end{cases}$$

Thus isolated $-1$'s cease to break up the long series that result from mated vectors. The sums of these long series from matches are expected to far outweigh the sums of any continuously non-negative series which occur by chance (i.e. from a vector mismatch).

COMPARISON STAGE 6—'HOPPING' IN THE CONDENSED MATRIX

Final score evaluation in MATCH4 depends on the single highest-scoring series found within the condensed matrix. One possible effect of this is that some matches may have produced very long strings which were broken up by isolated negative entries or ridge-shifts.

These string breaks may have occurred as a result of two topological mutations (one on either side of the generating line) that just happened to affect the same ridge; that would cause an isolated negative entry in an otherwise continuously non-negative string in the condensed matrix. Alternatively ridge-shifting (with its variety of causes) may have occurred; this will break the string as a result of inclusion or deletion of a digit pair from one of the vectors under comparison. The result will be that part of the string in the condensed matrix is displaced either to the row above, or to the row below (as shown here).

| Part of a condensed matrix showing a suitable 'hopping' place. | | | | | | | | | | | | | | | |
|---|---|---|---|---|---|---|---|---|---|---|---|---|---|---|---|
| ... | −1 | 1 | −1 | −1 | −1 | 1 | 2 | −1 | −1 | 0 | 0 | −1 | −1 | −1 | 0 ... |
| ... | 0 | 2 | 5 | 6 | −1 | −1 | 2 | −1 | 0 | 0 | −1 | 0 | −1 | −1 | −1 ... |
| ... | 75 | 30 | 50 | 10 | 5 | 6 | 45 | 30 | 5 | 3 | −1 | 0 | −1 | −1 | −1 ... |
| ... | −1 | 10 | −1 | −1 | −1 | 3 | 0 | −1 | 2 | −1 | −1 | 26 | 75 | 30 | 11 ... |
| ... | 1 | 0 | 3 | 4 | −1 | −1 | 2 | 1 | 0 | −1 | −1 | −1 | 0 | 0 | −1 ... |

The algorithm is designed to recognise this phenomenon, and to put these broken strings back together again (i.e. to evaluate their sums as if they had not been broken). A parameter "HOPS" is used, which indicates the maximum number of breaks which can be overlooked in evaluation of any one series score.

The score evaluation then finds the highest scoring string that can be found in the condensed matrix if up to HOPS number of breaks (of specified kind) can be ignored in each string.

The parameter is called "HOPS" because, in effect, the programme is allowed to hop from the right hand end of a series onto another point where that string is thought to be continuing. The permissible hops in the condensed matrix G are from any point g(r, s) to any one of these three points:

(a) g(r, s+2): this simply bypasses an isolated negative element in an otherwise continuously non-negative series.

(b) g(r+1, s+2) or g(r−1, s+1): these are the hops required to repair a string break caused by insertion or deletion of one digit pair from the search or file vector. (To see why these particular hops are appropriate one must study the effect of ridge shifting on the staggered search matrix C.)

These three particular hops are not the only ones that could have been allowed; hopping from g(r,s) to either of g(r+1, s+3) or g(r−1, s+2) can be useful in repairing breaks caused when the generating line passes the wrong side of a bifurcation. The selection of the three described above, however, has been found to be the most effective selection in aiding match scores without unnecessarily aiding mismatch scores.

These three different types of hop can be combined in any one string—although compounding hops simultaneously to make longer hops is not allowed! If, for example, HOPS=5, then the final score should represent the sum of the highest scoring string that can be found in the condensed matrix G, allowing up to five different hops per string, any one of which can be of any one of the three types described.

The calculation of such scores is accomplished by a further series of simple array operations. They are not described here. It is worth pointing out that the number of operations required for this step increases linearly with the value of HOPS, and not exponentially as might have been expected. In the algorithm for MATCH4 the hopping section is one single iterative loop, which is repeated HOPS times. It is bypassed whenever HOPS is set at zero.

COMPARISON STAGE 7—PRODUCT CALCULATION AND SCORE FORMULATION

Formulating a score from the condensed matrix G provides a further variety of options. Score evaluation is made dependent on the single highest-scoring series in the condensed matrix rather than on a combination of all the different string sums. The best series invariably scored so much higher than all the others that it rendered them almost insignificant. Ignoring strings other than the best one obviates the need to take antilogs, add, and then reconvert to logs.

The score thus obtained is logarithmic in nature.

COMPARISON STAGE 8—SCORE NORMALIZATION PROCEDURE

Examination of the lower match scores from MATCH4 showed that they were often produced when the search prints had been of relatively low quality: some were badly scarred (producing many 'A's in their vectors) and others were not clear in parts (producing many 'B's). With high proportions of 'A's and 'B's present—and perhaps with a high proportion of ridges running 'out of sight'—large scores were just not possible, even if that vector had been faithfully reproduced within the file set.

The intention of score-normalization was to adjust scores from each comparison according to the amount of, or lack of, good information in both the search and file prints. The justification for such a procedure lies in this argument: if a search vector contains little information and a large part of it is found in a file vector, then this may be just as significant (in indicating a possible match) as had the search vector had plenty of information, only a little of which had appeared in the file vector. A mediocre score from a poor print is better than a mediocre score from a good print.

The method used in MATCH4 was to compare the search and file vectors each with itself (using the matching algorithm) and see what scores were obtained. Those scores are a very meaningful indication of the quality (i.e. rarity) and quantity of information in the search and file vectors. They represent the sum of one continuous string in the condensed matrix which covers the whole length of the vectors. They are for each, the perfect score. They are the maximum that could possibly be achieved by any vector compared to them. This would not need to be done for the file vector every time a search was conducted; each file vector would have its self-mate score calculated just once when it was introduced to the collection; the self-mate score would then be stored along with the file vector, and it would be referenced each time that file vector was used in comparison. A file vector's self-mate score would have to be recalculated only when the scoring system, for that file, was reappraised by a new fileset analysis.

Suppose there were n vectors in the file—called $B_1 \ldots B_n$. Suppose perfect scores obtained for each by self-matching were called $R_i$, $i=1, n$. Suppose, further, that a particular search vector $A_j$ gave a perfect self-match score of $Q_j$ and that $A_j$ compared with $B_i$ gave a raw score (i.e. not normalized in any way) of $T_{ij}$.

Then the normalization used gives a final score of:

$$\frac{T_{ij} \times 100}{\sqrt{Q_j \times R_i}}$$

This formula gives final percentage scores. Scores thus normalized appear as real numbers in the range 0 to 100. Real numbers are only used at this very last stage of the comparison process. The raw score (before normalization) was an integer.

TOPOLOGICAL COORDINATE SYSTEMS

For the purpose of being able to search a large file for a fingerprint resembling a given fragmentary (or 'latent') scene-of-crime mark, a system for recording a complete topological description of a fingerprint, or of any part thereof, is needed.

In its most general form the system designed records the topological irregularities as a series of small changes in what is otherwise assumed to be a smooth laminar ridge-flow pattern. A 'sweeping line' or 'scanning' system, shown generally in FIG. 11, is used, whereby a scanning line SL moves across the fingerprint in a predetermined manner. Whenever it passes over an irregularity (which may either be a 'characteristic' or some other type of irregularity such as a ridge coming into sight, or going out of sight), the irregularity is recorded by the use of 3 coordinates:

(1) a type code (T) to show which type of irregularity it is.

(2) a measure (M) of the scanning line position when it hits the irregularity.

(3) a ridge count (R), which is the number of ridges intersecting the scanning line, at that position, between the irregularity and some predetermined point on the scanning line.

A collection of coordinate sets of the form (T, M, R) specifies the topology of a fingerprint (or any part thereof) uniquely. A fourth coordinate (D) may be added—which will record the actual linear distance between the irregularity and a predetermined point on the scanning line (which may or may not be the same point as that used in determining the ridge count). Then it will be seen that (D) and (M) together are sufficient to specify the spatial position of each irregularity. Thus coordinate sets of the form (T, M, R, D) give a complete topological and spatial description of the fingerprint scanned.

Figure 12B:
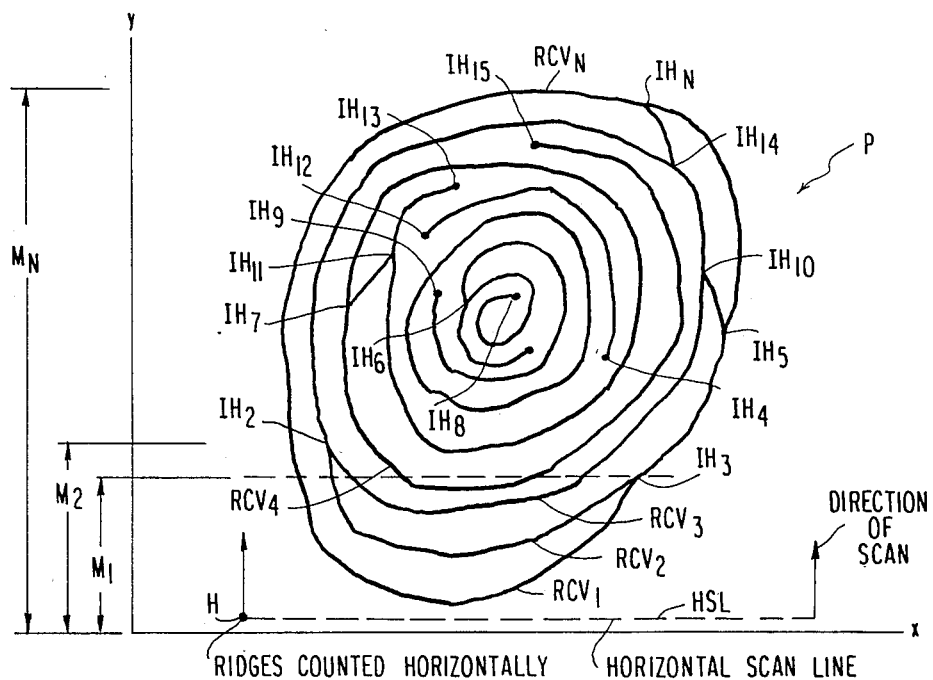
FIG. 12(b) shows a horizontal scan line which is moved relatively vertically over the print.
Figure 12C:
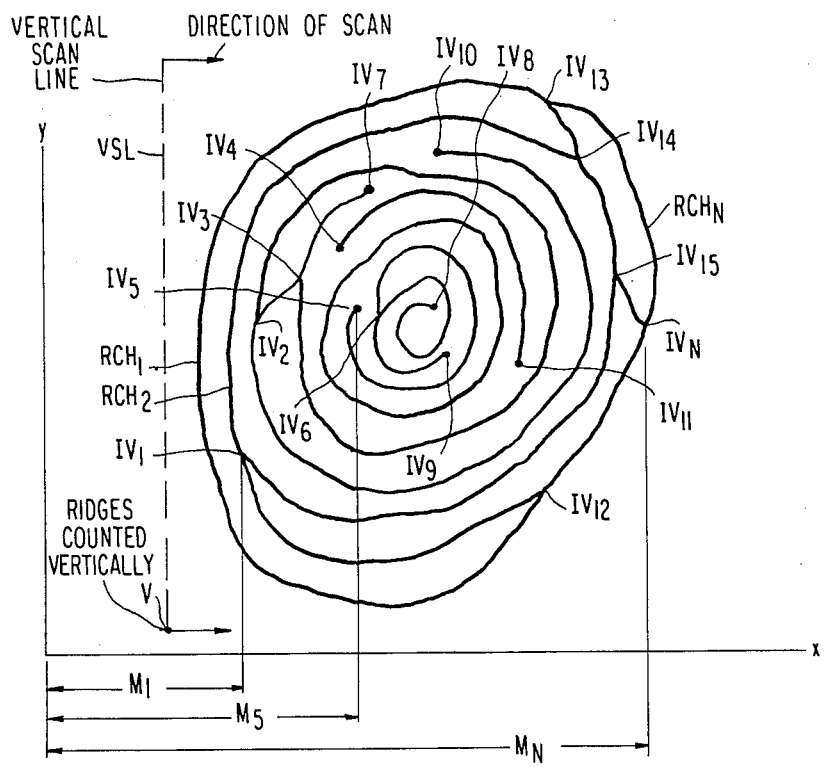
FIG. 12(c) shows a vertical scan line which is moved relatively horizontally over the print.

Such scanning systems could well take the form of a vertical line scanning horizontally across the fingerprint as shown in FIG. 12(c). (In which case (M) would measure the horizontal distance moved by a scanning line, and ridge counts could be made using a point on the scanning line which was always below the entire visible fingerprint. (D) is then the vertical height, making the pair (M, D) analogous to cartesian coordinate pairs.) Similarity, it could take the form of a horizontal line scanning vertically as shown in FIG. 12(b). The system only requires that a scanning pattern be established, and that the coordinate (M) be used as a measure of how far the scan has progressed.

The particular scanning system selected as most suitable for use with fingerprints is the radial scanning line system, where the scanning line is pivoted at a selected (fixed) point on the print, and (M) takes the form of an angular measure ($\theta$), where ($\theta$) is the angle between the position of the scanning line and some fixed predetermined direction. The 'pivot' point, in this case, is used as the predetermined point for measuring ridge counts (R), and for recording the distances (D) in the four coordinate system. The pair (D, $\theta$) therefore becomes analogous to polar coordinates. The scanning pattern selected is simply a clockwise sweep of the pivoted radial scanning line.

TOPOLOGICAL COORDINATE SET EXTRACTION (FIGS. 2, 2(a), 2(b), 5, 11, 12(a), 12(b) and 12(c))

The topological coordinate set extractor shown in FIG. 2(a) has a split display screen 100, the upper screen 100U displaying the output from scanner 13 of FIG. 1, and a lower screen portion 100L which displays the enhanced or thinned image from image enhancement unit 14 of FIG. 1. The gray scale image in display 100U is used to allow the operation to locate voids, scars, discontinuities, and a count is made of the ridges running into and out of voids, scars, discontinuities, etc.

Into this embodiment, scanning of the enhanced displayed fingerprint 101E is by a rotating ridge scan line 102 which begins its scan of print 101E from a predetermined scan start position or 'cut' 102S and rotates in a predetermined scan direction such as clockwise (see FIG. 12). The origin or observation point 104 is the center of rotation of scan line 101E and is shiftable by track ball 105 in controller 106, and as noted above, preferably has the center of rotation or observation point 104 located just off of any ridge. The right side 100R of display 100 may be used together with the thumbwheel cursor controls 105 and 106 to cause a relative rotation of the scan line 101E, and provide a measure of the angular displacement ($\theta$). Movement of a cursor point to the characteristic being coded will give a measure of the radial distance which can be calculated when a key on the key pad or pushbutton array 107 is depressed.

Figure 5A:
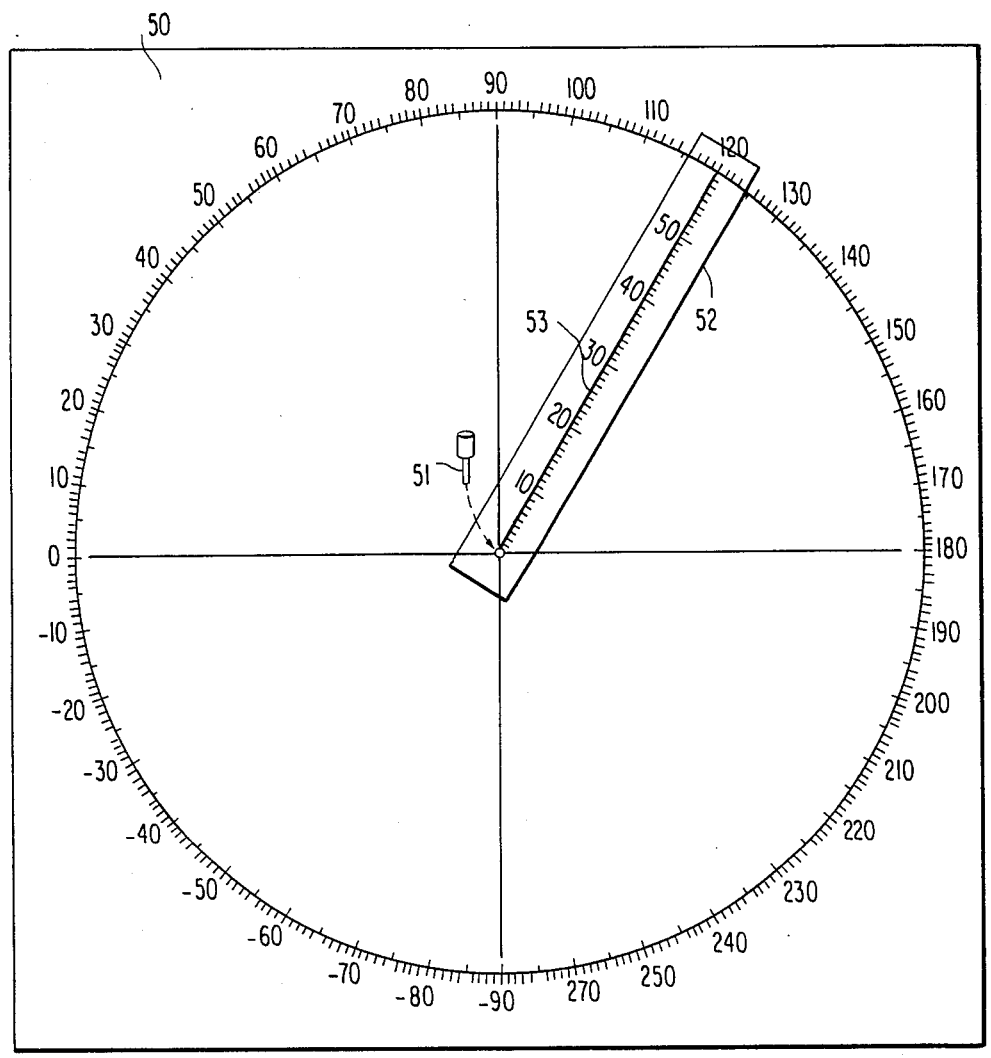
FIG. 5a illustrates a device for manually reading topological coordinate sets and FIG. 5b illustrates the device of FIG. 5a in use with a print therein.
Figure 5B:
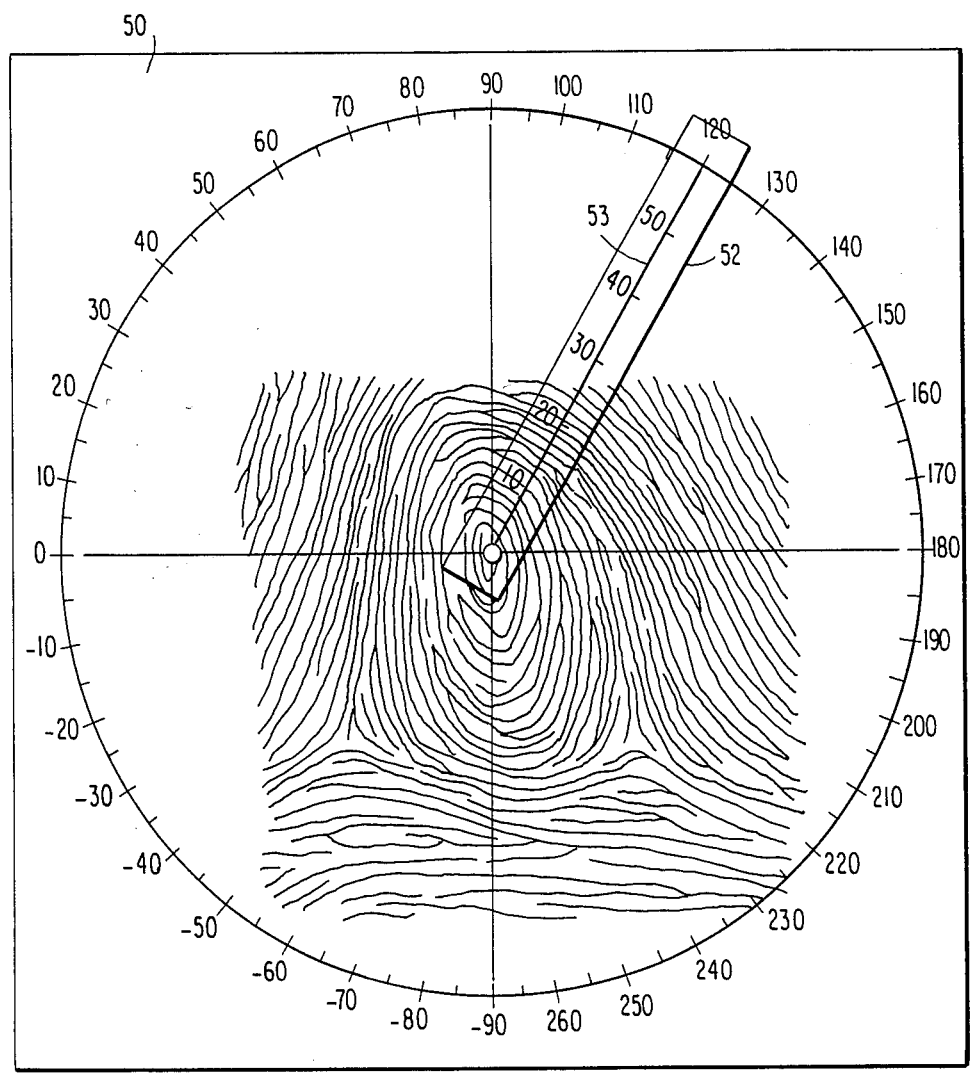

Thus, the origin of ridge scan line 102 is located at a central observation point 104 located just off of a ridge (see FIG. 12 and FIG. 5(b)) by rotating track ball 105, and thumbwheel 105 is turned to cause a relative rotation of the scan line 102 in a predetermined direction (clockwise, for example) to the first irregularity (which may be the ridge bifurcation indicated as I in FIG. 12(a)). The movement of thumbwheel 105 is a measure of the angle ($\theta$) swept by the scan line 102 to the irregularity and the number of ridges crossed by the scan line from the central observation point to the irregularity which, in FIG. 12, is five (5). The count can be done by the operator or automatically. the automatic ridge count or the manual ridge count may be used by actuation of the override ridge count switch 108. Pushbutton array 107 is used to enter 1 ) the radial distance (D), 2) ridge count (R), 3) angle ($\theta$) of the scanning ridge line 102 relative to the start or cut position 102S and 4) the type code (T). These parameters are displayed in the right hand display portion 100R.

The horizontal and vertical line scan system shown in FIGS. 12(b) and 12(c) may be implemented using a topological coordinate extractor shown in FIG. 2(b) which, except for the use of horizontal and/or vertical scanning lines, is similar to FIG. 2(a). As in FIG. 2(a), a split screen 100' uses the upper screen 100U' to display the gray scale image to allow the operator to locate voids, scars, discontinuities, and obtain a count of ridges running into and out of the voids, scars, etc. The lower portion 100L' of the display 100' displays the thinned or enhanced image of the print from image enhancement unit 14 of FIG. 1. The apparatus of FIG. 2(b) provides the user with the choice of two (or more since the radial scan feature of FIG. 2(a) can easily be accomodated in this unit) scan lines, horizontal or vertical which may be implemented automatically under computer control to perform the scanning functions illustrated in FIGS. 12(b) and 12(c).

The horizontal scan line HSL is activated by switch HC and the vertical scan line VSL is activated by switch VC. In each case, the scan line is moved across the print image (horizontally for vertical scan line VSL or vertically) for horizontal scan line HSL) by scan thumbwheel STW. Points of tangency are 'recurves' (labeled RCV or RCH in FIGS. 12(b) and 12(c), respectively) which are found wherever ridges are tangential with the scanning line. They are treated as irregularities and used for topological reconstruction purposes, either as preliminary to matching or pictorial reconstruction. Movement of a cursor from a prescribed origin "V" or "H" to a particular irregularity (or recurve) can be performed by cursor thumbwheel controller CTW. A code type is entered on pushbutton keyboard CKB. As the cursor is moved from the origin to the irregularity (IH and RCH of FIGS. 12(b) or IV and RCV of FIG. 12(c)), the number of ridges intersected by the scanning line and the predetermined point ("V" or "H") is recorded automatically along with a measure (M) of the scanning line position when it meets the irregularity. As noted earlier, the actual linear distance between the irregularity and the point on the scanning line may be used to provide a fourth coordinate (D) which may be added information recorded concerning the irregularity. (When (M) is measured on the X-axis, (D) can be measured on the Y-axis.

In FIG. 1c, there is illustrated a generalized block diagram of a topological coordinate set extractor system as an expansion on the block diagram of FIG. 1a. After the image of the print has been enhanced by image enhancement unit 14, the enhanced image is supplied to topological coordinate extractor 16 which includes minutiae detector 16MD, which is standard. Each detected minutiae is assigned a type code (T) by type code generator 16G which type code is supplied to coordinate set processor 20CS in general purpose computer 20. When the horizontal scan line HSL (FIG. 12b) is moved vertically, the scan locating data (M) of each successive characteristic is forwarded by detector 16MD to coordinate set processor 20CS. In regards to FIG. 12a, the angle ($\theta$) constitutes the scan location data (M). In FIG. 12b and FIG. 12c, the distance from the Y-axis or the X-coordinate constitutes (M). Any blurs such as scars or voids found by scar/void detector 16V (by virtue of the absence of descernible ridge lines in a given area). When any scan line passes through a detected void or scar area, no ridges are counted wwithin that region. The points where ridges run into, or out of, such a region are recorded as irregularities.

As noted in FIG. 1c, ridge counter 16R counts ridges from the central observation point 104 in the radial scan system (FIG. 2a) or from selected observation points V or H (FIGS. 2b, 12b and 12c).

Distance calculator 16DC provides the distance measurement (D). In regard to FIG. 12a, the distance from the central observation point 104 to the irregularity is the distance (D) along the radial scan line to the irregularity as computed by a simple arithmetic operation on the spatial coordinates X, Y; and in FIG. 12b and FIG. 12c, this is simply constituted by the X or Y coordinate for the minutiae position. In some cases it may be desirable to use more than one scan line, such as both horizontal and vertical scan lines to obtain more data, and obviously, the scan line need not be horizontal or vertical.

The methods for file print coding, latent mark coding, topological reconstruction and print comparison based on the particular selected scanning line system (radial scanning) will now be explained in turn.

COORDINATE SCHEME: FILE PRINT CODING—RADIAL SCANNING

A central observation point is selected to be adjacent to the core in the case of loops and whorls, and at the base of the up-curve (the point at which a "summit line" can begin to be seen) on arches. It is preferred that the observation point be placed in a valley rather than on a ridge so as to give unambiguous ridge counts in every direction.

All of the irregularities are then recorded by sets of topological coordinates of the form $(T, \theta, R, D)$. The type of irregularity is shown by a single hexadecimal digit—and the allocation of digits is closely related to the allocation already in use for ridge-exploration events. The list of possible irregularities, with their hexadecimal codes is given here. The descriptions can best be understood clearly if you think of these irregularities as being passed over by a pivoted radial line which is sweeping in a clockwise direction.

TABLE OF IRREGULARITY TYPES

Code 0—ridge runs out of sight.
Code 1—ridge comes into sight.
Code 2—bifurcation facing anticlockwise.
Code 3—ridge ending.
Code 4—ridge recurves with the effect of losing two ridges.
Code 5—ridge recurves with the effect of gaining two ridges.
Code 6—facing ridge ending (i.e. facing in the opposite direction to a '3'.)
Code 7—bifurcation ahead (i.e. a'2' reversed).
Code A—ridge runs into scarred tissue.
Code B—ridge runs into an unclear area.
Code C—compound characteristic (2 ridges in, and 2 ridges out).
Code D—ridge emerges from scarred tissue ('A' reversed).
Code E—ridge emerges from unclear area. ('B' reversed).

LATENT SEARCHING: TOPOLOGICAL COORDINATE SYSTEMS

The most desirable latent data form is a complete and objective description of the latent tracing. The tracing process itself still is, and always will be, substantially subjective—but it ought to be the last stage requiring subjective judgement. A set of topological coordinates of the form $(T, \theta, R, D)$, (showing type, angular orientation, ridge-count and distance) provides a complete topological and spatial description, and it therefore becomes the basis for latent data entry. The latent mark data can then be presented in much the same form as the file print data.

The manual latent data preparation process is fairly simple: first the mark is traced (enlarged to 10x magnification). Then the position of the central observation point is guessed by the fingerprint expert, and its position marked on the tracing. The assumed core point position may be some way away from the 'visible' part of the latent. Then the correct orientation of the mark is estimated by the expert, and the coordinates of the characteristics, and other irregularities can then be written down. FIG. 5a discloses an extremely useful tool, for this operation. A large board (50) with a pin hole (51) at its centre has angular divisions marked around the circumference of a 7 or 8 inch circle (i.e. much like an oversized 360' protractor). A transparent ruler (52) is then pivoted at the pinhole (51) in the centre. When the tracing has been made it is placed over the board (50), the pivot pin (51) pressed through the central observation point (51). The tracing falls entirely inside the protractor markings, and the ruler is long enough to reach those markings. Radial movement of the transparent ruler (which has one central line (53) on it) over the tracing makes it very easy both to count the ridge-counts for each irregularity, to measure radial distances (these are marked on the ruler in the appropriate units), and to read off the angular orientations from the circumference of the inscribed circle. We shall record radial distances in units of 0.5 mm (or 0.5 cm on the 10x enlargement) and round to the nearest integer. No greater accuracy is either required or useful. These distances then appear as integers in the range 0 to 50. The type code (T) is a hexadecimal integer, the angular orientation ($\theta$) an integer in the range 0–360, and the ridge count (R) an integer in the range 0 to 50. The total storage space required for all four coordinates is therefore close to 3 bytes; to be precise, it is 25 bits.

14.1.3 'WRAP AROUND' 360° SECTOR.

The sector to be recorded may be a small part of a fingerprint, in which case the area to be coded should be a sector as enclosed by two radial lines. However the normal assumption is that the whole of the visible fingerprint pattern will be coded. Such a sector can be enlarged at will by moving the radial boundary lines, until such time as the internal angle reaches 360°. At that stage the two boundary lines coincide and where they coincide will be called the cut. Provided our topological reconstruction algorithm can cope with the fact that, at the cut, some ridges effectively leave one end of the sector and reappear at the opposite end, then we can forget about the existance of the boundary lines altogether.

The reconstruction algorithm will need to be told how many ridges need to be connected up in this way——and that number (which is the number of ridges that cross the cut) will be recorded as a part of the fingerprint data. It is convenient to specify that the cut will be vertically below the central observation point, and that the ridges which cross it be called moles (as they pass underneath the observation point).

The coordinate system can now be used to describe the complete topology of a whole fingerprint.

TOPOLOGICAL RECONSTRUCTION FROM COORDINATE SETS

The method to be described here is certainly not the only way it could be done—but this one does work very well, is probably as fast as any could be, and leads directly to the point at which no further work is required to be done in order to extract characteristic-centred vectors from the reconstruction. In fact all the characteristic-centred code vectors can be simply lifted out of the array formed by this method.

It will be noticed that the fourth coordinate (D) is ignored throughout this section as it plays no part in the reconstruction process. It is used in the comparison algorithms only after the topology has been restored.

Let us suppose that the print to be reconstructed has m moles and n topological irregularities, whose coordinates are the set $(T_i, \theta_i, R_i, D_i): i=1, \ldots n$.

THE 'CONTINUITY' ARRAY

This reconstruction method involves the systematic development of a large 3-dimensional array, which will be called the 'continuity' array (C) comprising elements $c(i, j, k)$. To understand the function of this array it is necessary, first, to examine FIG. 12: it shows a (simplified) fingerprint pattern with selected central observation point and the radial cut vertically downwards. A radial line from the central observation point is drawn marginally to the clockwise side of every topological irregularity in the picture (whether it be a true characteristic or not). If there are n irregularites (which we will call $(I_1 \ldots I_n)$, there are n+1 radial lines in total (this includes the cut). Calling the cut line $l_0$, and numbering the lines consecutively in a clockwise direction gives the set of lines $(l_0, l_1, \ldots l_n)$.

Now re-order the topological coordinate set by reference to the second coordinate ($\theta$)—so that the coordinate set satisfies the condition:

$$\theta_i \leq \theta_{i+1} \text{ for all } i \in \{1, 2, \ldots n-1\}$$

There are then simple 1-1 mappings between the lines $(l_1 \ldots l_n)$, the irregularities $(I_1 \ldots I_n)$ and their coordinates $(T_i, \theta_i, R_i, D_i): i=1 \ldots n$.

Each of the lines $(l_0 \ldots l_n)$ intersect a certain number of ridges, giving an ordered sequence of ridge intersection points. Let the number of ridges crossed by line $l_i$ be called $r_i$. Further, let the ridge intersection points on the line $l_i$ be called points $\{p(i, j): j=1, \ldots r_i\}$—point $p(i, 1)$ being the closest to the central observation point and $p(i, r_i)$ being the closest to the edge of the visible print.

The continuity array C is then set up with a direct correspondence between the ridge intersection points $p(i, j)$ and the elements of C, namely $c(i, j, k)$. k takes the values 1 to 4, and thus there is a 4 to 1 mapping of the elements:

$$\{c(i, j, k): i=0, \ldots n: j=1, \ldots r_i: k=1, 2, 3, 4\}$$

onto the set of ridge intersection points:

$$\{p(i, j): i=0, \ldots n: j=1, \ldots r_i\}$$

The array C can therefore be used to record four separate pieces of information about each of the ridge intersection points.* The meanings assigned to each element of C are as follows:

* The part of the matrix C which will be used for any one print is therefore irregular in its 2nd (j) dimension.

$c(i, j, 1)$—"what is the first event that topological exploration from the point $p(i, j)$ in an anticlockwise direction will discover?"

$c(i, j, 2)$—"which of the irregularities $I_1 \ldots I_n$ is it that such anticlockwise exploration will discover first?"

$c(i, j, 3)$—"what is the first event that topological exploration from the point $p(i, j)$ in a clockwise direction will discover?"

$c(i, j, 4)$—"which of the irregularities $I_1 \ldots I_n$ is it that such clockwise exploration will discover first?"

$c(i, j, 1)$ and $c(i, j, 3)$ should, therefore, be ridge-tracing event codes in the normal hexadecimal integer format (not to be confused with the different set of hexadecimal codes currently being used for the irregularity type $(T_i)$).

$c(i, j, 2)$ and $c(i, j, 4)$ are integers in the range 1-n which serve as pointers to one of the coordinate sets. They are a kind of substitute for distance measures (being associated with $c(i, j, 1)$ and $c(i, j, 3)$ respectively) but they act by referring to the coordinates of the irregularity found, rather than by giving an actual distance. They will be called irregularity indicators in the following few sections.

OPENING THE CONTINUITY ARRAY

To begin with, the whole of the continuity array is empty (and, in practice, all the elements are set to $-1$). It will be filled out successively starting from the left hand edge (i=0) and working across to the right hand edge (i=n).

Starting with i=0 (at the cut $\_$ , FIG. 12a) we know only that $r_o = m$ (the number of ridges crossing the cut is the number of moles recorded in the data.) Nothing is known (yet) about any of these ridges. The first set of entries in the continuity array is made by assigning a dummy number to every possible ridge exploration from the line $l_o$.

The dummy numbers are integers in a range which cannot be confused with real event-codes.* Each dummy number assigned is different, and the reconstruction algorithm views them thus:

* In practice dummy numbers start at 100 and, whenever another one is needed, the next free integer above 100 is used. Obviously a record is kept of how many different dummy numbers have been assigned.

"I do not yet know what happens along this ridge—I will find out later—meanwhile I need to be able to follow the path of this ridge segment, even before I find out where it ends."

This first step in filling in the continuity matrix is therefore to assign dummy numbers to each of the elements $\{c(0, j, k): j=1, \ldots r_o: k=1 \text{ or } 3\}$.

The elements $\{c(0, j, k): J=1, \ldots r_o: k=2 \text{ or } 4\}$ are left untouched for now.

ASSOCIATION, ENTRIES, AND DISCOVERIES IN THE CONTINUITY ARRAY

The next stage is to consider each of the coordinate sets $(T_i, \theta_i, R_i, D_i)$ in turn starting with i=1. We known that the irregularity $I_l$ is the only change in the laminar flow between lines $1_o$ and $1_l$. We also know its type $(T_l)$ and its ridge-count $(R_l)$. Depending on the type $T_l$ there are various associations, entries and discoveries that can be made in the continuity array.

Suppose, for example, that $T_l=3$ (i.e. a ridge ends—according to the table of irregularity types). We can deduce that $$r_l = r_o - 1$$

(i.e. line $l_I$ crosses one less ridge than line $l_o$ and we can make the following associations in the second column (i=1) of the continuity array. (Associations occur when one element of the array is set equal to another.)

$$c(1, j, 1) = c(0, j, 1) \text{ for all } 1 \leq j \leq R_1 - 1,$$

$$c(1, j, 3) = c(0, j, 3) \text{ for all } 1 \leq j \leq R_1.$$

(i.e. ridges below the irregularity pass on unchanged) also:

$$c(1, j, 1) = c(0, j+1, 1) \text{ for all } R_1 + 2 \leq j \leq r_1,$$

$$c(1, j, 3) = c(0, j+1, 3) \text{ for all } R_1 + 1 \leq j \leq r_1.$$

(i.e. ridges above the irregularity pass on unchanged, but are displaced downwards by one ridge, due to the $R_1 + 1$'th ridge coming to an end.)

Thus many of the dummy numbers from the (i=0) column are copied into the (i=1) column—and their successive positions show which ridge intersection points lie on the same ridges.

Further information is gained from the immediate vicinity of the irregularity and this allows us to make entries in the array. (Entries result directly from the coordinate set being processed, rather than by copying from another part of the array).

$$c(1, R_1, 1) = 8,$$

$$c(1, R_1, 2) = 1,$$

$$c(1, R_1 + 1, 1) = 6,$$

$$c(1, R_1 + 1, 2) = 1.$$

(i.e. the line $l_I$ is drawn marginally past the ridge-ending $I_I$, and so that ridge-ending appears as a facing ridge ending in anticlockwise exploration from ridge intersection points $p(1, R_I)$ and $p(1, R_I + 1)$. The event seen, in each case, is $I_I$ itself.)

We also have discovered what happened to the ridge that passed through the point $p(0, R_1 + 1)$: it ended (code 3) at irregularity $I_1$. That discovery enables us to note the fact that the ridge exploration clockwise through point $p(0, R_1 + 1)$ ended here. The existing entry in $c(0, R_1 + 1, 3)$ is a dummy number, and the new found meaning for that number is recorded in the dummy number index. Suppose the dummy entry had been the number 107: then we store its meaning thus:

$$\text{index}(107) = (3, 1)$$

Eventually all the appearances of the number 107 in the array will be replaced by '3', and, at the same time, all the associated irregularity indicators will be set to '1'.

Knowledge of $T_1$ and $R_1$ has therefore enabled us to make a particular set of associations, entries and discoveries—from which it has been possible to place something (either entries or dummy numbers) in all of the elements of the set:

$$\{c(1, j, k): j = 1, 2, \ldots r_1: k = 1 \text{ or } 3\}$$

The process now begins again, with examination of irregularity $I_2$ followed by $I_3 \ldots I_n$. Each different possible type code $T_i$ generates its own individual set of associations, entries and discoveries. Each set allows the next column of C to be filled in. *It should be pointed out that whenever association is made of event codes (as distinct from dummy numbers) then association is also made of their respective irregularity identifiers.

*Some of the entries may well be new (unassigned) dummy numbers. This occurs wherever new ridge segments start at the irregularity. It did not happen in the case of the ridge ending.

After all the n coordinate sets have been processed (and entries thereby made in the whole of the continuity array) a few last associations need to be made in order to account for the fact that ridges cross the cut. These associations are that:

$$c(0, j, 1) \text{ is equivalent to } c(n, j, 1) \text{ for all } 1 \leq j \leq r_0,$$

and $c(n, j, 3)$ is equivalent to $c(0, j, 3)$ for all $1 \leq j \leq r_0$.

(Of course $r_0 = r_n = m$)

which effectively 'wrap around' the ends of the continuity array by sewing up the cut. As each of these elements of C already has some sort of entry in it, the mechanics of making these associations are more akin to the normal mechanics of discovery, in that they involve making entries in the dummy number index. They may, in fact, enter dummy numbers in the dummy number index thus indicating that two different dummy numbers are equivalent (i.e. they represent the same ridge exploration).

PROPERTIES OF THE COMPLETED CONTINUITY ARRAY

Once this process is complete the continuity array will have acquired some very important properties:

(a) all the elements $\{c(i, j, k): 0 \leq i \leq n: 1 \leq j \leq r_i: k = 1 \text{ or } 3\}$ contain either ridge exploration event codes (hexadecimal) or dummy numbers (integers over 100).

(b) wherever $c(i, j, 1)$ or $c(i, j, 3)$ is an event code, then the corresponding entries, $c(i, j, 2)$ or $c(i, j, 4)$ respectively, will contain an irregularity identifying number that shows where that ridge event occurs.

(c) all the different appearances of a particular dummy number in the continuity array reveal all the intersection points through which one continuous ridge exploration has passed. (Hence the name of the array.)

(d) a discovery has been made in respect of every dummy number that has been allocated, and there is, in the dummy number index, an equivalent event code and associated irregularity identifier waiting to be substituted for all the appearances of that dummy number. The dummy number index is therefore complete. This simply must be the case as a discovery has been recorded every time that a ridge ran into an irregularity. There can be no ridge explorations that do not end at one, or other, of the n irregularities—consequently there can be no outstanding 'unsolved' ridge explorations by the time all n irregularities have been dealt with.

FINAL STAGE OF TOPOLOGICAL RECONSTRUCTION

The final stage of the reconstruction process is to sweep right through the continuity matrix replacing all the dummy numbers with their corresponding event codes from the index. The related irregularity identifiers are filled in at the same time, also from information held in the index. This second (and final) sweep through the elements of the continuity array leaves every element in the set:

$(c(i, j, k): i = i \ldots n; j = i \ldots r_j; k = 1 \text{ or } 3)$ as an event code, and every element of the set:

$(c(i, j, k): i = 1 \ldots n; j = 1 \ldots r_j; k = 2 \text{ or } 4)$ as an irregularity identifier.

For any particular line $l_i$ the entries of C in the ith column correspond exactly to the elements of a topological code vector generated by that line. The only difference in appearance is that we have irregularity identifiers rather than distance measures to go with each exploration event code. The later vector comparison stages of the matching algorithm are adapted with that slight change in mind.

This completes a somewhat simplified account of a rather complex process. There are other complications which have not been explained in full—such as how the algorithm deals with sequences of dummy numbers that are all found to be equivalent, and the special treatment that ridge recurves have to receive, and how the algorithm copes with multiple irregularities showing the same angular orientation. Nevertheless this explanation serves well to demonstrate the methodical and progressive nature of this particular reconstruction process. It also makes clear that only two sweeps through the matrix are required—which is surprisingly economical considering the complexity of the operation.

THE MATCHING ALGORITHM LM6. (APPENDIX A, FIG. 19)

The algorithm LM6 (Appendix A) accepts latent data in coordinate form, rather than by prepared vectors. Topological reconstruction was performed both on the latent mark (once only per search) and on each file print to be compared with it. The continuity matrix generated from the latent coordinate set will be called the search continuity array, and the continuity array generated from the file set will be the file continuity array.

There are two distinct phases of print comparison which take place after these topological reconstructions are complete. Firstly, the appropriate vector comparisons are performed and their scores recorded—secondly, the resulting scores are combined to give an overall total comparison score. The vector comparisons are essentially a way of comparing the topological neighborhoods of each of the characteristics seen on the fingerprints under comparison. The vectors correspond exactly to the topological code vectors (of the type described in connection with the vector matching algorithm MATCH4) that would be generated by each of the radial lines as shown in FIG. 12. There is one radial line per characteristic, therefore one extracted vector per characteristic. It is most important to realise that, according to the invention, the observation points selected on the two prints under comparison do not need to have been in the same positions. The reconstructed topology will be the same no matter where it was viewed from. Just as two photographs of a house, from different places, look quite different—nevertheless the house is the same. The final comparison scores will be hardly affected by misplacement of the central observation point provided they lie in roughly the right region of the print. The reason for approximately correct placement being necessary is that the orientation of the imaginary radial lines, which effectively generate the vectors after reconstruction, will depend on the position of the central observation point. The effect of misplacing that point (in a comparison of mates) is to rotate each generating line about the characteristic on which it is based. Such rotation is not important provided it does not exceed 20 or 30 degrees. Slight misplacement of the observation point is not going to materially affect the orientation of these imaginary generating lines, except those based on characteristics which are very close to it. Specifying that the central observation point should be adjacent to the core (in the case of whorls or loops) and at the base of the 'upcurve' (in the case of plain arches) is a sufficiently accurate placement rule.

THE VECTOR COMPARISON STAGE

From the search continuity array a vector is extracted for each true characteristic on the latent mark. Vectors are not extracted for the other irregularities ('ridges going out of sight', 'ridge recurves', etc.) If the latent mark shows 13 characteristics we then have 13 vectors, each vector based on an imaginary line drawn from the central observation point to one of those 13 characteristics, and passing marginally to the clockwise side of it. Let us now forget about all the other topological irregularities in the coordinate list and number the characteristics 1, 2, 3 . . . k. If the number of coordinate sets, in total, was n then certainly $k \leq = n$. The extracted search vectors can now be called $S_1 \ldots S_k$ In a similar fashion the extracted file vectors, each based on true characteristics, can be called $F_1 \ldots F_m$.

For each search vector a subset of the file vectors is chosen for comparison. The selection is made on these bases:

(a) that the characteristic on which the file vector is based must be of similar type (either an 'exact' match or a 'close' match) to the one on which the search vector is based.

(b) that the angular coordinates of the characteristic on which it is based must be within a permissible angular tolerance of the angular coordinate of the characteristic on which the search vector is based. The permissible angular tolerance is a parameter of the algorithm.

This selection essentially looks for file print characteristics that are potential mates for the search print characteristics. The vector comparison that follows serves to compare their neighborhoods. It is quite obvious that allowing a wide angular tolerance significantly increases the number of vector comparisons that have to be performed. If a small angular tolerance is permitted then a badly misoriented latent mark may not have the mated vectors compared at all.

The vector comparison itself is much the same as used hitherto—except that the vectors contain irregularity identifiers rather than distance measures. At the appropriate stages of the vector comparison subroutine the actual linear distance ('as the crow flies') from the central characteristic to the ridge-event is calculated by reference to the appropriate coordinate sets. Thus ordinary spatial distances can be used, and a great degree of reliability can therefore be attached to them.

For each search vector $S_i$, and candidate file vector $F_j$, a vector comparison score $q_{ij}$, is obtained. For each search vector $S_i$ a list of candidate file vectors, with their scores, can be recorded in the form of a list of pairs $(j, q_{ij})$. There are typically between 5 and 15 such candidates for each search vector when the angular tolerance is set at 30°. These lists of candidates can then be collected together to form a table, which will be called the candidate minutia table. An example of such is shown below.

Each column is a list of candidates for the search vector labelled at the head of the column. In each case the first of a pair of numbers in parentheses shows which file minutia was a candidate, and the second number is the score obtained by its vector comparison.

| $S_1$ | $S_2$ | $S_3$ | ... | ... | ... | $S_k$ |
|---|---|---|---|---|---|---|
| (5,89) | (6,45) | (25,41) | ... | ... | ... | (15,138) |
| (14,29) | (10,40) | (34,12) | ... | ... | ... | (23,12) |
| (15,0) | (16,35) | (37,19) | ... | ... | ... | (28,65) |
| (52,19) | (21,92) | (41,84) | ... | ... | ... | (36,71) |
| (55,81) | (35,5) | (48,91) | ... | ... | ... | (37,103) |
| (61,34) | (36,0) | (53,101) | ... | ... | ... | (47,82) |
| (79,0) | (41,3) | (65,180) | ... | ... | ... | (56,41) |
| . | . | . | ... | ... | ... | . |
| . | . | . | ... | ... | ... | . |
| . | . | . | ... | ... | ... | . |
| (0,0) | (46,85) | (0,0) | ... | ... | ... | (0,0) |

FINAL SCORE FORMULATION

We are now left with the problem of intelligently combining these individual candidate scores to give one overall score for the print. If the file print and latent mark are mates it would be nice to think that the highest candidate score in each column of the candidate minutia table indicated the correct matching characteristic on the file print. If that were the case then simply picking out the highest in each column, and adding them together, might serve well as a method of formulating an overall score. However that is not the case. Roughly 50% of true mated characteristics manage to come top (in score) of their column—the others usually come somewhere in the top five places.

THE NOTION OF 'COMPATIBILITY'

We learnt from earlier experiments with latent entry by vectors that combination of scores was best done subject to conditions—and, in that case, the condition was correct relative angular orientation. It will make sense, therefore, to combine the individual candidate scores when, and only when, they are compatible.

If $(j, q_{1j})$ is a candidate in the $S_1$ column, and $(i, q_{2i})$ is a candidate in the $S_2$ column—then there are various reasonable conditions that can be set in respect of these two candidates before we accept that they could both be correct. We will say that these two candidates are compatible if, and only if, these three conditions hold true:

(a) i is not equal to j. (Obviously one file print characteristic cannot simultaneously be correctly matched to two different search print characteristics.)

(b) The distance (linear) between file print characteristics numbered i and j should be the same, within certain tolerance, as the distance between the two search print characteristics that they purport to match. That tolerance is an important programme parameter.

(c) The relative angular orientation of the file print characteristics should be roughly the same as the relative angular orientation of the two search print minutiae that they purport to match. The tolerance allowed, in this instance, is the same angular tolerance that was used earlier to limit the initial field of candidate minutiae.

SCORE COMBINATION BASED ON COMPATIBILITY

The application of the notion of compatibility in formulating a total score was originally planned as follows:

Step 1: Reorder the candidates in each column by reference to their scores, putting the highest score in each column in top place.

Step 2: In each column, discard all the candidates that do not come in the top five places.

Step 3: For each remaining candidate check to see which candidates in the other column are compatible with it.

Step 4: Taking at most one candidate from each column, pick out the highest scoring mutually compatible set that can be found. A mutually compatible set is a set of candidates each pair of which are compatible.

Thus a set of file print characteristics is found, each of which has similar topological neighborhood to one of the latent mark characteristics (as shown by their high vector comparison scores) and whose spatial distribution is very similar to that of the latent mark characteristics (as shown by their compatibility). Spatial considerations are therefore being used in the combination of topological scores—as is already the case at a lower level, when distance measures are used in the vector comparison process.

The algorithm LM5 was originally written to perform the steps described above. Unfortunately it overloaded when it tried to do the comparison of a very good latent with its mate! The reason for this is that the algorithm will examine every possible mutually compatible set in turn. Certainly non-mates have very few mutually compatible sets of any size. However, if a good quality latent gives a largest compatible set of size N (i.e. N characteristics match up well with the file print) then there are $2^N-1$ subsets of that largest set, each of which will be a mutually compatible set. The total number of such sets is therefore at least $2^N$, and probably much greater. In some cases N can be so large that the computer could not finish the job.

CANDIDATE PROMOTION SCHEMES

The following method accomplishes much the same sort of candidate selection, but very much faster, and without requiring complete mutual compatibility in the selected set. The first three steps are the same as before:

1. Reorder the candidates in each column, by their scores.

2. Discard all candidates not ranked in the top 5 places in their column.

3. Check the compatibility of all remaining candidates with the remaining candidates in each other column.

The fourth step is calculation of what will be called a compatible score for each of the remaining candidates. Here are two possible alternative methods for doing this:

(a) For each individual candidate add together all the scores of top-ranked candidates in other columns with which that candidate is compatible. Finally add the candidate's own score to the total.

(b) For each individual candidate find, in each other column, the highest scoring compatible candidate. Add together those scores (one from each column), and then add the target candidate's own score to the total.

On the basis of these compatible scores, rather than on the original vector comparison scores, reorder the remaining candidates in each column.

This 4th step can be regarded as a promotion system based on compatibility with other high-ranking candidates. The difference between options (a) and (b) is this: in rule (a) promotion depends on a candidate's compatibility with those already in top place (and could be called a 'bureaucratic' promotion system). With rule (b) a whole group of candidates in different columns, none of whom are in top place can all be promoted to the top at once by virtue of their strong compatibility with each other (a 'revolutionary' promotion system). Both were tried and the 'revolutionary' system was found to be the most effective. It is the 'revolutionary' rule (b) above that is used in the algorithm LM6.

The promotion stage could be repeated several times if it was considered desirable (to give the top set time to 'settle')—in practice it was found that one application was sufficient. Mate scores improved very little, if at all, when second and third steps of promotion were introduced.

After the promotion stage is complete all but the top ranked candidates in each column are discarded, and the compatible score for the remaining candidate in each column is then recalculated on the basis of only the other remaining candidates.

The final score is then evaluated by adding together all of these new compatible scores that exceed a given threshold. That threshold is a programme parameter, and is expressed as a percentage of the 'perfect' latent self-mated score.

The use of these compatible scores, rather than the original vector comparison scores, in evaluating the final score has the effect of multiplying each original vector score by the number of other selected (i.e. now top-ranked) candidates with which it is compatible. The more dense the compatibilities of the final candidate selection, the higher the score will be.

PERFORMANCE OF LM6

A series of tests was then performed using the algorithm LM6. The best test results obtained gave the following rankings:

Mates ranked in 1st place. 80.36%
Mates ranked in 1st-3rd. 82.14%
Mates ranked 1st-10th 85.71%

These indicate a vast improvement over the performance of traditional prior art spatial methods. Some of the parameter values that gave the above results:

(a) Exact match scores were set to be 5, with close match scores (CMS) set to be 3. Thus close match scores were given a higher relative weighting than previously used in the comparison of rolled impressions (where the optimum ratio had been 5:1). The higher weighting can be attributed to a higher incidence of topological mutation in the interpretation of latent marks.

(b) The distance tolerances were set at 10% (of the distance being checked) with a minimum of 1. The same distance tolerances were used in the vector comparison stage of the algorithm and in the score combination stages (where correct relative distance was one of the three conditions that needed to be satisfied for two file print minutiae to be compatible.)

(c) The ridge span used in vector comparison was 10 ridges—this means that vectors of a standard length of 40 digits, with 40 associated irregularity indicators, were used whenever vector comparisons were performed. The results were no worse with longer vectors, but the smaller value for SPAN gave faster comparison times on a serial machine.

(d) The minimum angular tolerance (MAT) was 20°. This is almost inconsequential as the true angular misorientation limits were set individually for each latent mark (by subjective judgement) and written as a part of the latent search data.

(e) The candidate minutia selection depth ('DEPTH') was 5 throughout. This means that, for each search minutia, only the top 5 candidate file print minutia would be considered. This parameter was set to 5 as a result of observation, rather than experiment.

(f) The compatible score cutoff point ('CUTOFF') is the percentage of the latent mark's perfect self-mated score that must be attained by the final compatible score of a candidate file print minutia before it will be allowed to contribute to the final total score. The best value for this parameter was found to be 15%, which is surprisingly high. The effect of this setting was to ensure that the vast majority of file print minutiae that were not true mates for search minutia contributed nothing to the score; the net effect of this was to make most of the mismatch comparison scores zero. In fact, for 28.6% of the latents used, the true mate was the only file print to score at all—the other 99 file prints all scoring zero. Of course such a stringent setting also made things tough for the mates, as shown by the fact that 7% of the mate scores were zero also. However, these 7% were mates that had not made the top ten places in any of the tests, and were therefore most unlikely to be identified anyway. It is also worth pointing out that on each occasion when one file print alone scored more than zero (i.e. exactly 99 out of the 100 in the file collection scored zero) that one was the true mate. (These are the 28.6% mentioned above.) This represents a surprisingly high level of what might reasonably be termed 'doubt-free identifications'.

COMPUTATION TIMES

The foregoing description of the algorithm LM5 will have made it quite clear that this is not, in its present form, a particularly fast comparison algorithm but using the principles set forth herein, it can be significantly improved. The CPU time taken on a VAX 11/780 for the above test (5600 comparisons) was 12 hours and 11 minutes. That means an average CPU time per comparison of 7.8 seconds—which is a somewhat disconcerting figure when the acceptable matching speeds for large collections are in the order of 500 comparisons per second.

However 7.8 seconds per comparison is not quite so alarming when one considers the extensive and multi-layered parallelism of the algorithm. At the lowest level, the vector comparisons themselves are sequences of array operations. At the next level, many vector comparisons are done per print comparison. In the score combination stages calculations of compatibility and compatible scores are all simple operations repeated many many times. There is, in this algorithm, enormous scope for beneficial employment of modern parallel processing techniques. It is hardly appropriate to take too much notice of the CPU time in any serial computer—where each operation is cone element by element.

Moreover, in the area of latent searching, the primary area of concern for law enforcement agencies is shifting from the issue of speed onto the issue of accuracy. It is quite reasonable to obtain the necessary speed through 'hardwiring' (with its associated cost) for the sake of matching algorithms that will actually make a substantial number of identifications from latent marks.

FILE STORAGE SPACE—DEFAULTING THE 'EDGE TOPOLOGY'

It is noticeable that the need to include all topological irregularities, rather than just the true characteristics, significantly enlarges the volume of the file print data. In the 100 file cards in the experimental database the average number of irregularities recorded per print was 101.35. The majority of irregularities that were not true characteristics fell at the edge of the print; they recorded all those places where ridges 'came into sight' or 'went out of sight'. Thus a significant proportion of the file data storage requirement is spent in describing the edge of the file print.

In practice the edge of the file print is not very important—as the latent mark invariably shows an area completely within the area of the rolled file print. The edge consequently plays little or no part in the print comparison process, and the edge description serves only to help the topological reconstruction process make sense of the ridge pattern.

For the sake of economy in file size, therefore, the algorithm LM6 was prepared by adapting the reconstruction stage of LMS slightly. It is adapted in such a way that the reconstruction will invent its own edge topology in the absence of an edge description. The default topology selected is not important; it is only important that the algorithm does something to tie up all the loose ridges around the edge.

The file collection was then pruned substantially by elimination of all of the edge descriptions, and this reduced the average number of coordinate sets per print from 101.35 to 71.35.

The test reported above was then rerun using the algorithm LM6 and the condensed file set. The rankings obtained were exactly the same as before—so a saving of 30% in file data storage was achieved with absolutely no loss of resolution.*

*The pruning operation was not performed on the latent mark data file for two reasons. Firstly, latent mark databases (where these are kept) are tiny in comparison to rolled file print collections, and so storage requirements are not a major concern. Secondly, the edge of a latent mark does play an important part in the comparison process.

OPTIONAL USE OF FIFTH COORDINATE

Many existing spatial matching algorithms use local ridge direction data as well as X and Y coordinates for each characteristic located. Thus spatial matching algorithms normally use coordinates of the form $(X, Y, \theta)$ where $\theta$ shows the direction of ridge flow local to each chacteristic.

Such data was not used in the algorithm LM6—but could well be incorporated into the topological coordinate data as a fifth coordinate. The use of that fifth coordinate with the matching algorithm could then be:

(a) as a further means of restricting the selection of characteristics on a file print that could be considered as candidates for matching a particular search print characteristic, (b) as a further means for establish "compatability" in the score combination stages of the algorithm, and (c) as a corrective measure for rotational misorientation.

The benefits of including such a fifth coordinate may not justify the 25% increase in storage space that it would necessarily entail.

DERIVATION OF VECTORS FOR ROLLED PRINT COMPARISON

The ability to perform topological reconstruction from a set of coordinates has some retainer interesting 'by-products'. The first of these relates to the fast comparison of rolled prints on the basis of a single vector.

As the data format for a latent mark and a rolled impression is now identical, it would be possible to use the latent matching algorithm (LM6) to compare one rolled print with another. (One of the rolled prints would be acting as a very high quality latent.) However, to use the algorithm LM6 in this way on rolled prints would be 'taking a sledge hammer to crack a nut'. One single vector comparison deals with comparison of two rolled prints perfectly adequately—so it would not be useful to use this latent matching algorithm, with its hundreds of vector comparisons, in this application.

Nevertheless there is a significant benefit to be gained from the topological re-construction section of the latent matching algorithm. The data-gathering requirements included the need to track along ridges, in order to find the first event that happened. Although that, in itself, is not a particularly demanding programming task—the ability to reconstruct topologies from coordinates renders it unnecessary. A topological code vector representing a horizontal line passing through the core of a loop can be lifted out of the continuity matrix after reconstruction. The left half of it (i.e. the part that fails to the left of the core) and the right half will be extracted separately. Each half is extracted by selecting the column of the continuity matrix that corresponds with an imaginary line just to the anticlockwise side of horizontal. (i.e. just below for the left side, and just above for the right side). Amalgamating these two halves, reversing the 'up' and 'down' pairs from the right half, gives a single long vector of the required format.

There will be two minor differences between these extracted vectors and the design originals:

(a) the core point, which was to be on a ridge, is replaced by the central observation point which is in a valley. The central observation point will, however, be only fractionally removed from the core in the case of loops and whorls.

(b) the vector has irregularity identifiers rather than ridge-traced distance measures. Consequently the vector comparison algorithm has to be adapted to refer to the appropriate coordinate sets when the time comes to apply the various distance tests.

In an operational system the maximum speed would be obtained by performing topological reconstruction, and vector extraction, at the time each print is introduced to the collection. The extracted 'long' vectors could be stored in a separate file so that they could be used for fast vector comparison without the need to perform topological reconstruction each time. That would obviously increase the data storage requirement per print by the 60 bytes required for such 'long' vectors. The coordinate sets, and topological reconstruction would then only be used when a latent search was being conducted.

If the derived long vectors were to be made completely independent of the coordinate sets, it would be necessary to replace the irregularity identifiers with calculated linear distances at the time of vector extraction.*

*The performance of MATCH4 on such derived vectors has not been tested. This is because of the incredibly time consuming nature of manual encoding according to the latent scheme (up to 1 hour per print for clear rolled impressions). The time for such tests will be after the development of automatic data extraction techniques, when large numbers of prints can be encoded automatically according to the latent scheme, and then have derived vectors extracted after topological reconstruction.

IMAGE RETRIEVAL SYSTEM

There is a significant demand for automated identification systems to be linked with an image-retrieval facility for all the prints in the file collection. The system operator obtains a list of the highest scoring candidates each time an automated search is conducted—these candidates have then to be checked visually by the fingerprint expert to determine which of them, if any, is the true mate. This visual checking can be done much more easily if the fingerprints can be displayed on a screen, rather than having to be fetched from a cupboard. Much research is currently underway with the aim of finding economical methods for storing the two dimensional pictures (fingerprints) in computer memory so that they can be called up and displayed on the terminal screen.

There are two distinct paths for such research. The first aims to record the original grey-scale data which is output from automatic scanners, with no interpretative algorithms ever being applied to the print (although data compaction techniques will, of course, be used). The second uses interpretative algorithms to identify the ridges and valleys within the grey-scale image, to resolve the picture into a binary (black and white) image, and then finally to reduce the thickness of each ridge to one pixel by a variety of ridge-thinning techniques. What is then stored is sufficient data to enable each thinned ridge segment to be redrawn (i.e. start position, end position, curvature etc.).

The data requirements per print are in the order of 2,000 to 4,000 bytes for compressed grey-scale images, and between 1,000 and 2,000 bytes for a thinned image.

With the 4-coordinate system used in the latent scheme records, a complete topological and spatial description of the characteristics can be stored in between 300 and 400 bytes. It should therefore be possible to redraw the fingerprint, in the style of a thinned image, from that data. Firstly topological reconstruction has to be performed, and then the elastic (topological) image has to be 'pinned down' at each characteristic, by reference to their polar coordinate positions contained in the coordinate sets.

The substantial problem in such a process is the business of generating a smooth ridge pattern that accommodates all the pinned points. The problems raised are similar to those in cartography—when a smooth contour map has to be drawn from a finite grid of discrete height (or depth) samplings. One fairly crude reconstruction algorithm was written simply because generation of a picture from topological coordinate sets provides a most satisfying demonstration of the sufficiency of such coordinate descriptions.

The algorithm PLOT1 (Appendix C) was written as a Fortran programme: its input was the set of coordinates representing a specified print, and its output was a file of 'QMS-QUIC' instructions for the graphics display facility of a QMS LASERGRAFIX 1200 printer. The algorithm first performed topological reconstruction in the normal manner, and then assigned polar coordinates to every ridge intersection point in such a manner that all the topological irregularities were assigned their own (real) polar coordinates. A series of simple linear smoothing operations are applied, coupled with untangling and gap-filling procedures that make successive small adjustments to the radial distances of all the intersection points that are not irregularities. These processes continue until a certain standard of smoothness is attained. Finally the picture is output as a collection of straight line segments between connected ridge intersection points.

Figure 13:
FIG. 13 illustrates a fingerprint after reconstruction from a topological coordinate set.
Figure 14:
FIG. 14 is a copy of the original fingerprint tracing corresponding to the print used in FIG. 13.

A sample reconstructed fingerprint image is shown in FIG. 13, together with its descriptive data. The picture is made up of 4,404 straight line segments. The topology is correct, and each irregularity is properly located: however the intervening ridge paths have suffered some unfortunate spatial distortions. For the sake of comparison, the original print tracing from which the coordinate sets where derived is shown in FIG. 14 (it has been reduced from 10x to 5x magnification). Detailed comparison of FIGS. 13 and 14 will reveal a few places where the topology appears to have been altered, in fact it has not been altered—but, at this magnification, some ridges appear to have touched when they should not. This tends to occur where the ridge flow direction is close to radial. In such places the untangling subroutine, which moves ridges apart when they get too close together, has not been forceful enough in separating them.

Figure 15:
FIGS. 15 and 16 illustrates latent tracing (FIG. 15) and, its reconstruction (FIG. 16)
Figure 16:

FIGS. 15 and 16 show the tracing of a latent mark, together with its reconstructed picture. In this case the latent data comprised 32 coordinate sets (filling approximately 100 bytes), of which 21 make up the edge-description. There are ten genuine characteristics shown, and the remaining topological irregularity is the ridge recurve close to the core. The reconstructed image is made up from 780 straight line segments.

The facility for reconstruction also affords the opportunity to actually see a 'default edge-topology'. FIGS. 17 and 18 show two further reconstructed images of the print in FIG. 14. The upper picture is the same as FIG. 13, except for a reduction in magnification (to 2.5x). The lower picture is a reconstruction from the condensed data set for the same print, after all the coordinate sets relating to ridges going 'out of sight' have been deleted. All the loose ends have been tied up by the reconstruction algorithm in a fairly arbitrary, but interesting, way. The lower picture does, of course, show some false ridge structure in areas that were 'out of sight'. However the data storage requirement for the corresponding coordinate sets was only 354 bytes for the edge-free description, as opposed to 526 bytes for the original description.

From these figures it is fairly clear that more sophisticated smoothing techniques can be applied before really reliable images can be retrieved. These pictures are quite sufficient nevertheless to demonstrate the potential for such a scheme. They are also a fine demonstration of the effectiveness and accuracy of the topological reconstruction algorithms.*

*It should be remembered that the path of the ridges plays no part in the comparison algorithms LM5 and LM6; only the topology, and the positions of the characteristics are used. The defects in these pictures are not, therefore, a reflection of defects in the latent searching algorithms.

A topological approach to fingerprint coding according to the invention offers a great deal in terms of improved accuracy and cost-effectiveness. It is also clear that topology based matching algorithms are greatly improved by utilizing some spatial information. The power of resolution between mates and non-mates given by the combination of topological and spatial information is vastly superior to that which can be obtained by use of spatial information alone.

The greatest benefit that has been obtained is accuracy. With rolled impressions there is also a clear increase in speed and a massive reduction in storage requirement. With the latent searching scheme the question of speed has to be left open until the benefits of LM6's extensive parallelism have been realized.

Appendix A

```
C      ........................ALGORITHM LM6. ......................
C
C      LM6 - PROGRAMME FOR COMPARISON OF LATENT MARKS AGAINST
C      FILE SET SINGLE FINGERPRINTS. BOTH THE LATENT MARKS, AND THE
C      FILE PRINTS SHOULD BE IN THE FORM OF TOPOLOGICAL COORDINATE
C      SETS.
C
C      HOWEVER, THE DESCRIPTIVE COORDINATE SETS DO NOT NEED TO BE
C      'COMPLETE'. IF EDGE-DESCRIPTIONS HAVE BEEN OMITTED IN THE
C      PREPARATION OF THE DATASETS, A DEFAULT EDGE-TOPOLOGY WILL BE
C      AUTOMATICALLY PROVIDED BY SUBROUTINE "CONTINUITY". (THE PURPOSE
C      FOR THIS IS TO REDUCE THE SIZE OF THE DATABASES - ESPECIALLY
C      THAT OF THE FILE COLLECTION.)
C
C      Programme input is in the form of coordinate sets, together with
C      certain other descriptors thus :-
C
C           SSEVENTS(300,4) & FFEVENTS(300,4) - these arrays hold
C      the search and file print coordinate sets respectively. Each
C      can describe up to 300 irregularities by coordinates of the form
C      (T,theta,R,D). theta is in range -90 to 269, measured clockwise
C      from the direction 'west'.
C
C           SSSETS & FFSETS - these are the number of search and file
C      cordinate sets respectively.
C
C           SSMOLES & FFMOLES - these are the number of ridges passing
C      under the selected observation point in the search, and file,
C      print respectively.
C
C           SSTURN1 & SSTURN2 - these are the possible angular
C      misorientation limits entered subjectively by the latent examiner
C      and which form a part of the latent data. They are the maximum
C      number of degrees which must be allowed for misorientation
C      anticlockwise, and clockwise, about the central observation point.
C
C           FFTURN1 & FFTURN2 - similarly for the file print. These
C      are routinely set to zero, or to some other small fixed tolerance
C      when the coordinates are automatically read from incoming file
C      prints.
C
C           BOUND - parameter: upper bound on exact match scores.
C                   recommended value:    5
C
C           MDT & PDT - parameters: the minimum absolute, and
C      percentage distance tolerances to be allowed during vector
C      comparison stages of the algorithm.
C                   recommended values:   1 & 10
C
C           MDT2 & PDT2 - parameters: the minimum absolute, and
C      percentage distance tolerances to be allowed during score
C      combination stages of the algorithm.
C                   recommended values:   1 & 10
C
C           SPAN - parameter: number of ridges to be crossed by
C      vector generating lines on each side of a characteristic.
C                   recommended value:    10
C
C           MAT - parameter: Minimum angular tolerance to be allowed
C      for by comparuson algorithm. Gives opportunity to override the
C      individual angular tolerances in the datafiles.
C                   recommended value:    20
C
C           MAXSHIFT - parameter: maximum number of ridge shifts
C      to be allowed when performing vector comparison.
C                   recommended value:    0
C
C           CMS - parameter: scores to be awarded for 'close matches'
C      in vector comparison.
C                   recommended value:    3
C
```

```
C              CHOICES - parameter: candidate minutia selection depth.
C                       recommended value:    5
C
C              CUTOFF - percentage of latent perfect self-mated score
C       required as 'compatable score' before any one candidate minutia
C       is permitted to contribute to final comparison score.
C                       recommended value:   15
C
C       Programme output is a real number in the range 0.0 to 100.0.
C       It is this score which shows the similarity of the two prints
C       under comparison. The output variable name is ASCORE.
C       ----------------------------------------------------------------
C       ****************************************************************
C       ****************************************************************
C
        INTEGER*4 SCORE(0:15,0:15),I,J,K,L,M,N,BOUND,MDT,PDT,MAT
        INTEGER*4 MAXSHIFT,CMS,CHOICES,CUTOFF,MDT2,PDT2,SPAN
        INTEGER*4 SSMOLES,SSTURN1,SSTURN2,SSEVENTS(300,4),SSSETS
        INTEGER*4 FFMOLES,FFTURN1,FFTURN2,FFEVENTS(300,4),FFSETS
        INTEGER*4 SSCOUNT,SSCONT(0:300,100,4),SSRIDGES(0:300)
        INTEGER*4 FFCOUNT,FFCONT(0:300,100,4),FFRIDGES(0:300)
        INTEGER*4 SSPOINTS,SSKEY(200),FFPOINTS,FFKEY(200)
        INTEGER*4 DISTANCE,DIRECTN,SSDIST(200,200,2)
        INTEGER*4 VSEARCH(100,2),VFILE(100,2),MSEARCH(21,100,2)
        INTEGER*4 MFILE(21,100,2),POSS(200,5,2)
        INTEGER*4 I,J,K,L,M,N,P,Q,PERFECT
        INTEGER*4 BELOW,ABOVE,LENGTH,ASCORE
C
C       SET UP SCORE MATRIX "SCORE" ACCORDING TO PARAMETERS ESTABLISHED
C       ABOVE.
C
        CALL SETSCORE (BOUND,CMS,SCORE)
C
C       CALCULATE THE 'PERFECT' SCORE FOR THE LATENT BY :
C               (A) CALLING CONTINUITY FOR TOPOLOGICAL RECONSTRUCTION.
C               (B) EXTRACTING A VECTOR FOR EACH REAL MINUTIA.
C               (C) SELF MATCHING EACH SUCH VECTOR.
C               (D) TOTALLING THE SCORES SO OBTAINED.
C
        CALL CONTINUITY(SSEVENTS,SSSETS,SSMOLES,SSCONT,SSRIDGES)
        PERFECT=0
        SSPOINTS=0
        DO 1020 I=1,SSSETS
        K=SSEVENTS(I,1)
        IF (K.NE.2.AND.K.NE.3.AND.K.NE.6.AND.K.NE.7.AND.K.NE.12) GOTO 1020
        BELOW=MIN(SSEVENTS(I,3),SPAN)
        ABOVE=MIN(SSRIDGES(I)-SSEVENTS(I,3),SPAN)
        LENGTH=2*(ABOVE+BELOW)
        DO 1015 M=1,LENGTH/2
        N=SSEVENTS(I,3)-BELOW+M
        IF (N.LT.1.OR.N.GT.SSRIDGES(I)) THEN
           MSEARCH(1,2*M-1,1)=15
           MSEARCH(1,2*M-1,2)=15
           MSEARCH(1,2*M,1)=15
           MSEARCH(1,2*M,2)=15
        ELSE
           MSEARCH(1,2*M-1,1)=SSCONT(I,N,1)
           MSEARCH(1,2*M-1,2)=SSCONT(I,N,2)
           MSEARCH(1,2*M,1)=SSCONT(I,N,3)
           MSEARCH(1,2*M,2)=SSCONT(I,N,4)
        ENDIF
1015    CONTINUE
        K=0
        CALL COMPARE(MSEARCH,MSEARCH,SSEVENTS,SSEVENTS,SCORE,K,LENGTH,
       o MDT,PDT,TOTAL,I,I)
        SSPOINTS=SSPOINTS+1
        SSKEY(SSPOINTS)=I
        PERFECT=PERFECT+TOTAL
1020    CONTINUE
C
C       CALCULATE AND STORE ALL THE RELATIVE DISTANCES AND DIRECTIONS
C       BETWEEN PAIRS OF SEARCH MINUTIAE. DIRECTIONS WILL NOT BE CALCULATED
C       IF THE DISTANCE IS SMALL ENOUGH TO BE EVALUATED AS ZERO.
C
        DO 1025 I=1,SSPOINTS-1
        DO 1025 J=I+1,SSPOINTS
        SSDIST(I,J,1)=DISTANCE(SSEVENTS(SSKEY(I),2),SSEVENTS(SSKEY(I),4),
       * SSEVENTS(SSKEY(J),2),SSEVENTS(SSKEY(J),4))
        IF (SSDIST(I,J,1).EQ.0) GOTO 1025
        SSDIST(I,J,2)=DIRECTN(SSEVENTS(SSKEY(I),2),SSEVENTS(SSKEY(I),4),
```

```
              *  SSEVENTS(SSKEY(J),2),SSEVENTS(SSKEY(J),4))
      1025       CONTINUE
          C
          C      CALL CONTINUITY TO PERFORM TOPOLOGICAL RECONSTRUCTION ON THE
          C      FILE PRINT.
          C
                 CALL CONTINUITY(FFEVENTS,FFSETS,FFMOLES,FFCONT,FFRIDGES)
          C
          C      SET THE "POSS" ARRAY TO ZERO.
          C
                 DO 1032 I=1,SSPOINTS
                 DO 1032 J=1,CHOICES
                 DO 1032 K=1,2
      1032       POSS(I,J,K)=0
          C
          C      CALCULATE THE PERMISSIBLE ANGULAR TOLERANCE "MAXTURN" FOR THIS
          C      FILEPRINT WITH THIS LATENT, AND WITH "MAT" AS MINIMUM.
          C
                 MAXTURN=MAX(MAT,SSTURN2-FFTURN1,FFTURN2-SSTURN1)
          C
          C      NOW PICK OUT THE REAL MINUTIAE FROM THE FFEVENTS SET, AND RECORD
          C      THEM IN THE FFKEY (AS PER THE SSKEY).
          C
                 FFPOINTS=0
                 DO 1035 J=1,FFSETS
                 K=FFEVENTS(J,1)
                 IF (K.NE.2.AND.K.NE.3.AND.K.NE.6.AND.K.NE.7.AND.K.NE.12) GOTO 1035
                 FFPOINTS=FFPOINTS+1
                 FFKEY(FFPOINTS)=J
      1035       CONTINUE
          C
          C      NOW TAKE EACH LATENT MINUTIA IN TURN, FIND EACH MINUTIA ON THE
          C      FILEPRINT WITHIN THE APPROPRIATE ANGULAR BOUNDS, AND COMPARE
          C      THE VECTORS REPRESENTING THEIR TOPOLOGICAL NEIGHBOURHOODS -
          C      RECORDING THE RESULT IN THE MATRIX OF POSSIBLE MINUTIAE MATCHES
          C      CALLED "POSS".
          C
                 DO 1090 I=1,SSPOINTS
                 K=SSKEY(I)
                 DO 1090 J=1,FFPOINTS
                 L=FFKEY(J)
          C
          C      FIRST CHECK TYPE COMPATIBILITY (ALLOWING CLOSE MATCHES IFF CMS
          C      IS NON NEGATIVE). THIS IS ACCOMPLISHED BY REFERENCE TO THE SCORE
          C      MATRIX.
          C
                 IF (SCORE(SSEVENTS(K,1),FFEVENTS(L,1)).LT.0) GOTO 1090
          C
          C      CHECK ANGULAR ORIENTATION, USING "MAXTURN" AS THE TOLERANCE
          C      EITHER CLOCKWISE OR ANTICLOCKWISE.
          C
                 TURN=ABS(FFEVENTS(L,2)-SSEVENTS(K,2))
                 IF (TURN.GT.180) TURN=360-TURN
                 IF (TURN.GT.MAXTURN) GOTO 1090
          C
          C      TYPE AND ANGULAR COMPATIBILITY CONFIRMED - PREPARE VECTORS FOR
          C      COMPARISON. MAXSHIFT SHOULD BE AT LEAST 2 IF MINUTIAE MATCH IS
          C      ONLY A "CLOSE" ONE.
          C
                 P=MAXSHIFT
                 IF (SSEVENTS(K,1).NE.FFEVENTS(L,1)) P=MAX(2,P)
                 BELOW=MIN(FFEVENTS(L,3),SSEVENTS(K,3),SPAN)
                 ABOVE=MIN(FFRIDGES(L)-FFEVENTS(L,3),SSRIDGES(K)-SSEVENTS(K,3),
              *      SPAN)
                 LENGTH=2*(ABOVE+BELOW)+4*P
                 DO 1040 M=1,LENGTH/2
                 N=SSEVENTS(K,3)-BELOW-P+M
                 IF (N.LT.1.OR.N.GT.SSRIDGES(K)) THEN
                     VSEARCH(2*M-1,1)=15
                     VSEARCH(2*M-1,2)=15
                     VSEARCH(2*M,1)=15
                     VSEARCH(2*M,2)=15
                 ELSE
                     VSEARCH(2*M-1,1)=SSCONT(K,N,1)
                     VSEARCH(2*M-1,2)=SSCONT(K,N,2)
                     VSEARCH(2*M,1)=SSCONT(K,N,3)
                     VSEARCH(2*M,2)=SSCONT(K,N,4)
                 ENDIF
                 N=FFEVENTS(L,3)-BELOW-P+M
                 IF (N.LT.1.OR.N.GT.FFRIDGES(L)) THEN
```

```
              VFILE(2*M-1,1)=15
              VFILE(2*M-1,2)=15
              VFILE(2*M,1)=15
              VFILE(2*M,2)=15
           ELSE
              VFILE(2*M-1,1)=FFCONT(L,N,1)
              VFILE(2*M-1,2)=FFCONT(L,N,2)
              VFILE(2*M,1)=FFCONT(L,N,3)
              VFILE(2*M,2)=FFCONT(L,N,4)
           ENDIF
1040       CONTINUE
C
C          NOW PREPARE MFILE AND MSEARCH AND COMPARE THEM.
C
           CALL MATRIXFILE(P,LENGTH,VFILE,MFILE)
           CALL MATRIXSEARCH(P,LENGTH,VSEARCH,MSEARCH)
           CALL COMPARE(MSEARCH,MFILE,SSEVENTS,FFEVENTS,SCORE,P,LENGTH,
        *  MDT,PDT,TOTAL,K,L)
C
C          RECORD THE SCORE IN THE MATRIX "POSS"  - POSS(I,Q,R) :
C                   I SPECIFIES WHICH SEARCH MINUTIA IS BEING MATCHED.
C                   Q GIVES THE CANDIDATE FEATURE NUMBER, AND
C                   R=1 GIVES THE FILE MINUTIA EVENT NUMBER.
C                   R=2 GIVES THE SCORE OBTAINED WITH THAT FILE MINUTIA.
C          THE SCORE IS COMPARED WITH THE TOP "CHOICES" CANDIDATES SO FAR
C          AND RECORDED ( IN ORDER OF SCORE) IF IT SCORES HIGH ENOUGH.
C
           IF (TOTAL.LE.POSS(I,CHOICES,2)) GOTO 1090
           Q=1
1075       IF (TOTAL.LE.POSS(I,Q,2)) THEN
              Q=Q+1
              GOTO 1075
           ENDIF
           IF (Q.LT.CHOICES) THEN
              DO 1080 M=CHOICES,Q+1,-1
              POSS(I,M,1)=POSS(I,M-1,1)
1080          POSS(I,M,2)=POSS(I,M-1,2)
           ENDIF
           POSS(I,Q,1)=L
           POSS(I,Q,2)=TOTAL
1090       CONTINUE
C
C          NOW USE SUBROUTINE "BESTSET" TO PICK OUT THE BEST CONSISTENT SET
C          OF POSSIBLE MINUTIA MATCHES FROM THE MATRIX "POSS".
C
           CALL BESTSET(POSS,SSKEY,SSPOINTS,SSEVENTS,FFEVENTS,ASCORE,
        *  FFPOINTS,MDT2,PDT2,CHOICES,MAXTURN,CUTOFF,PERFECT,SSDIST)
           TYPE 1100,ASCORE
1100       FORMAT(1X,'   SCORE:',I5)
1260       END
C
C
C          ........................SUBROUTINE.....................................
C          ........................SUBROUTINE.....................................
C          ........................SUBROUTINE.....................................
C
C          SUBROUTINE BESTSET TAKES THE MATRIX OF POSSIBLE MINUTIA COMPARISON
C          SCORES "POSS", AND EXTRACTS FROM THEM A HIGH SCORING SET THAT IS
C          DENSELY CONSISTENT WITH REGARD TO THE DISTANCE AND DIRECTION TESTS.
C
1800       SUBROUTINE BESTSET(POSS,SSKEY,SSPOINTS,SSEVENTS,FFEVENTS,ASCORE,
        *  POINTS,MDT,PDT,CHOICES,MAXTURN,CUTOFF,PERFECT,SSDIST)
           INTEGER*4 POSS(200,5,2),SSKEY(200),SSPOINTS,SSEVENTS(300,4)
           INTEGER*4 FFEVENTS(300,4),POINTS,I,J,K,L,M,N,ASCORE,C(200)
           INTEGER*4 SSDIST(200,200,2),DISTANCE,CUTOFF,REPEAT,CHOICES
           INTEGER*4 MAXTURN,TURN,DIRECTN,COMP(200,5),PERFECT,MDT,PDT
           LOGICAL*1 PAIR(200,5,200,5)
           ASCORE=0
C
C          RUN THROUGH EVERY PAIRING OF CANDIDATE MINUTIA AND CHECK FOR
C          COMPATABILITY. THERE ARE THREE REQUIREMENTS: -
C
C                   (A) THAT NO TWO CANDIDATES (FOR TWO DIFFERENT SEARCH
C                           MINUTIA) SHOULD BE THE SAME FILE MINUTIA.
C                   (B) THAT THEIR LINEAR DISTANCE APART SHOULD BE EQUAL
C                           (WITHIN STATED TOLERANCE) TO THE DISTANCE BETWEEN
C                           THE TWO RELEVANT SEARCH MINUTIAE.
C                   (C) THAT THE ORIENTATION OF ONE WITH RESPECT TO THE OTHER
C                           SHOULD BE WITHIN "MAXTURN" OF THE CORRESPONDING
C                           RELATIVE ORIENTATION OF THE TWO APPROPRIATE SEARCH
```

```
C          MINUTIAE.(THIS LAST TEST IS ONLY APPLIED WHEN THE
C          DISTANCE BETWEEN MINUTIA EXCEEDS 5.)
C
C     STORE A .TRUE. IN PAIR(I,J,K,L) IF CANDIDATE J FOR SEARCH MINUTIA I
C     IS COMPATIBLE WITH CANDIDATE L FOR SEARCH MINUTIA K.
C
      DO 1815 I=1,SSPOINTS-1
      DO 1814 J=1,CHOICES
      IF (POSS(I,J,1).EQ.0) GOTO 1814
      DO 1813 K=I+1,SSPOINTS
      DO 1812 L=1,CHOICES
      IF (POSS(K,L,1).EQ.0) GOTO 1812
      IF (POSS(I,J,1).EQ.POSS(K,L,1)) THEN
         PAIR(I,J,K,L)=.FALSE.
      ELSE
         M=DISTANCE(FFEVENTS(POSS(I,J,1),2),FFEVENTS(POSS(I,J,1),4),
     *      FFEVENTS(POSS(K,L,1),2),FFEVENTS(POSS(K,L,1),4))
         IF (ABS(M-SSDIST(I,K,1)).GT.MAX(MDT,
     *      ((SSDIST(I,K,1)*PDT)+50)/100)) THEN
            PAIR(I,J,K,L)=.FALSE.
         ELSE
            IF (M.GT.5) THEN
               N=DIRECTN(FFEVENTS(POSS(I,J,1),2),FFEVENTS(POSS(I,J,1),4),
     *            FFEVENTS(POSS(K,L,1),2),FFEVENTS(POSS(K,L,1),4))
               TURN=ABS(N-SSDIST(I,K,2))
               IF (TURN.GT.180) TURN =360-TURN
               IF (TURN.GT.MAXTURN) THEN
                  PAIR(I,J,K,L)=.FALSE.
               ELSE
                  PAIR(I,J,K,L)=.TRUE.
               ENDIF
            ELSE
               PAIR(I,J,K,L)=.TRUE.
            ENDIF
         ENDIF
      ENDIF
      PAIR(K,L,I,J)=PAIR(I,J,K,L)
1812  CONTINUE
1813  CONTINUE
1814  CONTINUE
1815  CONTINUE
C
C     CALCULATE A 'MAXIMUM COMPATIBLE SCORE' BY ADDING TO IT THE HIGHEST
C     SCORES FROM EACH OTHER COLUMN THAT COME FROM COMPATIBLE CANDIDATES.
C     STORE THESE 'MAXIMUM COMPATIBLE SCORES' AS COMP(I,J) - FOR THE
C     J'TH CANDIDATE IN THE I'TH COLUMN. THIS "COMP" VALUE IS COMPUTED
C     FOR EACH CANDIDATE IN THE POSS TABLE.
C
      DO 1835 I=1,SSPOINTS
      J=1
1817  COMP(I,J)=POSS(I,J,2)
      DO 1825 K=1,SSPOINTS
      IF (K.EQ.I) GOTO 1825
      L=1
      M=0
1820  IF (PAIR(I,J,K,L)) M=MAX(M,POSS(K,L,2))
      IF (L.LT.CHOICES.AND.POSS(K,L+1,1).GT.0) THEN
         L=L+1
         GOTO 1820
      ENDIF
      COMP(I,J)=COMP(I,J)+M
1825  CONTINUE
1830  IF (J.LT.CHOICES.AND.POSS(I,J+1,1).GT.0) THEN
         J=J+1
         GOTO 1817
      ENDIF
1835  CONTINUE
      IF (CHOICES.EQ.1) GOTO 1870
C
C     NOW PICK THE HIGHEST 'COMP' VALUE IN EACH COLUMN AND RECORD ITS
C     POSITION AS C(I) (FOR THE I'TH COLUMN).
C
      DO 1850 I=1,SSPOINTS
      C(I)=1
      J=2
1840  IF (COMP(I,J).GT.COMP(I,C(I))) C(I)=J
      IF (J.LT.CHOICES.AND.POSS(I,J+1,1).GT.0) THEN
         J=J+1
         GOTO 1840
```

```
              ENDIF
1850          CONTINUE
C
C             NOW IGNORE ALL CANDIDATES EXCEPT THE ONE SELECTED FROM EACH
C             COLUMN AS DESCRIBED ABOVE. FOR EACH OF THESE RECALCULATE
C             'COMP(I,1)' ON THE BASIS OF ONLY THE OTHER SELECTED CANDIDATES.
C
              DO 1855 I=1,SSPOINTS
1855          COMP(I,C(I))=POSS(I,C(I),2)
              DO 1860 I=1,SSPOINTS-1
              DO 1860 K=I+1,SSPOINTS
              IF (PAIR(I,C(I),K,C(K))) THEN
                  COMP(I,C(I))=COMP(I,C(I))+POSS(K,C(K),2)
                  COMP(K,C(K))=COMP(K,C(K))+POSS(I,C(I),2)
              ENDIF
1860          CONTINUE
C
C             NOW TOTAL ALL THE "COMP" SCORES HIGHER THAN "CUTOFF", COUNTING
C             THE NUMBER OF MINUTIA THAT MAKE THE CUT AS "POINTS".
C
1870          ASCORE=0
              POINTS=0
              DO 1875 I=1,SSPOINTS
              IF (COMP(I,C(I)).GE.(CUTOFF*PERFECT)/100) THEN
                  POINTS=POINTS+1
                  ASCORE=ASCORE+COMP(I,C(I))
              ENDIF
1875          CONTINUE
              ASCORE=ASCORE/SSPOINTS
1880          RETURN
1890          END
C
C             .......................SUBROUTINE...............................
C             .......................SUBROUTINE...............................
C             .......................SUBROUTINE...............................
C
C             SUBROUTINE SETSCORE SETS UP THE SCORE REFERENCE TABLE "SCORE".
C             IT DOES SO ACCORDING TO POLICY WITH REGARD TO CLOSE MATCH
C             SCORES, AND UPPER BOUND AS DETERMINED BY THE PARAMETERS 'BOUND'
C             AND 'CMS'.
C
2000          SUBROUTINE SETSCORE (BOUND,CMS,SCORE)
              INTEGER*4 SCORE(0:15,0:15),I,J,CMS,BOUND
              DO 2010 I=0,15
              DO 2010 J=0,15
2010          SCORE(I,J)=-1
C
C             EXACT MATCH SCORES FOR 0,2,3,4,5,6,7,8,A,B,C
C
              SCORE(0,0)=0
              SCORE(10,10)=0
              SCORE(11,11)=0
              DO 2020 I=2,8
2020          SCORE(I,I)=MIN(BOUND,9)
              SCORE(5,5)=BOUND
              SCORE(12,12)=BOUND
C
C             NOW OTHER CODES APPEARING OPPOSITE '0's,A's,B's or C's.
C
              DO 2025 I=1,12
              SCORE(I,0)=0
2025          SCORE(0,I)=0
              DO 2030 I=0,12
              DO 2029 J=10,12
              IF (I.EQ.J) GOTO 2029
              SCORE(I,J)=0
              SCORE(J,I)=0
2029          CONTINUE
2030          CONTINUE
C
C             CLOSE MATCH SCORES.
C
              DO 2040 I=2,7
              IF (I.EQ.4.OR.I.EQ.5) GOTO 2040
              SCORE(I,I+1)=CMS
              SCORE(I+1,I)=CMS
2040          CONTINUE
2045          RETURN
2050          END
C
```

```
C
C     ........................SUBROUTINE.................................
C     ........................SUBROUTINE.................................
C     ........................SUBROUTINE.................................
C
C     SUBROUTINE MATRIXFILE DOES AS PER MATRIXSEARCH, BUT WITHOUT ANY
C     SHIFTS LEFT OR RIGHT.
C
2100  SUBROUTINE MATRIXFILE(MAXSHIFT,LENGTH,VFILE,MFILE)
      INTEGER*4 MAXSHIFT,LENGTH,VFILE(100,2),MFILE(21,100,2),I,J,K
      DO 2120 I=1,2*MAXSHIFT+1
      DO 2120 J=1,LENGTH
      DO 2120 K=1,2
2120  MFILE(I,J,K)=VFILE(J,K)
2130  RETURN
2140  END
C
C
C
C     ........................SUBROUTINE.................................
C     ........................SUBROUTINE.................................
C     ........................SUBROUTINE.................................
C
C     SUBROUTINE MATRIXSEARCH FORMS A MATRIX OF THE APPROPRIATE SIZE
C     BY DUPLICATING VSEARCH ENOUGH TIMES TO ALLOW FOR UP TO
C     'MAXSHIFT' RIDGE SHIFTS IN EITHER DIRECTION. EACH DUPLICATION
C     IS SHIFTED TO LEFT OR RIGHT BY THE APPROPRIATE NUMBER OF DIGIT
C     PAIRS. SOME DIGITS ARE LOST AT ONE END OF THE SERIES, AND THE
C     OTHER END IS PADDED WITH 'F'S.
C
C     THE SECOND LAYER OF MSEARCH IS COMPOSED OF THE DISTANCE
C     MEASURES FROM VSEARCH, LAYED OUT IN A MANNER THAT CORRESPONDS
C     DIRECTLY WITH THE EVENTS CODES FROM VSEARCH.
C
2200  SUBROUTINE MATRIXSEARCH(MAXSHIFT,LENGTH,VSEARCH,MSEARCH)
      INTEGER*4 LENGTH,MAXSHIFT,VSEARCH(100,2),MSEARCH(21,100,2)
      INTEGER*4 I,J,K
      DO 2220 I=1,MAXSHIFT
      DO 2220 J=1,I*2
      DO 2220 K=1,2
      MSEARCH(MAXSHIFT+1+I,J,K)=15
2220  MSEARCH(MAXSHIFT+1-I,LENGTH+1-J,K)=15
      DO 2230 I=1,MAXSHIFT
      DO 2230 J=1,LENGTH-(I*2)
      DO 2230 K=1,2
      MSEARCH(MAXSHIFT+1+I,(2*I)+J,K)=VSEARCH(J,K)
2230  MSEARCH(MAXSHIFT+1-I,J,K)=VSEARCH(J+(I*2),K)
      DO 2240 J=1,LENGTH
      DO 2240 K=1,2
2240  MSEARCH(MAXSHIFT+1,J,K)=VSEARCH(J,K)
2250  RETURN
2260  END
C
C
C     ........................SUBROUTINE.................................
C     ........................SUBROUTINE.................................
C     ........................SUBROUTINE.................................
C
C     SUBROUTINE CONTINUITY CONSTRUCTS THE CONTINUITY MATRIX "CONT"
C     FROM THE PRINT COORDINATE SET ("EVENTS").
C     IT RETURNS THE CONTINUITY MATRIX READY FOR VECTOR EXTRACTION.
C
3200  SUBROUTINE CONTINUITY(EVENTS,SETS,MOLES,CONT,RIDGES)
      INTEGER*4 EVENTS(300,4),CONT(0:300,100,4),EXTRA
      INTEGER*4 DUMMY,RIDGES(0:300),I,J,K,L,M,N
      INTEGER*4 REPEAT,SETS,MOLES,INDEX(101:1000,2)
C
C     FIRST RUN THROUGH THE EVENTS COORDINATE SET TO ESTABLISH : -
C
C          (A) HOW MANY RIDGES (IN ADDITION TO "MOLES") ARE NEEDED
C     AT THE START TO ACCOMODATE EVERY STATED RIDGE-COUNT AFTER
C     PROVISION OF THE DEFAULT "EDGE-TOPOLOGY". THIS NUMBER WILL BE
C     CALLED 'EXTRA'.
C
C          (B) HOW MUCH OF "CONT" DO WE NEED TO USE.
C
C     'J' IS USED HERE TO KEEP ACCOUNT OF HOW MANY RIDGES THERE WOULD
C     BE AT EACH STAGE IF NO 'EXTRA' WERE PROVIDED.
C
      EXTRA=0
      RIDGES(0)=MOLES
```

```
              J=MOLES
              DO 3220 I=1,SETS
              K=EVENTS(I,1)
              L=0
              IF (K.EQ.0.OR.K.EQ.3.OR.K.EQ.7.OR.K.EQ.10.OR.K.EQ.11) THEN
                  L=1
              ELSE
                  IF (K.EQ.2.OR.K.EQ.4.OR.K.EQ.12) L=2
              ENDIF
              IF (EVENTS(I,3)+L.GT.RIDGES(I-1)+EXTRA) THEN
                  EXTRA=EVENTS(I,3)-RIDGES(I-1)+L
              ENDIF
              IF (K.EQ.3.OR.K.EQ.2.OR.K.EQ.0.OR.K.EQ.10.OR.K.EQ.11) THEN
                  J=J-MAX(1,(EVENTS(I,4)/100))
              ELSE
                  IF (K.EQ.4) THEN
                      J=J-2
                  ELSE
                      IF (K.EQ.5) THEN
                          J=J+2
                      ELSE
                          IF (K.NE.12) J=J+MAX(1,(EVENTS(I,4)/100))
                      ENDIF
                  ENDIF
              ENDIF
              RIDGES(I)=J
3220          CONTINUE
C
C             CHECK THAT "EXTRA" IS LARGE ENOUGH TO GIVE AT LEAST "MOLES"
C             RIDGES AT RIGHT HAND BOUNDARY.
C
              IF (RIDGES(SETS)+EXTRA.LT.MOLES) EXTRA=MOLES-RIDGES(SETS)
C
C             REEVALUATE THE NO. OF RIDGES AT EACH POINT.
C
              DO 3225 I=0,SETS
3225          RIDGES(I)=RIDGES(I)+EXTRA
C
C             SET UP THE BOUNDARY MATRIX IN THE LEFT HAND EDGE OF THE
C             CONTINUITY MATRIX USING DUMMY NUMBERS FOR CLOCKWISE AND
C             ANTICLOCKWISE RIDGE EVENTS AS REQUIRED.
C
              DUMMY=101
              IF (MOLES.GT.0) THEN
                  DO 3240 I=1,MOLES
                  CONT(0,I,1)=DUMMY
                  CONT(0,I,3)=DUMMY+1
                  DUMMY=DUMMY+2
3240              CONTINUE
              ENDIF
              IF (EXTRA.GT.0) THEN
                  DO 3250 I=MOLES+1,MOLES+EXTRA
                  CONT(0,I,1)=0          ! DEFAULT "OUT OF SIGHT" TOPOLOGY.
                  CONT(0,I,2)=-1         ! "NO DISTANCE TESTS" INDICATOR.
                  CONT(0,I,3)=DUMMY
                  DUMMY=DUMMY+1
3250              CONTINUE
              ENDIF
C
C             NOW RUN THROUGH EACH "EVENTS" IN THE SET OF "EVENTS", MAKING
C             THE APPROPRIATE ENTRIES IN THE "CONT" MATRIX AS YOU GO.
C
3300          DO 3600 I=1,SETS
C
C             ACCORDING TO THE RIDGE EVENT TYPE - DO THE APPROPRIATE SET
C             OF ALTERATIONS TO THE MATRICES "CONT" AND "INDEX".
C
              GOTO (3320,3340,3360,3380,3400,3420,3440,3460,3310,3310,3320,
             *      3320,3500,3340,3340) (EVENTS(I,1)+1)
C
C             CONTROL PASSED TO 3310 IF EVENTS(I,1) IS 8 OR 9.(ILLEGAL CODES)
C
3310          TYPE *,'ILLEGAL CODE FOUND IN FILESET COORDINATES.'
              TYPE *,'SEARCH ABORTED.'
              TYPE 3314,CARDSET,CARDNO,FINGNO
3314          FORMAT(1X,'CARD:',I4,'/',I3,'  FINGER :',I2)
3315          STOP
C
C             CONTROL PASSED TO 3320 IF EVENTS(I,1) IS 0,A OR B - I.E. RIDGE RUNS
C             OUT OF SIGHT, OR INTO SCARRED OR UNCLEAR TISSUE.
```

```
C
3320      IF (EVENTS(I,3).NE.0) THEN
              DO 3325 J=1,EVENTS(I,3)
              CONT(I,J,1)=CONT(I-1,J,1)
              CONT(I,J,2)=CONT(I-1,J,2)
3325          CONT(I,J,3)=CONT(I-1,J,3)
          ENDIF
          K=MAX(1,EVENTS(I,4)/100)
          IF (K.GT.1) EVENTS(I,4)=EVENTS(I,4)-100*(EVENTS(I,4)/100)
          IF (EVENTS(I,3).NE.RIDGES(I)) THEN        ! I.E. NOT THE
              DO 3330 J=EVENTS(I,3)+1,RIDGES(I)     ! OUTERMOST RIDGE.
              CONT(I,J,1)=CONT(I-1,J+K,1)
              CONT(I,J,2)=CONT(I-1,J+K,2)
3330          CONT(I,J,3)=CONT(I-1,J+K,3)
          ENDIF
          DO 3335 J=1,K
          INDEX(CONT(I-1,EVENTS(I,3)+J,3),1)=EVENTS(I,1)
          INDEX(CONT(I-1,EVENTS(I,3)+J,3),2)=I
3335      CONTINUE
          GOTO 3600
C
C         CONTROL PASSED TO 3340 IF EVENTS(I,1) = 1,D OR E.  I.E. RIDGE(S)
C         COMES IN FROM BEING OUT OF SIGHT, OR FROM SCARRED OR UNCLEAR TISSUE.
C
3340      IF (EVENTS(I,3).NE.0) THEN
              DO 3345 J=1,EVENTS(I,3)
              CONT(I,J,1)=CONT(I-1,J,1)
              CONT(I,J,2)=CONT(I-1,J,2)
3345          CONT(I,J,3)=CONT(I-1,J,3)
          ENDIF
          K=MAX(1,EVENTS(I,4)/100)
          IF (K.GT.1) EVENTS(I,4)=EVENTS(I,4)-100*(EVENTS(I,4)/100)
          IF (EVENTS(I,3).NE.RIDGES(I)-K) THEN
              DO 3350 J=EVENTS(I,3)+K+1,RIDGES(I)
              CONT(I,J,1)=CONT(I-1,J-K,1)
              CONT(I,J,2)=CONT(I-1,J-K,2)
3350          CONT(I,J,3)=CONT(I-1,J-K,3)
          ENDIF
          DO 3355 J=1,K
          CONT(I,EVENTS(I,3)+J,1)=EVENTS(I,1)-1-2*(EVENTS(I,1)/10)
          CONT(I,EVENTS(I,3)+J,2)=I
          CONT(I,EVENTS(I,3)+J,3)=DUMMY
          DUMMY=DUMMY+1
3355      CONTINUE
          GOTO 3600
C
C         CONTROL PASSED TO 3360 IF EVENTS(I,1)=2 I.E. BIFURCATION FACING
C         TOWARDS THE LEFT BOUNDARY.
C
3360      IF (EVENTS(I,3).NE.0) THEN
              DO 3365 J=1,EVENTS(I,3)
              CONT(I,J,1)=CONT(I-1,J,1)
              CONT(I,J,2)=CONT(I-1,J,2)
3365          CONT(I,J,3)=CONT(I-1,J,3)
          ENDIF
          IF (EVENTS(I,3).NE.RIDGES(I)-1) THEN
              DO 3370 J=EVENTS(I,3)+2,RIDGES(I)
              CONT(I,J,1)=CONT(I-1,J+1,1)
              CONT(I,J,2)=CONT(I-1,J+1,2)
3370          CONT(I,J,3)=CONT(I-1,J+1,3)
          ENDIF
          CONT(I,EVENTS(I,3)+1,1)=7
          CONT(I,EVENTS(I,3)+1,2)=I
          CONT(I,EVENTS(I,3)+1,3)=DUMMY
          DUMMY=DUMMY+1
          INDEX(CONT(I-1,EVENTS(I,3)+1,3),1)=2
          INDEX(CONT(I-1,EVENTS(I,3)+1,3),2)=I
          INDEX(CONT(I-1,EVENTS(I,3)+2,3),1)=4
          INDEX(CONT(I-1,EVENTS(I,3)+2,3),2)=I
          GOTO 3600
C
C         CONTROL PASSED TO 3380 IF EVENTS(I,1)=3 I.E. RIDGE ENDS.
C
3380      IF (EVENTS(I,3).GE.2) THEN
              DO 3385 J=1,EVENTS(I,3)-1
              CONT(I,J,1)=CONT(I-1,J,1)
              CONT(I,J,2)=CONT(I-1,J,2)
3385          CONT(I,J,3)=CONT(I-1,J,3)
          ENDIF
```

```
               IF (EVENTS(I,3).LE.RIDGES(I)-2) THEN
                   DO 3390 J=EVENTS(I,3)+2,RIDGES(I)
                   CONT(I,J,1)=CONT(I-1,J+1,1)
                   CONT(I,J,2)=CONT(I-1,J+1,2)
3390               CONT(I,J,3)=CONT(I-1,J+1,3)
               ENDIF
               IF (EVENTS(I,3).GE.1) THEN
                   CONT(I,EVENTS(I,3),1)=8
                   CONT(I,EVENTS(I,3),2)=I
                   CONT(I,EVENTS(I,3),3)=CONT(I-1,EVENTS(I,3),3)
               ENDIF
               IF (EVENTS(I,3).LE.RIDGES(I)-1) THEN
                   CONT(I,EVENTS(I,3)+1,1)=6
                   CONT(I,EVENTS(I,3)+1,2)=I
                   CONT(I,EVENTS(I,3)+1,3)=CONT(I-1,EVENTS(I,3)+2,3)
               ENDIF
               INDEX(CONT(I-1,EVENTS(I,3)+1,3),1)=3
               INDEX(CONT(I-1,EVENTS(I,3)+1,3),2)=I
               GOTO 3600
C
C       CONTROL PASSED TO 3400 IF EVENTS(I,1)=4 I.E. HAIRPIN POINTING
C       TOWARDS THE LEFT.
C
3400           IF (EVENTS(I,3).NE.0) THEN
                   DO 3405 J=1,EVENTS(I,3)
                   CONT(I,J,1)=CONT(I-1,J,1)
                   CONT(I,J,2)=CONT(I-1,J,2)
3405               CONT(I,J,3)=CONT(I-1,J,3)
               ENDIF
               IF (EVENTS(I,3).LT.RIDGES(I)) THEN
                   DO 3410 J=EVENTS(I,3)+1,RIDGES(I)
                   CONT(I,J,1)=CONT(I-1,J+2,1)
                   CONT(I,J,2)=CONT(I-1,J+2,2)
3410               CONT(I,J,3)=CONT(I-1,J+2,3)
               ENDIF
               INDEX(CONT(I-1,EVENTS(I,3)+1,3),1)=CONT(I-1,EVENTS(I,3)+2,1)
               INDEX(CONT(I-1,EVENTS(I,3)+2,3),1)=CONT(I-1,EVENTS(I,3)+1,1)
               INDEX(CONT(I-1,EVENTS(I,3)+1,3),2)=CONT(I-1,EVENTS(I,3)+2,2)
               INDEX(CONT(I-1,EVENTS(I,3)+2,3),2)=CONT(I-1,EVENTS(I,3)+1,2)
               GOTO 3600
C
C       CONTROL PASSED TO 3420 IF EVENTS(I,3)=5 I.E. HAIRPIN FACING
C       TOWARDS THE RIGHT.
C
3420           IF (EVENTS(I,3).NE.0) THEN
                   DO 3425 J=1,EVENTS(I,3)
                   CONT(I,J,1)=CONT(I-1,J,1)
                   CONT(I,J,2)=CONT(I-1,J,2)
3425               CONT(I,J,3)=CONT(I-1,J,3)
               ENDIF
               IF (EVENTS(I,3).LE.RIDGES(I)-3) THEN
                   DO 3430 J=EVENTS(I,3)+3,RIDGES(I)
                   CONT(I,J,1)=CONT(I-1,J-2,1)
                   CONT(I,J,2)=CONT(I-1,J-2,2)
3430               CONT(I,J,3)=CONT(I-1,J-2,3)
               ENDIF
               CONT(I,EVENTS(I,3)+1,1)=DUMMY
               CONT(I,EVENTS(I,3)+1,3)=DUMMY+1
               CONT(I,EVENTS(I,3)+2,1)=DUMMY+1
               CONT(I,EVENTS(I,3)+2,3)=DUMMY
               DUMMY=DUMMY+2
               GOTO 3600
C
C       CONTROL PASSED TO 3440 IF EVENTS(I,1)=6 I.E. RIDGE BEGINS
C       (RIDGE-ENDING FACING THE OPPOSITE WAY TO A '3').
C
3440           IF (EVENTS(I,3).GE.2) THEN
                   DO 3445 J=1,EVENTS(I,3)-1
                   CONT(I,J,1)=CONT(I-1,J,1)
                   CONT(I,J,2)=CONT(I-1,J,2)
3445               CONT(I,J,3)=CONT(I-1,J,3)
               ENDIF
               IF (EVENTS(I,3).LE.RIDGES(I)-3) THEN
                   DO 3450 J=EVENTS(I,3)+3,RIDGES(I)
                   CONT(I,J,1)=CONT(I-1,J-1,1)
                   CONT(I,J,2)=CONT(I-1,J-1,2)
3450               CONT(I,J,3)=CONT(I-1,J-1,3)
               ENDIF
               IF (EVENTS(I,3).GE.1) THEN
```

```
              CONT(I,EVENTS(I,3),1)=CONT(I-1,EVENTS(I,3),1)
              CONT(I,EVENTS(I,3),2)=CONT(I-1,EVENTS(I,3),2)
              CONT(I,EVENTS(I,3),3)=DUMMY
              DUMMY=DUMMY+1
              INDEX(CONT(I-1,EVENTS(I,3),3),1)=6
              INDEX(CONT(I-1,EVENTS(I,3),3),2)=I
          ENDIF
          CONT(I,EVENTS(I,3)+1,1)=3
          CONT(I,EVENTS(I,3)+1,2)=I
          CONT(I,EVENTS(I,3)+1,3)=DUMMY
          DUMMY=DUMMY+1
          IF (EVENTS(I,3).LE.RIDGES(I)-2) THEN
              CONT(I,EVENTS(I,3)+2,1)=CONT(I-1,EVENTS(I,3)+1,1)
              CONT(I,EVENTS(I,3)+2,2)=CONT(I-1,EVENTS(I,3)+1,2)
              CONT(I,EVENTS(I,3)+2,3)=DUMMY
              DUMMY=DUMMY+1
              INDEX(CONT(I-1,EVENTS(I,3)+1,3),1)=8
              INDEX(CONT(I-1,EVENTS(I,3)+1,3),2)=I
          ENDIF
          GOTO 3600
C
C         CONTROL PASSED TO 3460 IF EVENTS(I,1)=7 I.E. BIFURCATION
C         FACING TOWARDS THE RIGHT.
C
3460      IF (EVENTS(I,3).NE.0) THEN
              DO 3465 J=1,EVENTS(I,3)
              CONT(I,J,1)=CONT(I-1,J,1)
              CONT(I,J,2)=CONT(I-1,J,2)
3465          CONT(I,J,3)=CONT(I-1,J,3)
          ENDIF
          IF (EVENTS(I,3).LE.RIDGES(I)-3) THEN
              DO 3470 J=EVENTS(I,3)+3,RIDGES(I)
              CONT(I,J,1)=CONT(I-1,J-1,1)
              CONT(I,J,2)=CONT(I-1,J-1,2)
3470          CONT(I,J,3)=CONT(I-1,J-1,3)
          ENDIF
          CONT(I,EVENTS(I,3)+1,1)=4
          CONT(I,EVENTS(I,3)+1,2)=I
          CONT(I,EVENTS(I,3)+1,3)=DUMMY
          DUMMY=DUMMY+1
          CONT(I,EVENTS(I,3)+2,1)=2
          CONT(I,EVENTS(I,3)+2,2)=I
          CONT(I,EVENTS(I,3)+2,3)=DUMMY
          DUMMY=DUMMY+1
          INDEX(CONT(I-1,EVENTS(I,3)+1,3),1)=7
          INDEX(CONT(I-1,EVENTS(I,3)+1,3),2)=I
          GOTO 3600
C
C         CONTROL PASSED TO 3500 IF EVENTS(I,1)=12 I.E. RIDGE-EVENTS IS A
C         COMPOUND. (ASSUMED TWO RIDGES IN, AND TWO OUT.)
C
3500      IF (EVENTS(I,3).NE.0) THEN
              DO 3505 J=1,EVENTS(I,3)
              CONT(I,J,1)=CONT(I-1,J,1)
              CONT(I,J,2)=CONT(I-1,J,2)
3505          CONT(I,J,3)=CONT(I-1,J,3)
          ENDIF
          IF (EVENTS(I,3).LE.RIDGES(I)-3) THEN
              DO 3510 J=EVENTS(I,3)+3,RIDGES(I)
              CONT(I,J,1)=CONT(I-1,J,1)
              CONT(I,J,2)=CONT(I-1,J,2)
3510          CONT(I,J,3)=CONT(I-1,J,3)
          ENDIF
          CONT(I,EVENTS(I,3)+1,1)=12
          CONT(I,EVENTS(I,3)+1,2)=I
          CONT(I,EVENTS(I,3)+1,3)=DUMMY
          DUMMY=DUMMY+1
          CONT(I,EVENTS(I,3)+2,1)=12
          CONT(I,EVENTS(I,3)+2,2)=I
          CONT(I,EVENTS(I,3)+2,3)=DUMMY
          DUMMY=DUMMY+1
          INDEX(CONT(I-1,EVENTS(I,3)+1,3),1)=12
          INDEX(CONT(I-1,EVENTS(I,3)+1,3),2)=I
          INDEX(CONT(I-1,EVENTS(I,3)+2,3),1)=12
          INDEX(CONT(I-1,EVENTS(I,3)+2,3),2)=I
          GOTO 3600
C
C         3600 IS THE END OF THE ITERATIVE LOOP STARTED AT LINE 3300.
C
3600      CONTINUE
```

```
C
C        NOW SEW THE BOUNDARIES TOGETHER.
C
         IF (MOLES.GT.0) THEN
             DO 3610 J=1,MOLES
             INDEX(CONT(SETS,J,3),1)=CONT(0,J,3)
             INDEX(CONT(SETS,J,3),2)=CONT(0,J,4)
             INDEX(CONT(0,J,1),1)=CONT(SETS,J,1)
             INDEX(CONT(0,J,1),2)=CONT(SETS,J,2)
3610         CONTINUE
         ENDIF
         IF (RIDGES(SETS).GT.MOLES) THEN
             DO 3620 J=MOLES+1,RIDGES(SETS)
             INDEX(CONT(SETS,J,3),1)=0     ! DEFAULT "OUT OF SIGHT" TOPOLOGY.
             INDEX(CONT(SETS,J,3),2)=-1    ! "NO DISTANCE TESTS" INDICATOR.
3620         CONTINUE
         ENDIF
C
C        FIND ANY INDEX ENTRIES THAT ARE DUMMY NUMBERS, AND EQUATE WITH
C        THAT OTHER INDEX ENTRY.
C
3625     REPEAT=0
         DO 3630 I=101,DUMMY-1
         IF (INDEX(I,1).LE.12) GOTO 3630
         IF (INDEX(I,1).EQ.I) THEN
             INDEX(I,1)=5              ! LOOPING RIDGE FOUND.
             INDEX(I,2)=-1             ! "NO DISTANCE TESTS" INDICATOR.
         ELSE
             INDEX(I,1)=INDEX(INDEX(I,1),1)
             INDEX(I,2)=INDEX(INDEX(I,1),2)
             REPEAT=1
         ENDIF
3630     CONTINUE
         IF (REPEAT.EQ.1) GOTO 3625
C
C        NOW REPLACE ALL THE DUMMY ENTRIES IN "CONT" WITH THE
C        INTERPRETATIVE CODES NOW HELD IN "INDEX".CHECK FOR ERRONEOUS
C        CODES AS PRECAUTION AGAINST DEFECTIVE FILE SETS.
C
         DO 3660 I=0,SETS
         DO 3660 J=1,RIDGES(I)
         IF (CONT(I,J,3).GT.100) THEN
             CONT(I,J,4)=INDEX(CONT(I,J,3),2)
             CONT(I,J,3)=INDEX(CONT(I,J,3),1)
         ENDIF
         IF (CONT(I,J,1).GT.100) THEN
             CONT(I,J,2)=INDEX(CONT(I,J,1),2)
             CONT(I,J,1)=INDEX(CONT(I,J,1),1)
         ENDIF
         DO 3657 K=1,3,2
         IF (CONT(I,J,K).LT.0.OR.CONT(I,J,K).GT.12) CONT(I,J,K)=15
3657     CONTINUE
3660     CONTINUE
3680     RETURN
3690     END
C        ..........................SUBROUTINE..........................
C        ..........................SUBROUTINE..........................
C        ..........................SUBROUTINE..........................
C
C        SUBROUTINE 'COMPARE' COMPARES THE MATRIX MSEARCH WITH MFILE AND
C        RETURNS A SCORE 'TOTAL'.
C
4000     SUBROUTINE COMPARE(MSEARCH,MFILE,SSEVENTS,FFEVENTS,SCORE,MAXSHIFT,
        *LENGTH,MDT,PDT,TOTAL,SSCENTRE,FFCENTRE)
         INTEGER*4 MAXSHIFT,LENGTH,I,J,K,L,M,N,P,STOP,START
         INTEGER*4 MSEARCH(21,100,2),MFILE(21,100,2),SCORE(0:15,0:15)
         INTEGER*4 TOTAL,COMSCORE(21,100),SMALL(0:22,50),PRODUCT
         INTEGER*4 MDT,PDT,SSEVENTS(300,4),FFEVENTS(300,4),SSCENTRE,FFCENTRE
         INTEGER*4 DISTANCE
         N=2*MAXSHIFT+1
C
C        EVALUATE INITIAL COMPARISON MATRIX AND APPLY DISTANCE TESTS.
C
C                AS THE CODES '0','A','B' AND '5'HAVE MEANINGLESS DISTANCE
C        MEASURES ASSOCIATED WITH THEM, NO DISTANCE TESTS WILL BE APPLIED
C        WHERE ANY OF THESE CODES ARE INVOLVED. HOWEVER THE INITIAL
C        ASSIGNMENT OF SCORE INVOLVING A '0','A' OR 'B' WILL BE 0 OR -1
C        DEPENDING ON THE DISTANCES INVOLVED. -1 IS ASSIGNED IF
C        THE DISTANCE MEASURES SUGGEST THAT A CHARACTERISTIC SHOULD HAVE
```

```
C       BEEN SEEN ON THE PICTURE 'IN SIGHT' WHEREAS, IN FACT, IT WAS
C       NOT.
C
        DO 4100 I=1,N
        DO 4100 J=1,LENGTH
        COMSCORE(I,J)=SCORE(MSEARCH(I,J,1),MFILE(I,J,1))
C
C       NOW EXAMINE WHERE
C       COMSCORE ENTRIES SHOULD BE REDUCED FROM 0 TO -1 BECAUSE OF
C       'RANGE OF SIGHT' CONSIDERATIONS, OR THROUGH MINUTIA DISTANCE TESTS.
C       NO DISTANCE TESTS WILL BE APPLIED IF A "-1" APPEARS AS EITHER
C       MSEARCH(I,J,2) OR MFILE(I,J,2) AS SUCH APPEARANCE INDICATES EITHER
C       AN EVENT-CODE OF '5', OR A "DEFAULT EDGE TOPOLOGY".
C
        IF (COMSCORE(I,J).EQ.-1) GOTO 4100
        IF (MSEARCH(I,J,2).EQ.-1.OR.MFILE(I,J,2).EQ.-1) GOTO 4100
        K=MSEARCH(I,J,1)
        L=MFILE(I,J,1)
        M=DISTANCE(SSEVENTS(SSCENTRE,2),SSEVENTS(SSCENTRE,4),
      *  SSEVENTS(MSEARCH(I,J,2),2),SSEVENTS(MSEARCH(I,J,2),4))
        P=DISTANCE(FFEVENTS(FFCENTRE,2),FFEVENTS(FFCENTRE,4),
      *  FFEVENTS(MFILE(I,J,2),2),FFEVENTS(MFILE(I,J,2),4))
        IF (K.EQ.0.OR.K.EQ.10.OR.K.EQ.11) THEN
            IF (L.EQ.0.OR.L.EQ.10.OR.L.EQ.11) GOTO 4100
            IF (P.LT.M-MAX(MDT,((PDT*M)+50)/100)) COMSCORE(I,J)=-1
        ELSE
            IF (L.EQ.0.OR.L.EQ.10.OR.L.EQ.11) THEN
                IF (M.LT.P-MAX(MDT,((PDT*P)+50)/100)) COMSCORE(I,J)=-1
            ELSE
                IF (ABS(M-P).GT.MAX(MDT,((PDT*MAX(M,P))+50)/100))
      *             COMSCORE(I,J)=-1     ! THIS IS GENERAL DISTANCE TEST.
            ENDIF
        ENDIF
4100    CONTINUE
C
C       APPLY FILTER FOR REDUCING SCORES WHERE '8'S AND '6'S APPEAR IN THEIR
C       EXPECTED PAIRING. REASON FOR THIS IS THAT SUCH APPEARANCES ARE MUCH
C       MORE COMMON THAN WOULD BE THE CASE IF '8'S AND '6'S WERE INDEPENDENT.
C       FILTER ALSO APPLIED FOR '2'S AND '4'S.
C
4140    DO 4150 L=4,8,4                  ! FOR '4' AND FOR '8'.
        DO 4150 I=1,N                    ! FOR EACH ROW OF COMSCORE.
        DO 4150 K=4,LENGTH,2             ! FOR EACH SUCCESSIVE PAIR OF DIGITS.
        IF(COMSCORE(I,K).GT.0.AND.COMSCORE(I,K-2).GT.0) THEN
            IF ((MSEARCH(I,K,1).EQ.L.OR.MFILE(I,K,1).EQ.L).AND.
      *        (MSEARCH(I,K-2,1).EQ.L-2.OR.MFILE(I,K-2,1).EQ.L-2)) THEN
                M=MAX(COMSCORE(I,K),COMSCORE(I,K-2))
                COMSCORE(I,K-2)=MIN(2,COMSCORE(I,K),COMSCORE(I,K-2))
                COMSCORE(I,K)=M
            ENDIF
        ENDIF
        IF(COMSCORE(I,K-1).GT.0.AND.COMSCORE(I,K-3).GT.0) THEN
            IF ((MSEARCH(I,K-1,1).EQ.L-2.OR.MFILE(I,K-1,1).EQ.L-2).AND.
      *        (MSEARCH(I,K-3,1).EQ.L.OR.MFILE(I,K-3,1).EQ.L)) THEN
                M=MAX(COMSCORE(I,K-1),COMSCORE(I,K-3))
                COMSCORE(I,K-3)=MIN(2,COMSCORE(I,K-1),COMSCORE(I,K-3))
                COMSCORE(I,K-1)=M
            ENDIF
        ENDIF
4150    CONTINUE
C
C       NOW WE CONDENSE EACH PAIR OF DIGITS INTO ONE SINGLE INTEGER VALUE.
C       IF BOTH ARE (-1) WE TAKE (-1)
C       IF ONE IS POSITIVE WE TAKE THAT
C       IF BOTH ARE POSITIVE WE TAKE THEIR SUM
C       THE RESULTING MATRIX IS CALLED 'SMALL(I,J)'.
C
        DO 4200 I=1,N
        DO 4200 J=1,(LENGTH/2)
        IF (COMSCORE(I,2*J-1).EQ.-1) THEN
            IF (COMSCORE(I,2*J).EQ.-1) THEN
                SMALL(I,J)=-1
            ELSE
                SMALL(I,J)=COMSCORE(I,2*J)
            ENDIF
        ELSE
            IF (COMSCORE(I,2*J).EQ.-1) THEN
                SMALL(I,J)=COMSCORE(I,2*J-1)
            ELSE
                SMALL(I,J)=COMSCORE(I,2*J-1)+COMSCORE(I,2*J)
```

```
              ENDIF
            ENDIF
4200     CONTINUE
C
C        NOW WE SWEEP THE MATRIX SMALL(I,J) FROM LEFT TO RIGHT, FINDING
C        EACH CONTINUOUSLY NON-(-1) SERIES. THE PRODUCT (SUM) IS
C        EVALUATED, AND THE HIGHEST PRODUCT RECORDED.
C
         TOTAL=0
         DO 4300 M=1,N
         L=1
         PRODUCT=-1
4210     IF (PRODUCT.EQ.-1) THEN
             IF (SMALL(M,L).NE.-1) THEN           ! FOUND START OF A SERIES.
                 PRODUCT=SMALL(M,L)
             ENDIF                                ! IF ENTRY AND PRODUCT ARE -1, DO
         ELSE                                     ! NOTHING.
             IF (SMALL(M,L).NE.-1) THEN           ! FOUND ANOTHER ELEMENT OF
                 PRODUCT=PRODUCT+SMALL(M,L)       ! SERIES ALREADY STARTED.
             ELSE
                 IF (PRODUCT.GT.TOTAL) TOTAL=PRODUCT
                 PRODUCT=-1
             ENDIF
         ENDIF
C
C        NOW MOVE ONE PLACE TO THE RIGHT.
C
         L=L+1
         IF (L.LE.LENGTH/2) GOTO 4210
C
C        END OF ROW REACHED.
C
         IF (PRODUCT.NE.-1) THEN                  ! THEN THE END OF THE ROW IS ALSO
             IF (PRODUCT.GT.TOTAL) TOTAL=PRODUCT   ! THE END OF A SERIES.
         ENDIF
4300     CONTINUE
4600     RETURN
4700     END
C
C
C        ........................FUNCTION..................................
C        ........................FUNCTION..................................
C        ........................FUNCTION..................................
C
C        FUNCTION DISTANCE GIVES THE LINEAR DISTANCE ( TO THE NEAREST
C        INTEGER) BETWEEN TWO POINTS WHOSE POLAR COORDINATES ARE PROVIDED.
C        THE COSINE FORMULA IS USED. THE ORDER OF COORDINATE INPUT IS :
C                 (THETA,R),(THETA,R)
C
5000     INTEGER*4 FUNCTION DISTANCE(I,J,K,L)
         INTEGER*4 I,J,K,L
         REAL*4 A,B
         A=COS((I-K)*3.14159/180.0)
         B=SQRT((J**2)+(L**2)-(2*J*L*A))
         DISTANCE=INT(B+0.5)
         RETURN
5010     END
C
C
C        ........................FUNCTION..................................
C        ........................FUNCTION..................................
C        ........................FUNCTION..................................
C
C        FUNCTION DIRECTN GIVES THE ORIENTATION (MEASURED FROM THE HORIZONTAL
C        IN THE SAME WAY AS THE 'POLAR' THETA) OF THE LINE BETWEEN TWO POINTS
C        WHOSE POLAR COORDINATES ARE PROVIDED.THE ORDER OF COORDINATE INPUT
C        IS :     (THETA,R),(THETA,R).
C
6000     INTEGER*4 FUNCTION DIRECTN(I,J,K,L)
         INTEGER*4 I,J,K,L
         REAL*4 A,B
         A=(L*SIN(K*3.14159/180.0))-(J*SIN(I*3.14159/180.0))
         B=(L*COS(K*3.14159/180.0))-(J*COS(I*3.14159/180.0))
         DIRECTN=(ATAN2(A,B))*180.0/3.14159
         RETURN
6010     END
```

Appendix B

```
C    ..........................Algorithm MATCH4. ....................
C
C
C    ***************************************************************
C    ***************************************************************
C
C    MATCH4 - Programme for comparison of two vectors, with their associated
C    distance measures, and formulation of a score (in range 0 to 100)
C    which reflects the similarity of the two prints represented by them.
C
C    This algorithm assumes that the score reference table (SCORE) has been
C    set up following analysis of the file set, and with reference to
C    scoring policy  regarding 'Close matches' etc. Also the value of the
C    'bandwidth' used to create the score tables was BAND.
C
C    The programme input is by way of the variable arrays VFILE & VSEARCH.
C    Both have dimensions 82 x 2. The first row of 82 contains the
C    topological event codes, and the second contains the associated
C    distance measures. VFILE is the file vector, and VSEARCH is the
C    search vector. The variable LENGTH takes the value 82 in this case.
C
C    Moreover we will assume that VFILE was self-matched when it was
C    introduced to the file collection, and that its 'perfect' self-mated
C    score was FPERFECT.
C
C    The programme parameters are as follows :-
C
C            MAXSHIFT - the maximum number of ridge shifts to be allowed
C    for in the vector comparison.
C                    recommended value:     0
C
C            HOPS - the maximum number of string 'breaks' in the condensed
C    matrix which are allowed to be repaired during score valuation.
C                    recommended value:     0
C
C            ADT - absolute distance tolerance allowed in the absolute
C    distance test.
C                    recommended value:     1
C
C            DDT - differential distance tolerance.
C                    recommended value:     1
C
C            SDT - summed distance tolerance.
C                    recommended value:     1
C
C    The programme output is the value of the variable RTOTAL. This is
C    the comparison score.
C    ***************************************************************
C    ***************************************************************
C
      INTEGER*4 VFILE(150,2),VSEARCH(150,2),MAXSHIFT
      INTEGER*4 MFILE(21,150,2),MSEARCH(21,150,2)
      INTEGER*4 I,J,K,L,M,N,TOTAL
      INTEGER*4 SCORE(15,15,50,2),ADT,DDT,SDT
      REAL*4 FPERFECT,SPERFECT,RTOTAL
      N=(LENGTH-1)/(2*BAND)+1
C
C     CALCULATE 'PERFECT' SCORE FOR SEARCH SERIES, AND RECORD ITS SQUARE
C     ROOT AS SPERFECT. ALSO CONVERT FPERFECT TO ITS OWN SQUARE ROOT.
C
      DO 542 K=1,LENGTH
      DO 542 L=1,2
542   MSEARCH(1,K,L)=VSEARCH(K,L)
      K=0
      CALL COMPARE(K,LENGTH,MSEARCH,MSEARCH,BAND,SCORE,K,TOTAL,
     *  ADT,DDT,SDT)
      SPERFECT=TOTAL
      SPERFECT=SQRT(SPERFECT)
      FPERFECT=SQRT(FPERFECT)
C
C     PREPARE MATRICES FOR COMPARISON, FROM THE VECTORS, AND COMPARE
C     THEM.
C
      CALL MATRIXSEARCH(MAXSHIFT,LENGTH,VSEACH,MSEARCH)
      CALL MATRIXFILE(MAXSHIFT,LENGTH,VFILE,MFILE)
      CALL COMPARE(MAXSHIFT,LENGTH,MSEARCH,MFILE,BAND,SCORE,HOPS,TOTAL,
     *  ADT,DDT,SDT)
C
```

```
C       NORMALISE THE SCORE WITH RESPECT TO THE SELF-MATED SCORES, AND
C       EXPRESS IT AS A PERCENTAGE.
C
        RTOTAL=100.0*TOTAL/(FPERFECT*SPERFECT)
850     END
C       .......................SUBROUTINE.......................................
C       .......................SUBROUTINE.......................................
C       .......................SUBROUTINE.......................................
C
C       MATRIXSEARCH FORMS A MATRIX OF THE APPROPRIATE SIZE BY DUPLICATING
C       VSEARCH  ENOUGH TIMES TO ALLOW FOR UP TO 'MAXSHIFT' RIDGE
C       SHIFTS IN EITHER DIRECTION. EACH DUPLICATION IS SHIFTED TO LEFT OR
C       RIGHT BY THE APPROPRIATE NUMBER OF DIGIT PAIRS. SOME DIGITS ARE LOST
C       AT ONE END OF THE SERIES, AND THE OTHER END IS PADDED WITH 'F'S.
C
C       THE SECOND LAYER OF MSEARCH IS COMPOSED OF THE DISTANCE MEASURES
C       FROM VSEARCH, LAYED OUT IN A MANNER THAT CORRESPONDS DIRECTLY WITH
C       THE EVENT CODES FROM VSEARCH.
C
2000    SUBROUTINE MATRIXSEARCH(MAXSHIFT,LENGTH,VSEARCH,MSEARCH)
        INTEGER*2 LENGTH,MAXSHIFT,VSEARCH(150,2),MSEARCH(21,150,2),I,J,K
        DO 2020 I=1,MAXSHIFT
        DO 2020 J=1,I*2
        DO 2020 K=1,2
        MSEARCH(MAXSHIFT+1+I,J,K)=15
2020    MSEARCH(MAXSHIFT+1-I,LENGTH+1-J,K)=15
        DO 2030 I=1,MAXSHIFT
        DO 2030 J=1,LENGTH-(I*2)
        DO 2030 K=1,2
        MSEARCH(MAXSHIFT+1+I,(2*I)+J,K)=VSEARCH(J,K)
2030    MSEARCH(MAXSHIFT+1-I,J,K)=VSEARCH(J+(2*I),K)
        DO 2040 J=1,LENGTH
        DO 2040 K=1,2
2040    MSEARCH(MAXSHIFT+1,J,K)=VSEARCH(J,K)
2050    RETURN
2060    END
C       .......................SUBROUTINE.......................................
C       .......................SUBROUTINE.......................................
C       .......................SUBROUTINE.......................................
C
C       MATRIXFILE DOES AS PER MATRIX SEARCH, BUT WITHOUT ANY SHIFTS LEFT OR
C       RIGHT.
C
2100    SUBROUTINE MATRIXFILE(MAXSHIFT,LENGTH,VFILE,MFILE)
        INTEGER*2 MAXSHIFT,LENGTH,VFILE(150,2),MFILE(21,150,2),I,J,K
        DO 2120 I=1,2*MAXSHIFT+1
        DO 2120 J=1,LENGTH
        DO 2120 K=1,2
2120    MFILE(I,J,K)=VFILE(J,K)
2130    RETURN
2140    END
C       .......................SUBROUTINE.......................................
C       .......................SUBROUTINE.......................................
C       .......................SUBROUTINE.......................................
C
C       SUBROUTINE 'COMPARE' COMPARES THE MATRIX MSEARCH WITH MFILE AND
C       RETURNS A SCORE 'TOTAL'.
C
4000    SUBROUTINE COMPARE(MAXSHIFT,LENGTH,MSEARCH,MFILE,BAND,SCORE,
       *HOPS,TOTAL,ADT,DDT,SDT)
        INTEGER*2 MAXSHIFT,LENGTH,I,J,K,L,M,N,STOP,START,HOPS
        INTEGER*2 MSEARCH(21,150,2),MFILE(21,150,2),BAND,SCORE(15,15,50,2)
        INTEGER*2 TOTAL,COMSCORE(21,150),SMALL(0:22,76,5),PRODUCT
        INTEGER*2 ADT,DDT,SDT
        LOGICAL DTESTS(21,150)
        N=2*MAXSHIFT+1
C
C       FIRST DO ESSENTIAL ZEROEING.
C
        DO 4020 I=1,N
        DO 4020 J=1,LENGTH
4020    DTESTS(I,J)=.FALSE.
        DO 4050 I=0,2*MAXSHIFT+2
        DO 4050 J=1,LENGTH/2+1
        DO 4050 K=1,5
4050    SMALL(I,J,K)=-1
C
C       EVALUATE INITIAL COMPARISON MATRIX. ALSO WE SET THE LOGICAL ARRAY
```

```
C           'DTESTS' (ABBREVIATION OF 'DISTANCE TESTS') TO 'TRUE' WHEREVER
C           WE WILL WANT TO APPLY ANY OF THE THREE DISTANCE TESTS. IT WILL
C           ONLY BE NECESSARY TO EXAMINE THE DISTANCE MEASURES OF 'EVENT' CODES
C           THAT HAVE ALREADY SCORED POSITIVELY AS A RESULT OF BEING MATCHED
C           (EITHER 'EXACTLY' OR 'CLOSELY').
C
C                 AS THE CODES '0','A' AND 'B' HAVE MEANINGLESS DISTANCE
C           MEASURES ASSOCIATED WITH THEM, NO DISTANCE TESTS WILL BE APPLIED
C           WHERE ANY OF THESE CODES ARE INVOLVED.
C
            DO 4100 I=1,N
            M=2
            DO 4100 J=1,LENGTH
            M=3-M                                  ! M SIMPLY TOGGLES BETWEEN 1 AND 2.
            L=((J-1)/(2*BAND))+1                   ! I.E. WHICH RIDGE BAND ARE WE IN.
            COMSCORE(I,J)=SCORE(MSEARCH(I,J,1),MFILE(I,J,1),L,M)
C
C           NOW EXAMINE WHERE "DTESTS" SHOULD BE SET TO "TRUE".
C
            IF (COMSCORE(I,J).EQ.-1) GOTO 4100
            K=MSEARCH(I,J,1)
            L=MFILE(I,J,1)
            IF (K.EQ.1.OR.K.EQ.10.OR.K.EQ.11.OR.L.EQ.1.OR.L.EQ.10.OR.L.EQ.11)
          *  GOTO 4100
            DTESTS(I,J)=.TRUE.
 4100       CONTINUE
C
C           NOW APPLY THE 'ABSOLUTE DISTANCE TOLERANCE' TEST, IF IT IS REQUIRED.
C
            IF (ADT.EQ.99) GOTO 4110
            DO 4105 I=1,N
            DO 4105 J=1,LENGTH
            IF (DTESTS(I,J).AND.(ABS(MSEARCH(I,J,2)-MFILE(I,J,2)).GT.ADT))THEN
               COMSCORE(I,J)=-1
               DTESTS(I,J)=.FALSE.                 ! FURTHER TESTS FOR THIS ELEMENT
            ENDIF                                  ! ARE NOT REQUIRED.
 4105       CONTINUE
C
C           NOW APPLY THE 'DIFFERENTIAL DISTANCE TOLERANCE' TEST, IF REQUIRED.
C           THE MATRIX 'DTESTS' WILL BE SCANNED TO FIND THOSE PLACES WHERE
C           THREE ADJACENT RIDGES HAVE ALL SCORED POSITIVELY IN THE SAME
C           DIRECTION (I.E. ON ONE SIDE OF THE GENERATING LINE). THE DIFFERENCE
C           BETWEEN SUCCESSIVE DISTANCE MEASURES WILL THEN BE COMPARED, BETWEEN
C           FILE AND SEARCH MATRIX, TO SEE IF IT HAS BEEN PRESERVED WITHIN
C           THE SPECIFIED ACCEPTABLE TOLERANCE. IF NOT, ONE OF THE ENTRIES IN
C           COMSCORE WILL BE REDUCED TO -1.  WHICH ONE IS REDUCED DEPENDS ON
C           WHICH SEEMS MOST BADLY FITTED DISTANCE-WISE.
C
 4110       IF (DDT.EQ.99) GOTO 4120
            DO 4115 I=1,N
            DO 4115 J=3,LENGTH-2
            IF (DTESTS(I,J).AND.DTESTS(I,J-2).AND.DTESTS(I,J+2)) THEN
               K=MSEARCH(I,J,2)-MSEARCH(I,J-2,2)-MFILE(I,J,2)+MFILE(I,J-2,2)
               L=MSEARCH(I,J+2,2)-MSEARCH(I,J,2)-MFILE(I,J+2,2)+MFILE(I,J,2)
               IF (ABS(K).GT.DDT) THEN
                  IF (ABS(L).GT.DDT) THEN
                     COMSCORE(I,J)=-1              ! MIDDLE ELEMENT OF THE THREE
                     DTESTS(I,J)=.FALSE.           ! DOESN'T 'FIT'.
                  ELSE
                     COMSCORE(I,J-2)=-1            ! LEFT HAND ELEMENT OF THE
                     DTESTS(I,J-2)=.FALSE.         ! THREE DOESN'T FIT.
                  ENDIF
               ELSE
                  IF (ABS(L).GT.DDT) THEN
                     COMSCORE(I,J+2)=-1            ! RIGHT HAND ELEMENT OF THE
                     DTESTS(I,J+2)=.FALSE.         !THREE DOESN'T FIT.
                  ENDIF
               ENDIF
            ENDIF
 4115       CONTINUE
C
C           APPLY 'SUMMED DIFFERENCE TOLERANCE' TEST. THIS IS APPLIED ONLY
C           WHERE A DIGIT PAIR ARE BOTH (STILL) NON-NEGATIVE. WE TEST TO SEE
C           WHETHER OR NOT THE SUM OF THE TWO DISTANCE MEASURES FOR THAT
C           ONE RIDGE HAS BEEN PRESERVED WITHIN THE ACCEPTABLE TOLERANCE.
C           IF NOT, WE CONCLUDE THAT AT LEAST ONE OF THE TWO POSITIVE SCORES
C           IS SPURIOUS (ALBEIT WE DON'T KNOW WHICH ONE), AND WE REDUCE ONE
C           OF THEM TO -1, AND RETAIN THE MINIMUM OF THE PAIR ONLY.
C
```

```
4120    IF(SDT.EQ.99) GOTO 4140
        DO 4125 I=1,N
        DO 4125 J=1,LENGTH-1,2              ! LOOK AT EVERY DIGIT PAIR.
        IF (DTESTS(I,J).AND.DTESTS(I,J+1)) THEN
            K=MSEARCH(I,J,2)+MSEARCH(I,J+1,2)-MFILE(I,J,2)-MFILE(I,J+1,2)
            IF (ABS(K).GT.SDT) THEN
                COMSCORE(I,J)=MAX(COMSCORE(I,J),COMSCORE(I,J+1))
                COMSCORE(I,J+1)=0
            ENDIF
        ENDIF
4125    CONTINUE
C
C       APPLY FILTER FOR REDUCING SCORES WHERE '8'S AND '6'S APPEAR IN THEIR
C       EXPECTED PAIRING. REASON FOR THIS IS THAT SUCH APPEARANCES ARE MUCH
C       MORE COMMON THAN WOULD BE THE CASE IF '8'S AND '6'S WERE INDEPENDENT.
C       FILTER ALSO APPLIED FOR '2'S AND '4'S.
C
4140    DO 4150 L=4,8,4                     ! FOR '4' AND FOR '8'.
        DO 4150 I=1,N                       ! FOR EACH ROW OF COMSCORE.
        DO 4150 K=4,LENGTH,2                ! FOR EACH SUCCESSIVE PAIR OF DIGITS.
        IF(DTESTS(I,K).AND.DTESTS(I,K-2)) THEN
            IF ((MSEARCH(I,K,1).EQ.L.OR.MFILE(I,K,1).EQ.L).AND.
                (MSEARCH(I,K-2,1).EQ.L-2.OR.MFILE(I,K-2,1).EQ.L-2)) THEN
                M=MAX(COMSCORE(I,K),COMSCORE(I,K-2))
                COMSCORE(I,K-2)=MIN(2,COMSCORE(I,K),COMSCORE(I,K-2))
                COMSCORE(I,K)=M
            ENDIF
        ENDIF
        IF(DTESTS(I,K-1).AND.DTESTS(I,K-3)) THEN
            IF ((MSEARCH(I,K-1,1).EQ.L-2.OR.MFILE(I,K-1,1).EQ.L-2).AND.
                (MSEARCH(I,K-3,1).EQ.L.OR.MFILE(I,K-3,1).EQ.L)) THEN
                M=MAX(COMSCORE(I,K-1),COMSCORE(I,K-3))
                COMSCORE(I,K-3)=MIN(2,COMSCORE(I,K-1),COMSCORE(I,K-3))
                COMSCORE(I,K-1)=M
            ENDIF
        ENDIF
4150    CONTINUE
C
C       NOW WE CONDENSE EACH PAIR OF DIGITS INTO ONE SINGLE INTEGER VALUE.
C       IF BOTH ARE (-1) WE TAKE (-1)
C       IF ONE IS POSITIVE WE TAKE THAT
C       IF BOTH ARE POSITIVE WE TAKE THEIR SUM
C       THE RESULTING MATRIX IS CALLED 'SMALL(I,J,1)'.
C
        DO 4200 I=1,N
        DO 4200 J=1,(LENGTH/2)
        IF (COMSCORE(I,2*J-1).EQ.-1) THEN
            IF (COMSCORE(I,2*J).EQ.-1) THEN
                SMALL(I,J,1)=-1
            ELSE
                SMALL(I,J,1)=COMSCORE(I,2*J)
            ENDIF
        ELSE
            IF (COMSCORE(I,2*J).EQ.-1) THEN
                SMALL(I,J,1)=COMSCORE(I,2*J-1)
            ELSE
                SMALL(I,J,1)=COMSCORE(I,2*J-1)+COMSCORE(I,2*J)
            ENDIF
        ENDIF
4200    CONTINUE
C
C       NOW WE SWEEP THE MATRIX SMALL(I,J,1) FROM LEFT TO RIGHT, FINDING
C       EACH CONTINUOUSLY NON-(-1) SERIES. EACH POINT IN THE SERIES HAS
C       A SMALL(I,J,2),SMALL(I,J,3) AND SMALL(I,J,4) VALUE ASSIGNED. THEIR
C       MEANINGS ARE AS FOLLOWS: -
C
C               SMALL(I,J,2) : THE SUM OF THE SERIES TO THE LEFT OF THAT
C                              ELEMENT.
C               SMALL(I,J,3) : THE SUM OF THE SERIES TO THE RIGHT -
C                              INCLUDING THAT ELEMENT ITSELF.
C               SMALL(I,J,4) : THE NUMBER OF INTEGERS IN THAT SERIES THAT
C                              FALL TO THE LEFT (STRICTLY) OF THAT ELEMENT.
C
        DO 4300 M=1,N
        L=1
        PRODUCT=-1
4210    IF (PRODUCT.EQ.-1) THEN
            IF (SMALL(M,L,1).NE.-1) THEN    ! FOUND START OF A SERIES.
                PRODUCT=SMALL(M,L,1)
```

```
                        SMALL(M,L,4)=0
                        SMALL(M,L,2)=0
                        START=L
                     ENDIF                             ! IF ENTRY AND PRODUCT ARE -1, DO
                  ELSE                                 ! NOTHING.
                     IF (SMALL(M,L,1).NE.-1) THEN
                        SMALL(M,L,2)=PRODUCT                  ! FOUND ANOTHER ELEMENT OF
                        SMALL(M,L,4)=L-START                  ! SERIES ALREADY STARTED.
                        PRODUCT=PRODUCT+SMALL(M,L,1)
                     ELSE
                        SMALL(M,START,3)=PRODUCT       ! FOUND THE END OF A SERIES.
                        IF (START.LE.L-2) THEN
                           DO 4215 J=START+1,L-1
                           PRODUCT=PRODUCT-SMALL(M,J-1,1)
 4215                      SMALL(M,J,3)=PRODUCT
                        ENDIF
                        PRODUCT=-1
                     ENDIF
                  ENDIF
C
C              NOW MOVE ONE PLACE TO THE RIGHT.
C
               L=L+1
               IF (L.LE.LENGTH/2) GOTO 4210
C
C              END OF ROW REACHED.
C
               IF (PRODUCT.NE.-1) THEN                 ! THEN THE END OF THE ROW IS ALSO
                  SMALL(M,START,3)=PRODUCT             ! THE END OF A SERIES.
                  IF (START.LE.L-2) THEN
                     DO 4220 J=START+1,L-1
                     PRODUCT=PRODUCT-SMALL(M,J-1,1)
 4220                SMALL(M,J,3)=PRODUCT
                  ENDIF
               ENDIF
 4300       CONTINUE
C
C           NOW CALCULATE ANY INCREASES IN SMALL(I,J,3)'S THAT MAY BE DUE AS
C           HOPS ARE ALLOWED. THIS IS DONE ONE HOP AT A TIME  - WITH THE INCREASED
C           VALUES OF SMALL(I,J,3) CALCULATED INTO SMALL(I,J,5), AND THEN COPIED
C           INTO SMALL(I,J,3) BEFORE THE NEXT HOP IS ALLOWED. AFTER K CYCLES HAVE
C           BEEN COMPLETED, THE VALUE OF SMALL(I,J,3) IS THE SUM TO THE RIGHT OF
C           THE HIGHEST SCORING SERIES IN WHICH THE (I,J)TH ELEMENT LIES, WITH
C           UP TO K 'HOPS' ALLOWED IN THAT SERIES TO THE RIGHT.
C
C           PERMITTED HOPS ARE: FROM (I,J)TH POSITION TO ANY OF THE FOLLOWING
C           POSITIONS : -    (I,J+2)    (I-1,J+1)    (I+1,J+2)
C
            IF (HOPS.EQ.0) GOTO 4500
            DO 4400 K=1,HOPS
            DO 4370 M=1,N
            DO 4360 L=(LENGTH/2-1),1,-1
            IF (SMALL(M,L,1).EQ.-1) GOTO 4360
            J=MAX(SMALL(M,L+2,3),SMALL(M-1,L+1,3),SMALL(M+1,L+2,3))
            IF (J.GT.MAX(SMALL(M,L,3),SMALL(M,L,5))-SMALL(M,L,1)) THEN
               SMALL(M,L,5)=SMALL(M,L,1)+J
               IF (SMALL(M,L,4).GT.0) THEN    ! PASS IMPROVEMENT BACK DOWN LINE.
                  DO 4350 I=1,SMALL(M,L,4)
 4350             SMALL(M,L-I,5)=MAX(SMALL(M,L-I,5),SMALL(M,L-I,3),
                 *SMALL(M,L-I+1,5)+SMALL(M,L-I,1))
               ENDIF
            ENDIF
 4360       CONTINUE
 4370       CONTINUE
C
C           NOW UPDATE THE MATRIX SMALL(I,J,3) WITH THE 'ONE HOP MORE' VALUES.
C
            DO 4380 M=1,N
            DO 4380 L=1,LENGTH/2
            IF (SMALL(M,L,5).NE.-1) THEN
               SMALL(M,L,3)=SMALL(M,L,5)
               SMALL(M,L,5)=-1
            ENDIF
 4380       CONTINUE
 4400       CONTINUE
C
C           EVALUATE 'BEST SERIES' SCORE.
C
 4500       TOTAL=0
            DO 4550 M=1,N
```

```
      DO 4550 L=1,LENGTH/2
      I=SMALL(M,L,2)+SMALL(M,L,3)
      IF (I.GT.TOTAL) TOTAL=I
4550  CONTINUE
4600  RETURN
4700  END
```

Appendix C

```
C     .................. Algorithm PLOT1. ...................
C
C     PLOT.FOR - PROGRAMME FOR RECONSTRUCTING A PRINT FROM ITS
C     COORDINATE SET, AND PREPARING LINE SEGMENT PICTURE THEREFROM.
C     OUTPUT IS A FILE OF LINE SEGMENTS, IN THE FORM OF START AND
C     FINISH COORDINATES (X1,Y1,X2,Y2).
C
C     The programme input is per the following variables: -
C
C          EVENTS(300,4) - this is an array containing up to
C     300 sets of coordinates. Each set is of the form (T,theta,R,D)
C     where theta takes values from -90 to +269. The radial distances
C     D are integers which represent units of 0.5 millimetres on the
C     actual fingerprint (i.e. 1x magnification).
C
C          SETS - this is the number of coordinate sets contained
C     in the array EVENTS.
C
C          MOLES - this is the number of ridges that pass beneath
C     the central observation point, which have to be connected up
C     in the topological reconstruction stage.
C
C     The programme output prepared by this programme is in the form
C     of line segment coordinate sets. These coordinates are calculated
C     as integers, and represent displacement measured from an origin
C     in thousandths of an inch. The centre of the reconstructed
C     fingerprint will be at the point (4250,4500). The image will be
C     lifesize times a magnification parameter MAGSTEP. The size of
C     the displayed window will be bounded by the window size WINDOW,
C     which is an integer whose value specifies the height and width
C     of the display in inches. X coordinates are displacements across
C     the display (i.e. from left to right) and Y coordinates are
C     displacements downwards (i.e. from top to bottom). Line segment
C     coordinates are written out on unit 9. SEGMENTS will show the
C     total number of line segments that comprise the picture
C     (normally 4000 to 5000).
C
C          These specifications can be easily altered to fit the
C     selected output device.
C
C     *******************************************************
C     *******************************************************
C
      INTEGER*4 I,J,K,L,M,N
      INTEGER*4 THETA(0:300),CONT(0:300,100,4),RIDGES(0:300),LINES
      INTEGER*4 MOLES,RIGHT
      INTEGER*4 EVENTS(300,4),SETS,TANGLES,X1,X2,Y1,Y2
      INTEGER*4 WINDOW,WU,WD,WL,WR,SEGMENTS
      LOGICAL*1 FIX(0:300,100)
      REAL*4 RAD(0:300,100),WEDGE,BADNESS,MAGSTEP,FI,FIRIGHT
      REAL*4 FACTORX1,FACTORY1,FACTORX2,FACTORY2
      CHARACTER*1 A,B,C,FOUND
      CHARACTER*15 INFILE,OUTFILE,TYPE
C
C     CALL SUBROUTINE CONTINUITY TO PERFORM TOPOLOGICAL
C     RECONSTRUCTION.
C
      CALL CONTINUITY(EVENTS,SETS,MOLES,CONT,RIDGES,LINES,THETA,FIX,RAD)
      RIDGES(0)=MOLES
      RIDGES(LINES)=MIN(RIDGES(LINES),MOLES)
C
C     CALCULATE LOWEST ACCEPTABLE RIDGE SEPARATION. ('WEDGE').
C
      WEDGE=100.0
      DO 300 I=1,SETS
      WEDGE=MIN(WEDGE,(EVENTS(I,4)+1.0)/(EVENTS(I,3)+1.0))
300   CONTINUE
      WEDGE=WEDGE*0.8
C
C     SMOOTH AND UNTANGLE, AND FILL OUT THE GAPS, 10 TIMES.
C     FOLLOW BY 10 MORE SMOOTHINGS AND UNTANGLEINGS.
```

```
C
305     DO 350 M=1,20
        CALL SMOOTH(CONT,RIDGES,LINES,THETA,FIX,RAD,BADNESS)
        CALL UNTANGLE(RIDGES,LINES,FIX,RAD,WEDGE,TANGLES)
        IF (M.GT.10) GOTO 350
        CALL GAPFILL(RIDGES,LINES,FIX,RAD,WEDGE)
350     CONTINUE
C
C       CALCULATE DISPLAY BOUNDARY COORDINATES.
C
        WU=4500-500*WINDOW
        WD=4500+500*WINDOW
        WL=4250-500*WINDOW
        WR=4250+500*WINDOW
C
C       NOW CALCULATE ALL THE LINE POSITIONS AND, IF THEY LIE WITHIN
C       THE CHOSEN WINDOW, WRITE OUT THEIR START AND END COORDINATES.
C
        SEGMENTS=0
        DO 450 I=0,LINES
        RIGHT=I+1
        IF (RIGHT.GT.LINES) RIGHT=0
        FI=(THETA(I)*3.14159)/180.0
        FIRIGHT=(THETA(RIGHT)*3.14159)/180.0
        FACTORX1=1000.0*MAGSTEP*COS(FI)/50.8
        FACTORY1=1000.0*MAGSTEP*SIN(FI)/50.8
        FACTORX2=1000.0*MAGSTEP*COS(FIRIGHT)/50.8
        FACTORY2=1000.0*MAGSTEP*SIN(FIRIGHT)/50.8
        DO 450 J=1,RIDGES(I)
        DO 450 K=3,4
        IF (CONT(I,J,K).EQ.0) GOTO 450
        X1=4250.0-RAD(I,J)*FACTORX1
        Y1=4500.0+MOVEDOWN-RAD(I,J)*FACTORY1
        X2=4250.0-RAD(RIGHT,CONT(I,J,K))*FACTORX2
        Y2=4500.0+MOVEDOWN-RAD(RIGHT,CONT(I,J,K))*FACTORY2
        IF((X1.LT.WL.OR.X1.GT.WR.OR.Y1.LT.WU.OR.Y1.GT.WD).AND.
       (X2.LT.WL.OR.X2.GT.WR.OR.Y2.LT.WU.OR.Y2.GT.WD)) GOTO 450
        WRITE (9,440) X1,Y1,X2,Y2
440     FORMAT(1X,4I5)
        SEGMENTS=SEGMENTS+1
450     CONTINUE
        CLOSE (UNIT=9)
500     STOP
550     END
C
C
C       ......................SUBROUTINE..................................
C       ......................SUBROUTINE..................................
C       ......................SUBROUTINE..................................
C
C
C       SUBROUTINE SMOOTH STRAIGHTENS OUT EXCESSIVE KINKS IN RIDGES, BY
C       ADJUSTING THE RADIAL DISTANCES OF POINTS THAT ARE NOT 'FIXED'.
C
1000    SUBROUTINE SMOOTH(CONT,RIDGES,LINES,THETA,FIX,RAD,BADNESS)
        INTEGER*4 MOLES,CONT(0:300,100,4),RIDGES(0:300),LINES,THETA(0:300)
        INTEGER*4 I,J,K,L,M,N,LEFT,RIGHT
        LOGICAL*1 FIX(0:300,100)
        REAL*4 RAD(0:300,100),COPYRAD(0:300,100),BADNESS,A,B,C
        DO 1050 I=0,LINES
        LEFT=I-1
        RIGHT=I+1
        IF (LEFT.LT.0) LEFT=LINES
        IF (RIGHT.GT.LINES) RIGHT=0
        A=THETA(RIGHT)-THETA(I)
        IF (RIGHT.EQ.0) A=A+360
        B=THETA(I)-THETA(LEFT)
        IF (I.EQ.0) B=B+360
        A=A*3.14159/180.0
        B=B*3.14159/180.0
        C=A+B
        A=SIN(A)
        B=SIN(B)
        C=SIN(C)
        DO 1050 J=1,RIDGES(I)
        IF (FIX(I,J)) THEN
            COPYRAD(I,J)=RAD(I,J)
        ELSE
            COPYRAD(I,J)=RAD(LEFT,CONT(I,J,1))*RAD(RIGHT,CONT(I,J,3))*C/
                (RAD(RIGHT,CONT(I,J,3))*A+RAD(LEFT,CONT(I,J,1))*B)
            COPYRAD(I,J)=(RAD(I,J)/3.0)+(2.0*COPYRAD(I,J)/3.0)
```

```
              ENDIF
1050          CONTINUE
C
C             COPY NEW VALUE INTO RAD - RECORDING 'BADNESS' AS DEGREE OF CHANGE.
C
              BADNESS=0.0
              DO 1100 I=0,LINES
              DO 1100 J=1,RIDGES(I)
              BADNESS=BADNESS+ABS(RAD(I,J)-COPYRAD(I,J))
              RAD(I,J)=COPYRAD(I,J)
1100          CONTINUE
1150          RETURN
1200          END
C
C             ....................SUBROUTINE..................................
C             ....................SUBROUTINE..................................
C             ....................SUBROUTINE..................................
C
C             SUBROUTINE UNTANGLE CHECKS THE ORDER, AND SPACING OF RIDGE
C             INTERSECTION POINTS ON EACH RADIAL LINE.
C
1500          SUBROUTINE UNTANGLE(RIDGES,LINES,FIX,RAD,WEDGE,TANGLES)
              INTEGER*4 RIDGES(0:300),LINES,TANGLES,I,J,K,L,M,N
              LOGICAL*1 FIX(0:300,100),REPEAT,TEMPFIX(100)
              REAL*4 RAD(0:300,100)
              TANGLES=0
              DO 1550 I=0,LINES
              IF (RIDGES(I).LE.1) GOTO 1550
              DO 1510 J=1,RIDGES(I)
1510          TEMPFIX(J)=.FALSE.
1520          REPEAT=.FALSE.
              DO 1530 J=1,RIDGES(I)-1
              IF (RAD(I,J+1)-RAD(I,J).GE.WEDGE) GOTO 1530
              TANGLES=TANGLES+1
              REPEAT=.TRUE.
              IF (FIX(I,J+1).OR.TEMPFIX(J+1)) THEN
                  RAD(I,J)=MAX(RAD(I,J+1)-WEDGE-0.001,0.5*WEDGE)
                  TEMPFIX(J)=.TRUE.
                  GOTO 1530
              ENDIF
              IF (FIX(I,J).OR.TEMPFIX(J)) THEN
                  RAD(I,J+1)=RAD(I,J)+WEDGE+0.001
                  TEMPFIX(J+1)=.TRUE.
                  GOTO 1530
              ENDIF
              RAD(I,J)=MAX((RAD(I,J)+RAD(I,J+1)-(1.2*WEDGE))/2.0,0.5*WEDGE)
              RAD(I,J+1)=RAD(I,J)+(1.2*WEDGE)
1530          CONTINUE
              IF (REPEAT) GOTO 1520
1550          CONTINUE
1560          RETURN
1570          END
C
C             ....................SUBROUTINE..................................
C             ....................SUBROUTINE..................................
C             ....................SUBROUTINE..................................
C
C             SUBROUTINE GAPFILL FILLS OUT ANY HOLES THAT HAVE APPEARED DUE
C             TO EXCESSIVE RIDGE SEPARATION.
C
2000          SUBROUTINE GAPFILL(RIDGES,LINES,FIX,RAD,WEDGE)
              INTEGER*4 RIDGES(0:300),LINES,I,J,K
              LOGICAL*1 FIX(0:300,100)
              REAL*4 RAD(0:300,100),COPYRAD(0:300,100),WEDGE
              DO 2050 I=0,LINES
              IF (RIDGES(I).LE.2) GOTO 2050
              DO 2040 J=2,RIDGES(I)-1
              IF (FIX(I,J)) GOTO 2040
              IF (RAD(I,J)-RAD(I,J-1).GT.WEDGE*3.0) THEN
                  RAD(I,J)=(RAD(I,J-1)+RAD(I,J+1))/2.0
              ENDIF
2040          CONTINUE
2050          CONTINUE
2150          RETURN
2200          END
C
C             ....................SUBROUTINE..................................
C             ....................SUBROUTINE..................................
C             ....................SUBROUTINE..................................
```

```
C
C      SUBROUTINE CONTINUITY CONSTRUCTS THE CONTINUITY MATRIX "CONT"
C      FROM THE PRINT COORDINATE SET ("EVENTS).
C
3200   SUBROUTINE CONTINUITY(EVENTS,SETS,MOLES,CONT,RIDGES,LINES,THETA,
      *    FIX,RAD)
       INTEGER*4 EVENTS(300,4),CONT(0:300,100,4),EXTRA
       INTEGER*4 RIDGES(0:300),I,J,K,L,M,N
       INTEGER*4 SETS,MOLES,LINES,THETA(0:300),ANGLE
       LOGICAL*1 FIX(0:300,100)
       REAL*4 RAD(0:300,100),RWAVE
C
C      DO NECESSARY ARRAY ZEROING.
C
       DO 3210 I=0,300
       THETA(I)=0
       RIDGES(I)=0
       DO 3210 J=1,100
       FIX(I,J)=.FALSE.
       RAD(I,J)=0
       DO 3210 K=1,4
       CONT(I,J,K)=0
3210   CONTINUE
C
C      FIRST RUN THROUGH THE EVENTS COORDINATE SET TO ESTABLISH HOW
C      MANY RIDGES (IN ADDITION TO "MOLES") ARE NEEDED
C      AT THE START TO ACCOMODATE EVERY STATED RIDGE-COUNT AFTER
C      PROVISION OF THE DEFAULT "EDGE-TOPOLOGY". THIS NUMBER WILL BE
C      CALLED 'EXTRA'.
C
C      'J' IS USED HERE TO KEEP ACCOUNT OF HOW MANY RIDGES THERE WOULD
C      BE AT EACH STAGE IF NO 'EXTRA' WERE PROVIDED.
C
       EXTRA=0
       RIDGES(0)=MOLES
       J=MOLES
       DO 3220 I=1,SETS
       K=EVENTS(I,1)
       L=0
       IF (K.EQ.0.OR.K.EQ.3.OR.K.EQ.7.OR.K.EQ.10.OR.K.EQ.11) THEN
           L=1
       ELSE
           IF (K.EQ.2.OR.K.EQ.4.OR.K.EQ.12) L=2
       ENDIF
       IF (EVENTS(I,3)+L.GT.RIDGES(I-1)+EXTRA) THEN
           EXTRA=EVENTS(I,3)-RIDGES(I-1)+L
       ENDIF
       IF (K.EQ.3.OR.K.EQ.2.OR.K.EQ.0.OR.K.EQ.10.OR.K.EQ.11) THEN
           J=J-MAX(1,(EVENTS(I,4)/100))
       ELSE
           IF (K.EQ.4) THEN
               J=J-2
           ELSE
               IF (K.EQ.5) THEN
                   J=J+2
               ELSE
                   IF (K.NE.12) J=J+MAX(1,(EVENTS(I,4)/100))
               ENDIF
           ENDIF
       ENDIF
       RIDGES(I)=J
3220   CONTINUE
C
C      CHECK THAT "EXTRA" IS LARGE ENOUGH TO GIVE AT LEAST "MOLES"
C      RIDGES AT RIGHT HAND BOUNDARY.
C
       IF (RIDGES(SETS)+EXTRA.LT.MOLES) EXTRA=MOLES-RIDGES(SETS)
C
C      SET UP LEFT HAND EDGE OF CONTINUITY MATRIX.
C
       RIDGES(0)=MOLES+EXTRA
       RIDGES(1)=RIDGES(0)
       THETA(0)=-90
       ANGLE=-90
       RWAVE=(MOD(EVENTS(1,4),100)*1.0)/(EVENTS(1,3)+1.0)
       DO 3230 J=1,RIDGES(0)
       RAD(0,J)=RWAVE*J
3230   CONT(0,J,3)=J
C
```

```
C       NOW RUN THROUGH EACH "EVENTS" IN THE SET OF "EVENTS", MAKING
C       THE APPROPRIATE ENTRIES IN THE "CONT" MATRIX AS YOU GO.
C
3250    L=0
        DO 3625 I=1,SETS
3260    L=L+1
C
C       FIRST CHECK TO SEE IF A LINE INSERT IS REQUIRED.
C
        IF (EVENTS(I,2).GT.ANGLE+5) THEN
            ANGLE=ANGLE+5
            THETA(L)=ANGLE
            RIDGES(L+1)=RIDGES(L)
            DO 3270 J=1,RIDGES(L)
            CONT(L,J,3)=J
3270        RAD(L,J)=RWAVE*J
            GOTO 3260
        ENDIF
C
C       ACCORDING TO THE RIDGE EVENT TYPE - DO THE APPROPRIATE SET
C       OF ALTERATIONS TO THE MATRICES "CONT" AND "INDEX".
C
        IF (EVENTS(I,2).LE.ANGLE) EVENTS(I,2)=ANGLE+1
        ANGLE=EVENTS(I,2)
        THETA(L)=ANGLE
        GOTO (3320,3340,3360,3380,3400,3420,3440,3460,3310,3310,3320,
     *  3320,3500,3340,3340) (EVENTS(I,1)+1)
C
C       CONTROL PASSED TO 3310 IF EVENTS(I,1) IS 8 OR 9.(ILLEGAL CODES)
C
3310    TYPE *,'ILLEGAL CODE FOUND IN FILESET COORDINATES.'
        TYPE *,'SEARCH ABORTED.'
        TYPE 3314,CARDSET,CARDNO,FINGNO
3314    FORMAT(1X,'CARD:',I4,'/',I3,'  FINGER :',I2)
3315    STOP
C
C       CONTROL PASSED TO 3320 IF EVENTS(I,1) IS 0,A OR B - I.E. RIDGE RUNS
C       OUT OF SIGHT, OR INTO SCARRED OR UNCLEAR TISSUE.
C
3320    K=MAX(1,EVENTS(I,4)/100)
        IF (K.GT.1) EVENTS(I,4)=EVENTS(I,4)-(K*100)
        RIDGES(L+1)=RIDGES(L)-K
        DO 3325 J=EVENTS(I,3)+1,EVENTS(I,3)+1+K
3325    FIX(L,J)=.TRUE.
        IF (EVENTS(I,3).NE.0) THEN
            DO 3330 J=1,EVENTS(I,3)
3330        CONT(L,J,3)=J
        ENDIF
        IF (EVENTS(I,3).NE.RIDGES(L)-K) THEN
            DO 3335 J=EVENTS(I,3)+K+1, RIDGES(L)
3335        CONT(L,J,3)=J-K
        ENDIF
        GOTO 3600
C
C       CONTROL PASSED TO 3340 IF EVENTS(I,1) = 1,D OR E.  I.E. RIDGE(S)
C       COMES IN FROM BEING OUT OF SIGHT, OR FROM SCARRED OR UNCLEAR TISSUE.
C
3340    K=MAX(1,EVENTS(I,4)/100)
        IF (K.GT.1) EVENTS(I,4)=EVENTS(I,4)-(K*100)
        RIDGES(L)=RIDGES(L)+K
        RIDGES(L+1)=RIDGES(L)
        DO 3345 J=EVENTS(I,3)+1,EVENTS(I,3)+K
3345    FIX(L,J)=.TRUE.
        DO 3350 J=1,RIDGES(L)
3350    CONT(L,J,3)=J
        IF (EVENTS(I,3).NE.RIDGES(L-1)) THEN
            DO 3355 J=1,RIDGES(L-1)
            DO 3355 M=3,4
3355        IF (CONT(L-1,J,M).GT.EVENTS(I,3)) CONT(L-1,J,M)=
     *          CONT(L-1,J,M)+K
        ENDIF
        GOTO 3600
C
C       CONTROL PASSED TO 3360 IF EVENTS(I,1)=2 I.E. BIFURCATION FACING
C       TOWARDS THE LEFT BOUNDARY.
C
3360    RIDGES(L)=RIDGES(L)-1
        RIDGES(L+1)=RIDGES(L)
        FIX(L,EVENTS(I,3)+1)=.TRUE.
        DO 3365 J=1,RIDGES(L)
```

```
3365        CONT(L,J,3)=J
            DO 3370 J=1,RIDGES(L-1)
            DO 3370 M=3,4
3370        IF (CONT(L-1,J,M).GT.EVENTS(I,3)+1) CONT(L-1,J,M)=
           *    CONT(L-1,J,M)-1
            GOTO 3600
C
C           CONTROL PASSED TO 3380 IF EVENTS(I,1)=3 I.E. RIDGE ENDS.
C
3380        RIDGES(L+1)=RIDGES(L)-1
            FIX(L,EVENTS(I,3)+1)=.TRUE.
            IF (EVENTS(I,3).GT.0) THEN
               DO 3385 J=1,EVENTS(I,3)
3385           CONT(L,J,3)=J
            ENDIF
            IF (EVENTS(I,3).NE.RIDGES(L)-1) THEN
               DO 3390 J=EVENTS(I,3)+2,RIDGES(L)
3390           CONT(L,J,3)=J-1
            ENDIF
            GOTO 3600
C
C           CONTROL PASSED TO 3400 IF EVENTS(I,1)=4 I.E. HAIRPIN POINTING
C           TOWARDS THE LEFT.
C
3400        RIDGES(L)=RIDGES(L)-1
            RIDGES(L+1)=RIDGES(L)-1
            FIX(L,EVENTS(I,3)+1)=.TRUE.
            IF (EVENTS(I,3).GT.0) THEN
               DO 3405 J=1,EVENTS(I,3)
3405           CONT(L,J,3)=J
            ENDIF
            IF (EVENTS(I,3).LT.RIDGES(L)-1) THEN
               DO 3410 J=EVENTS(I,3)+2,RIDGES(L)
3410           CONT(L,J,3)=J-1
            ENDIF
            DO 3415 J=1,RIDGES(L-1)
            DO 3415 M=3,4
            IF (CONT(L-1,J,M).GT.EVENTS(I,3)+1) CONT(L-1,J,M)=
           *    CONT(L-1,J,M)-1
3415        CONTINUE
            GOTO 3600
C
C           CONTROL PASSED TO 3420 IF EVENTS(I,3)=5 I.E. HAIRPIN FACING
C           TOWARDS THE RIGHT.
C
3420        RIDGES(L)=RIDGES(L)+1
            RIDGES(L+1)=RIDGES(L)+1
            FIX(L,EVENTS(I,3)+1)=.TRUE.
            DO 3425 J=1,EVENTS(I,3)+1
3425        CONT(L,J,3)=J
            CONT(L,EVENTS(I,3)+1,4)=EVENTS(I,3)+2
            IF (EVENTS(I,3).NE.RIDGES(L)-1) THEN
               DO 3430 J=EVENTS(I,3)+2,RIDGES(L)
3430           CONT(L,J,3)=J+1
            ENDIF
            DO 3435 J=1,RIDGES(L-1)
            DO 3435 M=3,4
            IF (CONT(L-1,J,M).GT.EVENTS(I,3)) CONT(L-1,J,M)=
           *    CONT(L-1,J,M)+1
3435        CONTINUE
            GOTO 3600
C
C           CONTROL PASSED TO 3440 IF EVENTS(I,1)=6 I.E. RIDGE BEGINS
C           (RIDGE-ENDING FACING THE OPPOSITE WAY TO A '3').
C
3440        RIDGES(L)=RIDGES(L)+1
            RIDGES(L+1)=RIDGES(L)
            FIX(L,EVENTS(I,3)+1)=.TRUE.
            DO 3445 J=1,RIDGES(L)
3445        CONT(L,J,3)=J
            DO 3450 J=1,RIDGES(L-1)
            DO 3450 M=3,4
3450        IF (CONT(L-1,J,M).GT.EVENTS(I,3)) CONT(L-1,J,M)=
           *    CONT(L-1,J,M)+1
            GOTO 3600
C
C           CONTROL PASSED TO 3460 IF EVENTS(I,1)=7 I.E. BIFURCATION
C           FACING TOWARDS THE RIGHT.
C
```

```
3460        RIDGES(L+1)=RIDGES(L)+1
            FIX(L,EVENTS(I,3)+1)=.TRUE.
            DO 3465 J=1,EVENTS(I,3)+1
3465        CONT(L,J,3)=J
            CONT(L,EVENTS(I,3)+1,4)=EVENTS(I,3)+2
            IF (EVENTS(I,3).NE.RIDGES(L)-1) THEN
                DO 3470 J=EVENTS(I,3)+2,RIDGES(L)
3470            CONT(L,J,3)=J+1
            ENDIF
            GOTO 3600
C
C           CONTROL PASSED TO 3500 IF EVENTS(I,1)=12 I.E. RIDGE-EVENTS IS A
C           COMPOUND. (ASSUMED TWO RIDGES IN, AND TWO OUT.)
C
3500        RIDGES(L)=RIDGES(L)-1
            RIDGES(L+1)=RIDGES(L)+1
            FIX(L,EVENTS(I,3)+1)=.TRUE.
            DO 3505 J=1,EVENTS(I,3)+1
3505        CONT(L,J,3)=J
            CONT(L,EVENTS(I,3)+1,4)=EVENTS(I,3)+2
            IF (EVENTS(I,3).NE.RIDGES(L)-1) THEN
                DO 3510 J=EVENTS(I,3)+2,RIDGES(L)
3510            CONT(L,J,3)=J+1
            ENDIF
            DO 3515 J=1,RIDGES(L-1)
            DO 3515 M=3,4
            IF (CONT(L-1,J,M).GT.EVENTS(I,3)+1) CONT(L-1,J,M)=
           *    CONT(L-1,J,M)-1
3515        CONTINUE
C
C           3600 IS THE END OF THE ITERATIVE LOOP STARTED AT LINE 3250.
C           RADIAL DISTANCES ARE CALCULATED.
C
3600        IF (EVENTS(I,3).GT.5) THEN
                RWAVE=(EVENTS(I,4)*1.0)/(EVENTS(I,3)+1.0)
                DO 3610 J=1, RIDGES(L)
3610            RAD(L,J)=RWAVE*J
            ELSE
                DO 3615 J=1,EVENTS(I,3)+1
3615            RAD(L,J)=(J*EVENTS(I,4)+1.0)/(EVENTS(I,3)+1.0)
                IF (EVENTS(I,3)+1.NE.RIDGES(L)) THEN
                    DO 3620 J=EVENTS(I,3)+2,RIDGES(L)
3620                RAD(L,J)=EVENTS(I,4)+((J-EVENTS(I,3)-1)*RWAVE)
                ENDIF
            ENDIF
3625        CONTINUE
C
C           AFTER EACH EVENT HAS BEEN DEALT WITH, CHECK THAT NO LINE
C           INSERTIONS ARE NEEDED AFTER THE LAST.
C
3640        IF (270.GT.ANGLE+5) THEN
                L=L+1
                ANGLE=ANGLE+5
                THETA(L)=ANGLE
                RIDGES(L+1)=RIDGES(L)
                DO 3650 J=1,RIDGES(L)
                CONT(L,J,3)=J
3650            RAD(L,J)=RWAVE*J
                GOTO 3640
            ENDIF
C
C           RECORD THE TOTAL NUMBER OF LINES.
C
            LINES=L
C
C           CHECK THAT FINAL LINE ANGLE HAS NOT BEEN PUSHED OVER 269 DEGREES.
C           IF IT HAS, PUSH IT BACK.
C
            IF (THETA(L).GT.269) THEN
                THETA(L)=269
3660            IF (THETA(L-1).GE.THETA(L)) THEN
                    THETA(L-1)=THETA(L)-1
                    L=L-1
                    GOTO 3660
                ENDIF
            ENDIF
C
C           FOR EACH 'LOOKING RIGHT' SEGMENT, ENTER ITS EQUIVALENT 'LOOKING
C           LEFT' SEGMENT.
C
```

```
        DO 3700 I=0,LINES-1
        DO 3700 J=1,RIDGES(I)
        DO 3700 M=3,4
        IF (CONT(I,J,M).EQ.0) GOTO 3700
        IF (CONT(I+1,CONT(I,J,M),1).EQ.0) THEN
            CONT(I+1,CONT(I,J,M),1)=J
        ELSE
            CONT(I+1,CONT(I,J,M),2)=J
        ENDIF
3700    CONTINUE
        DO 3720 J=1,RIDGES(LINES)
        DO 3720 M=3,4
        IF (CONT(LINES,J,M).EQ.0) GOTO 3720
        IF (CONT(0,CONT(LINES,J,M),1).EQ.0) THEN
            CONT(0,CONT(LINES,J,M),1)=J
        ELSE
            CONT(0,CONT(LINES,J,M),2)=J
        ENDIF
3720    CONTINUE
3780    RETURN
3790    END
```

What is claimed is:

1. In a fingerprint recognition system, apparatus for extracting topological coordinates from a known fingerprint and storing composite sets of extracted topological coordinates in a machine searchable fingerprint database comprising:
   means for establishing a scanning line,
   means for selecting a predetermined point on said scanning line,
   means for scanning said known fingerprint in a predetermined scan pattern by progressive movement of said scanning line over said known fingerprint, including each successive topological characteristic in said predetermined scan pattern and determining the scan location data (M) of each said successive topological characteristic relative to said scanning line and scanning pattern,
   means for determining the number of ridge lines (R) between said predetermined point on said scanning line and each said successive topological characteristic,
   means for assigning a predetermined type code (T) to each successive topological characteristic, and
   means for storing said type code (T), scan location data (M) and the number of ridge lines (R) for each known fingerprint in a machine searchable database.

2. The fingerprint recognition system defined in claim 1 including a central computer coupled to said database, one or more inquiry terminals, means for connecting said one or more inquiry terminals to said central computer, each said inquiry terminal including means for extracting from an unknown latent or rolled fingerprint composite sets of topological coordinates comprising:
   means for establishing a scanning line on said unknown fingerprint,
   means for selecting a predetermined point on said scanning line in said unknown fingerprint,
   means for scanning said unknown fingerprint in a predetermined scan pattern by progressive movement of said scanning line over said unknown fingerprint, including each successive topological characteristic in said predetermined scan pattern and determining the scan location data (Mu) of each said successive topological characteristic relative to said scanning line and scanning pattern,
   means for determining the number of ridge lines (Ru) between said predetermined point on said scanning line and each said successive topological characteristic,
   means for assigning a predetermined type code (Tu) to each successive topological characteristic, and
   said central computer having means for comparing said topological coordinate sets (Tu, Mu, Ru) from an unknown fingerprint with the composite sets of topological coordinates in said machine searchable database to identify the known fingerprint corresponding to said unknown print.

3. The system defined in claim 2 wherein said predetermined scan pattern, both on the unknown and on the known fingerprints, is defined by rotating a line about a predetermined central point, the central point also being designated the predetermined point on the scanning line for the purpose of measuring ridge counts (R), and where said scan location data is the angle ($\theta$) measured from a predetermined reference line.

4. The system defined in claim 2 including file means storing replicable images of all said unknown prints and means for retrieving a replicable image of identified known print corresponding to said unknown print.

5. The system defined in claim 2 including means for retrieving an image of a known fingerprint corresponding to said unknown fingerprint.

6. The system defined in claim 5 including means for displaying an image of the fingerprint retrieved by said means for retrieving.

7. The fingerprint recognition system defined in claim 1 including, for each topological irregularity on each known fingerprint, means for determining a distance (D) from each successive topological irregularity to the said predetermined point on said scanning line, means for storing the distance (D) together with the coordinate sets (T, M, R) as composite coordinate sets of the form (T, M, R, D) in said machine searchable database.

8. The system defined in claim 7 wherein said predetermined scan pattern on the unknown fingerprints, is defined by rotating a line about a predetermined central point, said central point being designated the predetermined point on the scanning line for the purpose of measuring ridge counts (R) and also for the purpose of measuring the distances (D), and where said scan location data is the angle (θ) measured from a predetermined reference line.

9. The fingerprint recognition system defined in claim 7 including a central computer coupled to said database, one or more inquiry terminals, means for connecting said one or more inquiry terminals to said central computer, each said inquiry terminal including means for extracting from an unknown latent or rolled fingerprint, composite sets of topological coordinates comprising:

means for establishing a further scanning line, means for selecting a predetermined point on said further scanning line to be the predetermined point, means for scanning said unknown fingerprint in a predetermined scan pattern by progressive systematic movement of said further scanning line over said unknown fingerprint, including each successive topological characteristic in said predetermined scan pattern and determining the scan location data (Mu) of each said successive topological characteristic relative to said further scanning line and scanning pattern, means for determining the number of ridge lines (Ru) between said predetermined point on said further scanning line and each said successive topological characteristic, means for assigning a predetermined type code (Tu) to each successive topological characteristic, means for determining a distance (Du) from each successive topological irregularity to the said predetermined point on said further scanning line, and said central computer having means for comparing said composite topological coordinate sets (Tu, Mu, Ru, Du) from an unknown fingerprint with the composite topological coordinate data sets in said machine searchable database to identify the known fingerprint corresponding to said unknown fingerprint.

10. The system defined in claim 9 wherein said predetermined scan pattern, both on the unknown and on the known fingerprints, is defined by rotating a line about a predetermined central point, that central point also being designated the predetermined point on the scanning line for the purpose of measuring ridge counts (R) and also for the purpose of measuring the distances (D), and where said scan location data is the angle (θ) measured from a predetermined reference line.

11. The fingerprint recognition system defined in claim 10 including means for displaying an image of an identified known fingerprint corresponding to said unknown print.

12. The fingerprint recognition system defined in claim 9 including means for producing a visual image of an identified known fingerprint corresponding to said unknown fingerprint.

13. The system defined in claim 1 wherein said predetermined scan pattern is defined by rotating a line about a predetermined central point, that central point also being designated the predetermined point on the scanning line for the purpose of measuring ridge counts (R), and where said scan location data is the angle (R) measured from a predetermined reference line.

14. The fingerprint recognition system defined in claim 1 wherein said means for scanning said known fingerprint in a predetermined scan pattern includes means for moving a straight vertical "line" of scan horizontally across the fingerprint pattern, a point on that scanning line which is vertically below the entire fingerprint pattern being designated the predetermined point on the line for the purpose of measuring said ridge counts (R), and where said scan location data (M) is the measure of the horizontal movement of said scanning line from a predetermined vertical left hand edge.

15. The fingerprint recognition system defined in claim 1 wherein said means for scanning said known fingerprint in a scan pattern includes means for moving a straight horizontal line vertically over the fingerprint pattern starting from some predetermined bottom edge, a point on that scanning line which is horizontally to the left of the entire fingerprint pattern being designated the predetermined point on the line for the purpose of measuring said ridge counts (R), and where said scan location data (M) is the measure of the vertical movement of said scanning line from a predetermined bottom edge.

16. The fingerprint recognition and retrieval system defined in claim 15, including means for storing images of all said known prints, means for entering at least a portion of a set of said topological coordinates of an unknown print, means for searching said machine searchable data base to find a match for said portion of a set of topological coordinates, and means for retrieving and displaying said one of said image of a known print corresponding to the matching coordinate set found by said search.

17. The fingerprint recognition and retrieval system defined in claim 14, including storage means for storing replicable images of all said known prints and an image retrieval means for retrieving a replicable image from said storage means corresponding to a selected set of said topological coordinates, means for replicating and displaying an image of a print having said selected set of topological coordinates.

18. The fingerprint recognition and retrieval system defined in claim 15, including storage means for storing replicable images of all said known prints and an image retrieval means for retrieving a replicable image from said storage means corresponding to a selected set of said topological coordinates, means for replicating and displaying an image of a print having said selected set of topological coordinates.

19. The fingerprint recognition and retrieval system defined in claim 14, including storage means for storing images of all said known prints, means for entering at least a portion of a set of topological coordinates corresponding to an unknown print, means for searching said machine searchable database to find a matching coordinate sets in said database for said portion of a set of topological coordinates, and means for retrieving and displaying said one of said image of a known print corresponding to the matching coordinate set found by said search.

20. In a fingerprint recognition system, a method of extracting topological coordinates from a known fingerprint and storing composite sets of extracted topological coordinates in a machine searchable fingerprint database comprising:

placing a scanning line on said known fingerprint selecting a point on said scanning line to be a predetermined point, scanning said known fingerprint in a predetermined scan pattern or direction by systematic movement of said scanning line over said known fingerprint, including each successive topological characteristic in said predetermined scan pattern, determining the scan location data (M) on each said successive topological characteristic relative to said scanning line and scanning pattern, determining the number of ridge lines (R) between said predetermined point on said scanning line and each said successive topological characteristic, assigning a predetermined type code (T) to each successive topological characteristic, and storing the type code (T), scan location data (M) and the number of ridge lines (R) in a machine searchable database.

21. A method of identifying an unknown fingerprint comprising the method defined in claim 20, including a method for extracting from an unknown fingerprint sets of topological coordinates comprising:

placing said scanning line on said unknown fingerprint, selecting a point on said scanning line to be said predetermined point, scanning said unknown fingerprint in a predetermined scan pattern or direction by systematic movement of said scanning line over said unknown fingerprint, including each successive topological characteristic in said predetermined scan pattern and determining the scan location data (Mu) of each said successive topological characteristic relative to said scanning line and scanning pattern, determining the number of ridge lines (Ru) between said predetermined point on said scanning line and each said successive topological characteristic, assigning a predetermined type code (Tu) to each successive topological characteristic, and causing said topological coordinate sets for an unknown print to be compared with the topological coordinate data in said machine searchable database to identify the known print corresponding to said unknown print.

22. The method defined in claim 21 wherein said predetermined scan pattern, both on the unknown and on the known fingerprint, is defined by rotating a line about a predetermined central point, that central point also being designated the predetermined point of the scanning line for the purpose of measuring ridge counts (R), and where said scan location data is the angle ($\theta$) measured from a predetermined reference line.

23. The method defined in claim 22 including retrieving an image of a known print corresponding to said unknown print.

24. The method defined in claim 23 including displaying an image, at a remote site, of the retrieved fingerprint.

25. The method defined in claim 21 including providing an image file of all fingerprints in said machine searchable database, and retrieving from said image file an image of said known fingerprint corresponding to said unknown fingerprint.

26. The method defined in claim 20 including, for each topological irregularity on each known fingerprint, determining a distance (D) from each successive topological irregularity to the said predetermined point on said scanning line, storing the distance (D) together with the coordinate sets (T, M, R) as composite coordinate sets of the form (T, M, R, D) in a machine searchable database.

27. In a fingerprint recognition system the method defined in claim 25 including the step of extracting from an unknown latent or rolled fingerprint composite sets of topological coordinates comprising:

placing a scanning line on said unknown fingerprint, selecting a point on said scanning line to be the predetermined point, scanning said unknown fingerprint in a predetermined scan pattern or direction by systematic movement of said scanning line over said unknown fingerprint, including each successive topological characteristic in said predetermined scan pattern and determining the scan location data (Mu) of each said successive topological characteristic relative to said scanning line and scanning pattern, determining the number of ridge lines (Ru) between said predetermined point on said scanning line and each said successive topological characterstic, assigning a predetermined type code (Tu) to each successive topological characteristic, determining a distnce (Du) from each successive topological irregularity to the said predetermined point on said scanning line, and comparing said composite topological coordinate sets from an unknown print with the composite topological coordinate data in said machine searchable database to identify the known print corresponding to said unknown print.

28. In a fingerprint recognition system the method defined in claim 27 including displaying an image of an identified known fingerprint corresponding to said unknown print.

29. The method defined in claim 27 wherein said predetermined scan pattern, both on the unknown and on the known finerprints, is defined by rotating a line about a predetermined central point, that central point also being designated the predetermined point on the scanning line for the purpose of measuring ridge counts (R) and also for the purpose of measuring the distances (D), and where said scan location data is the angle ($\theta$) measured from a predetermined reference line.

30. In a fingerprint recognition system the method defined in claim 29 including retrieving an image of an identified known fingerprint corresponding to said unknown print.

31. In a fingerprint recognition system, the method defined in claim 30 including displaying an image of the retrieved fingerprint.

32. The method defined in claim 26 wherein said predetermined scan pattern on the unknown fingerprints is defined by relatively rotating a line about a predetermined central point, that central point also being designated the predetermined point on the scanning line for the purpose of measuring ridge counts (R) and also for the purpose of measuring the distances (D), and where said scan location data is the angle ($\theta$) measured from a predetermined reference line.

33. The method defined in claim 20 wherein said predetermined scan pattern is defined by rotating a line about a predetermined central point, that central point also being designated the predetermined point on the scanning line for the purpose of measuring ridge counts (R), and where said scan location data is the angle ($\theta$) measured from a predetermined reference line.

34. In a fingerprint recognition system, apparatus for extracting topological coordinates from a known fingerprint and storing composite sets of extracted topological coordinates in a machine searchable fingerprint database comprising:
- means for selecting a central point on said known fingerprint,
- means for successively measuring the angular orientation ($\theta$) relative to a predetermined reference line on said known fingerprint of each successive topological characteristic in a predetermined direction of rotation,
- means for determining the number of ridge lines (R) between said central point and each said successive topological characteristic,
- means for assigning a predetermined type code (T) to each successive topological characteristic, and
- means for storing the type code (T), angular orientation ($\theta$) and number of ridge lines (R) in said machine searchable database.

35. The fingerprint recognition system defined in claim 34 including means for measuring the radial distance (D) to each said successive topological characteristic from said selected central point and including said radial distance (D) for each successive topological characteristic whereby a set of stored coordinates (T, $\theta$, R, D) provides a complete topological and spatial description of said known fingerprint.

36. The fingerprint recognition system defined in claim 35 including means for topologically reconstructing an image of the known fingerprint corresponding to any set of topological coordinates stored in the database, and displaying said reconstructed fingerprint at said enquiry terminal.

37. The fingerprint recognition system defined in claim 35 including means for determining the local ridge direction ($\lambda$) for each said successive topological characteristic and storing said ridge direction ($\lambda$) with said set of stored coordinates.

38. The fingerprint recognition system defined in claim 34 including a central computer coupled to said database, one or more enquiry terminals connectable to said central computer, each said enquiry terminal having a means for extracting from an unknown latent or rolled fingerprint composite sets of topological coordinates comprising:
- means for selecting a central point on said unknown fingerprint,
- means for successively measuring the angular orientation ($\theta u$) relative to a predetermined reference line on said unknown fingerprint of each successive topological characteristic in a predetermined direction of rotation,
- means for determining the number of ridge lines (Ru) between said central point and each said successive topological characteristic,
- means for assigning a predetermined type code (Tu) to each successive topological characteristic,
- and said central computer having means for comparing said topological coordinate sets from an unknown print with the topological coordinate sets in said machine searchable database to identify the known print corresponding to said unknown print.

39. The fingerprint recognition system defined in claim 38 including means for displaying an image of an identified known fingerprint corresponding to said unknown fingerprint.

40. The fingerprint recognition system defined in claim 34 including means for extracting from said unknown fingerprint the distance (Du) between said central point and each successive topological characteristic,
and said central computer having means for comparing said composite topological coordinate sets from an unknown print with the composite topological coordinate sets in said machine searchable database to identify the known print corrresponding to said unknown print.

41. The fingerprint recognition system defined in claim 40 including means for retrieving and displaying an image of said known print corresponding to said unknown fingerprint.

42. A method of establishing a machine searchable library of fingerprints comprising the steps of:
(1) selecting a central point of the fingerprint as a center of a ridge scan line,
(2) relatively moving said ridge scan line to successively different topological characteristics of said fingerprint for a plurality of ridge lines,
(3) assigning a predetermined type code (T) to each said selected topological characteristic located, said type code (T) being selected from a table of predetermined topological characteristics,
(4) measuring the location (M) of said ridge scan line from a predetermined first scan line location,
(5) counting the number of ridges (R) between said center to the ridge scanned and forming a composite code (T, M, R) for each different topological characteristic,
(6) storing each composite code (T, M, R) in a machine searchable database.

43. The method defined in claim 42 in which said ridge scan line is a rotating ridge scan line having said central point as its center of rotation, including measuring the angular orientation ($\theta$) (where M=$\theta$) and radial distance (D) along said ridge scan line to each said topological characteristic and including each respective measurement as part of a composite code (T, M, R, D) stored in said machine searchable database.

44. The method defined in claim 43 including determining the local ridge direction ($\lambda$) for each said topological characteristic, and
storing said ridge direction ($\lambda$) as part of said composite code (T, $\theta$, R, D, $\lambda$) stored in said machine searchable database.

45. A method for coding an uknown latent or rolled finerprint comprising the steps of:
(1) locating a central point of the fingerprint as a center of a rotating ridge scan line,
(2) relatively rotating said ridge scan line to different topological characteristics of said fingerprint for a plurality of ridge lines,
(3) assigning a predetermined type code (T) to each said selected topological characteristic located,
(4) measuring the angular orientation ($\theta$) of said ridge scan line from a predetermined first angular orientation,
(5) counting the number of ridges (R), between said center to the ridge scanned, and (6) forming a composite code (T, θ, R) for each different topological characteristic on the print.

46. A method of identifying an unknown latent or rolled fingerprint in a rolled fingerprint database comprised of rolled fingerprints coded in topological coordinate set format wherein the ridge characteristics and other irregularities are coded by their type (T), relative angular orientation (θ) about a selected central observation point and from a predetermined line of reference, and the number of ridges (R) from said central feature, comprising the steps of:
 (1) topologically coding said unknown fingerprint in the same code format as the said rolled fingerprint,
 (2) topologically reconstructing the rolled fingerprint and the unknown print from the topological coordinate sets for a given rolled fingerprint stored in said database and the topological coordinate set for said unknown print,
 (3) comparing vectors extracted from such topological reconstruction to obtain an identity of said unknown fingerprint.

47. In a fingerprint recognition system, the method defined in claim 46 including displaying an image of the fingerprint identified in step (3).

48. The method as described in claim 46 including the step of extracting from an unknown fingerprint a radial distance (D) for each successive topological characteristic, and forming composite coordinate sets of the type (T, θ, R, D) and
 comparing said composite topological coordinate sets from an unknown print with the topological coordinate data in said machine searchable database to identify the known print corresponding to said unknown print.

49. The method as described in claim 48 including displaying an image of the retrieved fingerprint.

50. A method of displaying a replica of a fingerprint, comprising:
 topologically reconstructins an image of said fingerprint corresponding to a set of topological coordinates of the form (T, M, R, D) stored in a machine searchable database, wherein:
 (T) is an irregularity type,
 (M) is the scan location data for the irregularity derived by a moving scan line from a predetermined point,
 (R) is the number of ridges crossed by said moving scan line from said predetermined point to the irregularity,
 (D) is the distance from the irregularity to said predetermined point on said scan line, and
 displaying said reconstructed fingerprint image at an enquiry terminal coupled to said machine searchable database.

51. The method of displaying a replica of a fingerprint as defined in claim 50 wherein said scan location is derived by scanning a straight scan line across the fingerprint from said predetermined point to each irregularity and said scan location data is a function of the movement of said scan line.

52. The method of displaying a replica of a fingerprint as defined in claim 51 wherein said scan location data (M) is the angle (θ) rotatively traversed about a selected central observation point on the fingerprint by a radial scan line from said predetermined point to said irregularity.

53. The method of displaying a replica of a fingerprint as defined in claim 52 wherein said selected central observation point of said radial scan line is off-set from a central core of said fingerprint.

54. The method of displaying a replica of a fingerprint as defined in claim 51 wherein said scan location data (M) is derived by moving a straight vertical line horizontally across said fingerprint pattern, and is the measure of horizontal movement of said vertical line from a predetermined vertical edge thereof.

55. The method of displaying a replica of a fingerprint as defined in claim 51 wherein said scan location data (M) is derived by moving a straight horizontal line vertically across said fingerprint pattern and is the measure of vertical movement of said line from a horizontal edge thereof.

56. A method of displaying a replica of a fingerprint comprising,
 storing at least one set of topological coordinates for the minutiae of a fingerprint, of the form (T, M, R, D) wherein,
 T is a type code for each minutiae, said type code being selected from a predetermined table of minutiae types,
 M is the scan line location data of each successive minutiae in a predetermined movement pattern of a scan line over a fingerprint,
 R is the number of ridge lines between a predetermined point on said scan line and each successive minutiae encountered by said scan line in its predetermined movement pattern over said fingerprint,
 D is the distance from the minutiae to said predetermined point,
 topologically reconstructing an image of said fingerprint from said one set of topological coordinates, and
 displaying said image.

57. Fingerprint coding apparatus for coding an unknown latent or rolled fingerprint comprising the steps of:
 means for locating a central point of the fingerprint as a center of rotating ridge scan line,
 means for relatively rotating said ridge scan line to different topological characteristics of said fingerprint for a plurality of ridge lines,
 means for assigning a predetermined type code (T) to each said selected topological characteristics located,
 means for measuring the angular orientation (θ) of said ridge scan line from a predetermined first angular orientation,
 means for counting the number of ridges (R), between said center to the each said topological characteristic, and means for forming a composite code (T, θ, R) for each different topological characteristic on the print.

58. Apparatus for identifying an unknown latent or rolled fingerprint in a rolled fingerprint database comprised of rolled fingerprints coded in topological coordinate set format wherein the ridge characteristics and other irregularities are coded by their type (T), relative angular orientation (θ) about a selected central feature observation point and from a predetermined line of reference, and the number of ridges (R) from said central feature, comprising:
 (1) means for topologically coding said unknown fingerprint in the same code format as the said rolled fingerprint,
 (2) means for topologically reconstructing the rolled fingerprint and the unknown print from the topological coordinate sets for a given rolled fingerprint stored in said database and the topological coordinate set for said unknown print, (3) means for comparing vectors extracted from such topological reconstruction to obtain an identity of said unknown fingerprint.

59. Apparatus described in claim 58 including a means for extracting from an unknown fingerprint a radial distance (D) for each successive topological characteristic, and forming composite coordinate sets of the type (T, θ, R, D), and means for comparing said composite topological coordinate sets from an unknown print with the topological coordinate data in said machine searchable database to identify the known print corresponding to said unknown print.

60. A fingerprint recognition and retrieval system comprising:

storage means for storing a plurality of sets of topological coordinates for the minutes for a corresponding plurality of known fingerprints, each of said sets of topological coordinates being of the form (T, M, R) wherein, "T" is a predetermined type code for each said type code being selected from a predetermined table of minutiae types, "M" is the scan line location data of each successive minutiae in a predetermined movement pattern of a scan line over the fingerprint, and "R" is the numer of ridge lines between a predetermined point on said scan line and each successive minutiae encountered by said scan line in its predetermined movement pattern over said fingerprint, terminal means for entering a set of topological coordinates of the same form for the minutiae for at least a portion of an unknown fingerprint, means for comparing said set of topological coordinates for at least a portion of an unknown fingerprint with said plurality of sets of topological coordinates corresponding to said plurality of known fingerprints, to locate a match therefor and, means for retrieving a matching known fingerprint.

61. A fingerprint recognition and retrieval system as defined in claim 60 including a display means, and means for reconstructing an image of said matching known fingerprints on said display means.

62. A fingerprint recognition system as defined in claim 60 including means for topologically reconstructing an image of said matching known fingerprint and display means for displaying said image.

63. A method of establishing a machine searchable library of fingerprints having minutiae distributed in a pattern unique to the individual to whom the print belongs comprising the steps of:

scanning the fingerprint to obtain a set of topological coordinates, said set of topological coordinates being of the form (T, M, R, D) wherein, T is a type code for each minutiae, said type code being selected from a predetermined table of minutiae types, M is the scan line location data of each successive minutiae in a predetermined movement pattern of a scan line over a fingerprint, R is the number of ridge lines between a predetermined point on said scan line and each successive minutiae encountered by said scan line in its predetermined movement pattern over said fingerprint, and D is the distance from the minutiae to said predetermined point, topologically reconstructing said fingerprint from said set of topological coordinates.

64. The method described in claim 63 wherein said step of topologically reconstructing a fingerprint includes forming a continuity matrix and lifting said vector out of said continuity matrix.

65. A method of identifying an unknown fingerprint comprising the steps of:

forming a library as described in claim 63, scanning the unknown fingerprint to obtain a set of topological coordinates, topologically reconstructing said unknown fingerprint from said set of topological coordinates, extracting a vector from said topologically reconstructed unknown fingerprint, comparing said vector for said unknown fingerprint with said vectors in said library to identify said unknown fingerprint.

66. The method described in claim 65 including the step of retrieving and displaying an image of the known fingerprint from said machine searchable library that corresponds to said unknown fingerprint.

67. In a fingerprint recognition system, apparatus for extracting topological coordinates from a known fingerprint and storing composite sets of extracting topological coordinates in a machine searchable fingerprint database and a central computer coupled to said database and one or more inquiry terminals connected to said comprising, means for establishing a scanning line, means for selecting a predetermined point on said scanning line, means for scanning said known fingerprint in a predetermined scan pattern by progressive movement of said scanning line over said known fingerprint, including each successive topological characteristic in said predetermined scan pattern and determining the scan location data (M) of each said successive topological characteristic relative to said scanning line and scanning pattern, means for determining the number of ridge lines (R) between said predetermined point on said scanning line and each said successive topological characteristic, means for assigning a predetermined type code (T) to each successive topological characteristic, each said type code (T) being selected from a predetermined table of topological characteristics, means for storing said type code (T), scan location data (M) and the number of ridge lines (R) for each successive topological characteristic of said known fingerprint in a machine searchable database, each said inquiry terminal means including means for extracting from an unknown latent or rolled fingerprint, including fingerprints where no core or delta are detected, and portions of latent prints, sets of topological coordinates comprising:

means for establishing a scanning line on said unknown fingerprint, means for selecting a predetermined point on said scanning line scanning said unknown fingerprint, means for scanning said unknown fingerprint in said predetermined scan pattern by progressive movement of said scanning line over said known fingerprint, including each successive topological characteristic in said predetermined scan pattern and determining the scan location data (Mu) of each said topological characteristic relative to said scanning line and scanning pattern, means for determining the number of ridge lines (Ru) between said predetermined point on said scanning line and each said successive topological characteristic, means for assigning a predetermined type code (Tu) to each successive topological characteristic encountered by said scan line, said type code (Tu) being selected from said predetermined list of topological characteristics, and said central computer having means for comparing said topological coordinate sets (Tu, Mu, Ru) from said unknown fingerprint with the composite sets of topological coordinate sets in said machine searchable database to identify the known fingerprint corresponding to said unknown print.

68. The system defined in claim 67 including the file means storing replicable images of all said known prints and means for retrieving a replicable image of an identified known print corresponding to said unknown print.

69. The system defined in claim 68 including means for retrieving an image of a known fingerprint corresponding to said unknown fingerprint.

70. The system defined in claim 76 including means for displaying an image of the fingerprint retrieved by said means for retrieving.

71. The fingerprint recognition system defined in claim 67 including, for each topological irregularity on each known fingerprint, means for determining a distance (D) from each successive topological irregularity to the said predetermined point on said scanning line, means for storing said distance (D) together with the coordinate sets (T, M, R) as composite coordinate sets of the form (T, M, R, D) in said machine searchable database, and for each unknown fingerprint means for determining a distance (Du) from each successive topological irregularity thereof to the said predetermined point on said scanning line, and said central computer having means for comparing composite topological coordinate sets of the form (Tu, Mu, Ru, Du) from an unknown fingerprint with the composite topological coordinate data sets in said machine searchable database to identify the known fingerprint corresponding to said unknown fingerprint.

72. The fingerprint recognition system defined in claim 71 including means for producing a visual image of an identified known fingerprint corresponding to said unknown fingerprint.

73. The system defined in claim 71 wherein said predetermined scan pattern is defined by angularly rotating a line about a predetermined central point, that central point also being designated the predetermined point on the scanning line for the purpose of measuring ridge counts (R), and where said scan location data (M) is the angle ($\theta$) through which said line has been angularly rotated as measured from a predetermined reference line.

74. The fingerprint recognition system defined in claim 71 wherein said means for scanning said known fingerprint in a predetermined scan pattern includes means for moving a straight vertical scan line horizontally across the fingerprint pattern, a point on said scan line which is vertically beyond the entire fingerprint pattern being designated the predetermined point on the line for the purpose of measuring said ridge counts (R), and where said scan location data (M) is the measure of the horizontal movement of said scanning line from a predetermined vertical edge.

75. The fingerprint recognition system defined in claim 71 wherein said means for scanning said known fingerprints in a scan pattern includes means for moving a straight horizontal line vertically over the fingerprint pattern starting from a predetermined edge, a point on that scanning line which is horizontally to one side of the entire fingerprint pattern being designated the predetermined point on the line for the purpose of measuring said ridge counts (R), and where said scan location data (M) is the measure of the vertical movement of said scanning line from said predetermined edge.

76. The fingerprint recognition and retrieval system defined in claims 73, 74, or 75, including storage means for storing images of all said known prints, means for entering a set of topological coordinates corresponding to a portion of an unknown fingerprint, means for searching said machine searchable database to find a matching coordinate set in said database for said portion of an unknown fingerprint, and means for retrieving and displaying said one of said image of a known fingerprint corresponding to the matching coordinate set found by said search.

77. A fingerprint recognition method comprising:

extracting topological coordinates from a known fingerprint and storing composite sets of extracted topological coordinates in a machine searchable fingerprint database by:

placing a scanning line on said known fingerprint selecting a point on said scanning line to be a predetermined point, scanning said known fingerprint in a predetermined scan pattern and direction by systematic movement of said scanning line over said known fingerprint, including each successive topological irregularity in said predetermined scan pattern, determining the scan location data (M) of each said successive topological irregularity relative to said scanning line and scanning pattern, determining the number of ridge lines (R) between said predetermined point on said scanning line and each said successive topological irregularity, assigning a predetermined type code (T) to each successive topological irregularity, said type code (T) being selected from a predetermined table of topological irregularities, and storing the type code (T), scan location data (M) and the number of ridge lines (R) in a machine searchable database, with respect to unknown fingerprints including scene of crime fingerprints and fingerprints where no core or delta is detected extracting sets of topological coordinates comprising:

placing said scanning line on said unknown fingerprint, selecting a point on said scanning line to be said predetermined point, scanning said unknown fingerprint in a predetermined scan pattern and direction by systematic movement of said scanning line over said unknown fingerprint, including each successive topological irregularity in said predetermined scan pattern and determining the scan location data (Mu) of each said successive topological characteristic relative to said scanning line and scanning pattern, determining the number of ridge lines (Ru) between said predetermined point on said scanning line and each said successive topological characteristic, assigning a predetermined type code (Tu) to each successive topological characteristic, said type code (Tu) being selected from said predetermined table of topological irregularities, and causing said topological coordinate sets for an unknown print to be compared with the topological coordinate data in said machine searchable database to identify the known print corresponding to said unknown print.

78. A method of displaying a replica of a fingerprint comprising:

topologically reconstructing at least a portion of an image of said fingerprint corresponding to a set of topological coordinates of the form (T, M, R, D) stored in a machine searchable database, wherein:

(T) is a code for an irregularity type selected from a predetermined table of irregularity types, (M) is the scan location data for the irregularity derived by moving a scan line from a predetermined point, (R) is the number of ridges crossed by said moving scan line from said predetermined point to the irregularity, (D) is the distance from the irregularity to said predetermined point on said scan line, and displaying said reconstructed fingerprint image at an inquiry terminal coupled to said machine searchable database.

79. Apparatus for identifying an unknown latent or rolled fingerprint in a rolled fingerprint database comprised of rolled fingerprints coded in topological coordinate set format wherein the ridge characteristics and other irregularities are scanned and coded by their type (T) selected from a predetermined table of irregularity types, scan location data (M) relative to a predetermined point of reference, and the number of ridges (R) from said predetermined point of reference comprising:

(1) means for topologically coding said unknown fingerprint in the same code format as the said rolled fingeprint, (2) means for topologically reconstructing at least a portion of the rolled fingerprint and the unknown print from the topological coordinate sets for a given rolled fingerprint stored in said database and the topological coordinate set for said unknown print, (3) means for extracting vectors from each topologically reconstructed fingerprint, (4) means for comparing vectors extracted from such topological reconstruction to obtain an identity of said unknown fingerprint.

80. A fingerprint recognition system comprising with respect to known fingerprints, storage means forming a computer database of machine searchable known fingerprints including:

means for scanning each said known fingerprint in its entirety in a predetermined direction of scan and locating each ridge event or irregularity, and extracting and storing the following data, a type code for each ridge event or irregularity, said type code being selected from a predetermined table of type codes including the following possible ridge events or irregularities:

a. whether a ridge ends or begins relative to said predetermined direction of scan, b. bifurcation of a ridge and the direction of the bifurcation relative to said predetermined direction of scan, c. ridge running into or out of an unclear and/or scarred area relative to said predetermined direction of scan, d. ridge running out of or coming into sight relative to said predetermined direction of scan, the number of ridges between a selected point on the fingerprint and the event or irregularity, and the distance from a predetermined point in said print to said event or irregularity, and with respect to unknown and scene of crime fingerprints, one or more terminals, each terminal including means for scanning an unknown fingerprint or scene of crime fingerprint in said predetermined direction of scan and extracting and storing data for said unknown and scene of crime fingerprints as set forth above with respect to said known fingerprints, and computer means for comparing the data for said unknown and scene of crime fingerprints with data for said known fingerprints stored in said computer database to locate a match therefore, and means for retrieving a matching known fingerprint.

81. A fingerprint recognition system comprising, in combination, with respect to known fingerprints:

storage means forming a computer database of machine searchable known fingerprints including:

means for scanning each said known fingerprint in its entirety in a predetermined single direction of scan and locating each ridge event or irregularity, and extracting and storing the following data:

firstly, a type code (T) for each ridge event or irregularity, said type code being selected from a predetermined table of type codes including the following possible ridge events or irregularities:

a. whether a ridge ends or begins relative to said predetermined direction of scan, b. bifurcation of a ridge and the direction of the bifurcation relative to said predetermined single direction of scan, c. ridge running into or out of an unclear and/or scarred area relative to said predetermined single direction of scan, d. ridge appearing or disappearing at the edge of said fingerprint relative to said pedetermined single direction of scan, secondly, further information including the scan location data (M) of each successive ridge event or irregularity in said predetermined direction of scan such that the order in which said ridge events or irregularities are scanned can be determined and ridge count data (R) for each ridge event or irregularity to specify the topological position of each ridge event or irregularity and enable the topological relationship between each ridge event or irregularity to be reconstructed, with respect to unknown and scene of crime fingerprints:

one or more terminals, each terminal including means for scanning an unknown fingerprint or scene of crime fingerprint in its entirety in the same predetermined single direction of scan as for said known fingerprints to locate each ridge event or irregularity, and extracting and storing the following data for said unknown and scene of crime fingerprint:

firstly, a type code (T) for each event or irregularity selected from said predetermined table of type codes as set forth above with respect to said known fingerprints, secondly, further information including the scan location data (Mu) of each successive event or irregularity in said predetermined single direction of scan of said unknown fingerprint such that the order in which said ridge events or irregularities are scanned can be determined, and ridge count data (Ru) of each successive event or irregularity to specify the topological position of each ridge event or irregularity to enable the topological relationship between each ridge event or irregularity to be reconstructed, computer means for comparing the data for said unknown and scene of crime fingerprints with data for said known fingerprints stored in said computer database to locate a match therefore, and means for retrieving a matching known fingerprint.

82. The fingerprint recognition system defined in claim 81 including file means storing replicable images of all said known prints and means for retrieving a replicable image of an identified known print corresponding to said unknown print.

83. The fingerprint recognition system defined in claim 82 including means for retrieving an image of a known fingerprint corresponding to said unknown fingerprint.

84. The fingerprint recognition system defined in claim 83 including display means for displaying an image of the fingerprint retrieved by said means for retrieving.

85. The fingerprint recognition system defined in claim 81 including display means for producing a visual image of an identified known fingerprint corresponding to said unknown fingerprint.

86. A fingerprint recognition system comprising, in combination, with respect to known fingerprints:

scanning each said known fingerprint in its entirety in a predetermined single direction of scan and locating each ridge event or irregularity, and extracting and storing the following data in a computer database of machine searchable file fingerprints:

firstly, a type code (T) for each ridge event or irregularity, said type code being selected from a predetermined table of type codes including the following possible ridge event or irregularities:

a. whether a ridge ends or begins relative to said predetermined direction of scan, b. bifurcation of a ridge and the direction of the bifurcation relative to said predetermined direction of scan, c. ridge running into or out of an unclear and/or scarred area relative to said predetermined direction of scan, d. ridge appearing or disappearing at the edge of said fingerprint relative to said predetermined direction of scan, secondly, further information including scan location data (M) of each successive event or irregularity in said predetermined single direction of scan such that the order in which said ridge events or irregularities are scanned can be determined for the entire fingerprint and ridge count data (R) of each successive event or irregularity which specifies the topological position of each ridge event or irregularity and enable the topological relationship between each ridge event or irregularity to be reconstructed, with respect to unknown and scene of crime fingerprints:

scanning an unknown fingerprint or scene of crime fingerprint in the same predetermined single direction of scan to locate each ridge event or irregularity, and extracting and storing data for said unknown and scene of crime fingerprints including a type code (Tu) and scan location data (Mu) and ridge count data (Ru) of each successive ridge event or irregularity in said predetermined single direction of scan in the identical manner as set forth above with respect to said file fingerprints, comparing the data for said unknown and scene of crime fingerprints with data for said file fingerprints stored in said computer database to locate a match therefore, and retrieving a matching file fingerprint.

* * * * *

UNITED STATES PATENT AND TRADEMARK OFFICE
CERTIFICATE OF CORRECTION

PATENT NO. : 4,747,147
DATED : May 24, 1988
INVENTOR(S) : Malcolm K. Sparrow

Page 1 of 4

It is certified that error appears in the above-identified patent and that said Letters Patent is hereby corrected as shown below:

COLUMN NO.

4, line 42, change "nor" to --not--.

6, line 52, change "doc-ument" to --document--.

7, line 19, delete the comma (,) at the end of the sentence and insert a period (.).

9, line 25, delete the period (.) and insert a comma (,).

10, line 4, should read:

Clearly $0 \leq P(j,k,l) \leq 1$ for all $(j,k,l)$. Also $\sum_j P(j,k,l) = 1.0$, for any fixed pair $(k,l)$.

10, line 17, delete "H" and insert --A--.

11, line 61, delete "too" and insert --top--.

11, "TABLE S..." the labeling of "i" is missing on the far left side.

19, line 29, delete "Into" and insert --In--.

20, line 65, correct the spelling of --within--.

UNITED STATES PATENT AND TRADEMARK OFFICE
CERTIFICATE OF CORRECTION

PATENT NO. : 4,747,147
DATED : May 24, 1988
INVENTOR(S) : Malcolm K. Sparrow

Page 2 of 4

It is certified that error appears in the above-identified patent and that said Letters Patent is hereby corrected as shown below:

COLUMN NO.

23, line 24, delete "oi" and insert --of--.

23, line 40, should read:

$$\theta_i \leq \theta_{i+1} \text{ for all } i \in \{1, 2, \ldots n - 1\}$$

24, line 31, after "cut" insert -- CHECK THIS ONE --

24, line 57, delete "known" and insert --know--.

25, lines 6 and 8, should read:

$$c(1,j,1) = c(0,j,1) \quad \text{for all } 1 \leq j \leq R_1 - 1,$$
$$c(1,j,3) = c(0,j,3) \quad \text{for all } 1 \leq j \leq R_1.$$

25, lines 12 and 14 should read:

$$c(1,j,1) = c(0,j+1,1) \quad \text{for all } R_1 + 2 \leq j \leq r_1,$$
$$c(1,j,3) = c(0,j+1,3) \quad \text{for all } R_1 + 1 \leq j \leq r_1.$$

26, lines 12 and 14 should read:

$$c(0,j,1) \text{ is equivalent to } c(n,j,1) \text{ for all } 1 \leq j \leq r_0,$$
$$\text{and } c(n,j,3) \text{ is equivalent to } c(0,j,3) \text{ for all } 1 \leq j \leq r_0.$$
$$(\text{Of course } r_0 = r_n = m)$$

UNITED STATES PATENT AND TRADEMARK OFFICE
CERTIFICATE OF CORRECTION

PATENT NO. : 4,747,147
DATED : May 24, 1988
INVENTOR(S) : Malcolm K. Sparrow

It is certified that error appears in the above-identified patent and that said Letters Patent is hereby corrected as shown below:

COLUMN NO.

26, line 33 should read:

(a) all the elements $\{c(i,j,k) : 0 \leq i \leq n : 1 \leq j \leq r_i : k = 1 \text{ or } 3\}$ 26, line 43 delete "of" and insert --for--.

27, line 1 should read:

$(c(i,j,k) : i=1...n : j=1...r_i \quad : k=1 \text{ or } 3)$ 28, line 26 should read:

sets, in total, was n then certainly $k \leq n$. The extracted 31, line 21, delete "steps" and insert --stages--.

32, line 65, delete "cone" and insert --done--.

33, line 30, delete "LMS" AND INSERT --LM5-.

34, line 8, delete "retainer" and insert --rather--.

34, line 32, delete "fails" and insert --falls--.

36, line 21, delete the comma (,) and insert a period (.).

UNITED STATES PATENT AND TRADEMARK OFFICE
CERTIFICATE OF CORRECTION

PATENT NO. : 4,747,147
DATED : May 24, 1988
INVENTOR(S) : Malcolm K. Sparrow

Page 4 of 4

It is certified that error appears in the above-identified patent and that said Letters Patent is hereby corrected as shown below:

COLUMN NO.

36, line 21, capitalize "In".

90, line 57, delete "unknown" and insert --known--.

92, line 6, delete "(R)" and insert --($\theta$)--.

94, line 32, correct the spelling of "distance".

96, line 55, delete "for" and insert --of--.

96, line 55, correct the spelling of "unknown".

96, line 56, correct the spelling of "fingerprint".

97, line 39, correct the spelling of "reconstructing".

99, line 21, delete "minutes" and insert --minutiae--.

104, line 9, after "sight" insert --without any event or irregularity occurring--.

Signed and Sealed this

Fourth Day of July, 1989

Attest:

DONALD J. QUIGG

Attesting Officer

Commissioner of Patents and Trademarks